(12) United States Patent
Goldenshteyn et al.

(10) Patent No.: US 12,285,136 B2
(45) Date of Patent: Apr. 29, 2025

(54) AUTOMATED COOKING SYSTEMS AND METHODS OF OPERATING THEREOF

(71) Applicant: Dinemic Ventures LLC, Dallas, TX (US)

(72) Inventors: Gennadiy Goldenshteyn, Dallas, TX (US); Val Ginzburg, Rumford, RI (US); Dmitry Rumyantsev, Saint Petersburg (RU); Vladimir Gordeev, Saint Petersburg (RU)

(73) Assignee: Dinemic Ventures LLC, Dallas, TX (US)

( * ) Notice: Subject to any disclaimer, the term of this patent is extended or adjusted under 35 U.S.C. 154(b) by 0 days.

(21) Appl. No.: 18/780,115

(22) Filed: Jul. 22, 2024

(65) Prior Publication Data

US 2025/0024996 A1    Jan. 23, 2025

Related U.S. Application Data

(60) Provisional application No. 63/515,092, filed on Jul. 22, 2023.

(51) Int. Cl.
*A23L 5/10*      (2016.01)
*A47J 27/18*     (2006.01)
(Continued)

(52) U.S. Cl.
CPC ............ *A47J 37/1228* (2013.01); *A23L 5/10* (2016.08); *A47J 27/18* (2013.01); *A47J 37/1214* (2013.01);
(Continued)

(58) Field of Classification Search
CPC ............... A47J 37/1214; A47J 37/1223; A47J 37/1228; A47J 37/1266; A47J 37/129;
(Continued)

(56) References Cited

U.S. PATENT DOCUMENTS 2,678,039 A * 5/1954 Keating ............... A47J 37/1261
                                                 159/901
2,853,937 A * 9/1958 Peck .................... A47J 37/1214
                                                  99/407

(Continued)

FOREIGN PATENT DOCUMENTS

WO    2024059831 A2    3/2024
WO    2024073467 A2    4/2024

*Primary Examiner* — Drew E Becker
(74) *Attorney, Agent, or Firm* — Polygon IP, LLP

(57) ABSTRACT

Described herein are automated cooking apparatuses for storing and cooking food items as well as methods of operating such apparatuses. In some examples, an automated cooking apparatus comprises a storage unit, a delivery unit, and a cooking unit. The storage unit may be equipped with a refrigeration unit and a container delivery opening. The delivery unit is aligned with this opening and configured to load a set amount of the food items into each food compartment of the cooking unit. The cooking unit moves its food compartments through a cooking tank (e.g., filled with a cooking liquid and heated using a set of heating elements) and into a cooked food receiver. The storage unit or, more specifically, its uncooked food container unit is positioned proximate (e.g., within 200 millimeters) to the cooking tank thereby reducing the time for transporting the food items relative to the cooking time.

20 Claims, 21 Drawing Sheets

(51) Int. Cl.
*A47J 37/12* (2006.01)
*B65G 15/30* (2006.01)
*F25D 13/06* (2006.01)

(52) U.S. Cl.
CPC ....... *A47J 37/1223* (2013.01); *A47J 37/1266* (2013.01); *A47J 37/129* (2013.01); *A47J 37/1295* (2013.01); *B65G 15/30* (2013.01); *F25D 13/06* (2013.01); *A47J 2202/00* (2013.01); *A47J 2203/00* (2013.01); *B65G 2201/0202* (2013.01)

(58) Field of Classification Search
CPC .... A47J 37/1295; A47J 27/18; A47J 2202/00; A47J 2203/00; B65G 15/30; B65G 2201/0202; F25D 13/06; A23L 5/10
See application file for complete search history.

(56) References Cited

U.S. PATENT DOCUMENTS

| | | | | |
|---|---|---|---|---|
| 3,347,152 | A | * | 10/1967 | Congelli ............. A47J 37/1214 99/334 |
| 3,442,423 | A | | 5/1969 | Cozad |
| 3,645,196 | A | * | 2/1972 | Johnston ............. A47J 37/1214 99/407 |
| 3,896,715 | A | | 7/1975 | Mascret |
| 4,205,600 | A | | 6/1980 | Garrett |
| 4,228,730 | A | * | 10/1980 | Schindler ............. A47J 37/1214 99/341 |
| 4,478,140 | A | | 10/1984 | Bullock |
| 4,489,647 | A | | 12/1984 | Stamps et al. |
| 4,719,850 | A | | 1/1988 | Sowell |
| 4,722,267 | A | * | 2/1988 | Galockin ............ G07F 17/0085 126/374.1 |
| 5,003,868 | A | * | 4/1991 | Higgins ............... A47J 37/1228 99/357 |
| 5,029,520 | A | * | 7/1991 | Okada ................. G07F 17/0085 99/357 |
| 5,168,795 | A | * | 12/1992 | Okada ................. G07F 17/0078 99/336 |
| 6,869,633 | B2 | | 3/2005 | Sus et al. |
| 7,303,776 | B2 | | 12/2007 | Sus et al. |
| 7,343,719 | B2 | | 3/2008 | Sus et al. |
| 7,891,289 | B2 | | 2/2011 | Day et al. |
| 7,981,455 | B2 | | 7/2011 | Sus et al. |
| 8,034,390 | B2 | | 10/2011 | Sus et al. |
| 11,577,401 | B2 | | 2/2023 | Sinnet et al. |
| 11,833,663 | B2 | | 12/2023 | Sinnet et al. |
| 2003/0205028 | A1 | | 11/2003 | Sus et al. |
| 2003/0205288 | A1 | * | 11/2003 | Sus ....................... B65B 43/305 141/83 |
| 2003/0207009 | A1 | | 11/2003 | Sus et al. |
| 2004/0020555 | A1 | | 2/2004 | Sus et al. |
| 2005/0061160 | A1 | | 3/2005 | Day et al. |
| 2005/0193898 | A1 | | 9/2005 | Sus et al. |
| 2008/0063769 | A1 | | 3/2008 | Sus et al. |
| 2008/0166646 | A1 | | 7/2008 | Moffat et al. |
| 2008/0193617 | A1 | | 8/2008 | Sus et al. |
| 2018/0289216 | A1 | * | 10/2018 | Casey ................... A47J 37/045 |
| 2020/0139554 | A1 | | 5/2020 | Sinnet et al. |
| 2020/0305646 | A1 | | 10/2020 | Hohler et al. |
| 2022/0055225 | A1 | | 2/2022 | Sinnet et al. |
| 2022/0324119 | A1 | | 10/2022 | Kodali et al. |
| 2022/0346598 | A1 | | 11/2022 | Sinnet et al. |
| 2022/0346599 | A1 | | 11/2022 | Reichelderfer et al. |
| 2023/0093737 | A1 | | 3/2023 | Hohler et al. |
| 2023/0292957 | A1 | | 9/2023 | Wach et al. |
| 2024/0057814 | A1 | | 2/2024 | Gordin et al. |
| 2024/0057815 | A1 | | 2/2024 | Gordin et al. |
| 2024/0115075 | A1 | | 4/2024 | Wragg et al. |

* cited by examiner

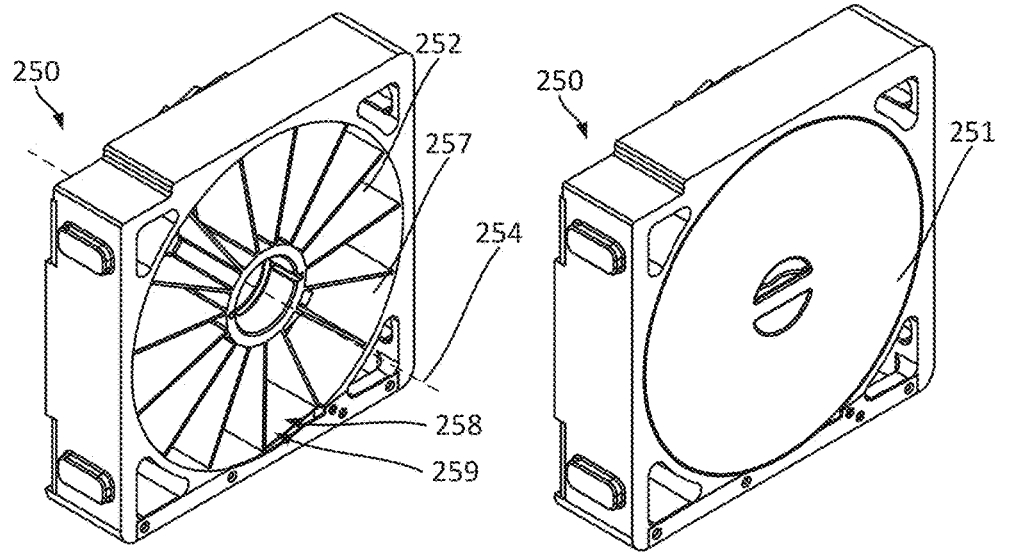
FIG. 6C  FIG. 6D
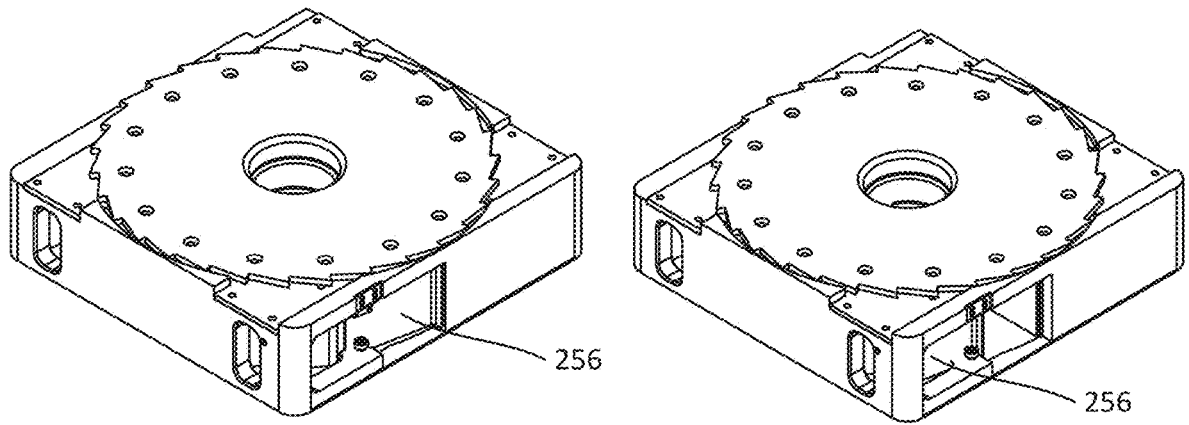
FIG. 6E  FIG. 6F

AUTOMATED COOKING SYSTEMS AND METHODS OF OPERATING THEREOF

CROSS-REFERENCE TO RELATED APPLICATIONS

This application claims the benefit under 35 U.S.C. § 119(e) of U.S. Provisional Patent Application 63/515,092 by Gennadiy Goldenshteyn et al., entitled: "Automated Cooking Systems and Methods of Operating Thereof", filed on 2023 Jul. 22, which is incorporated herein by reference in its entirety for all purposes.

BACKGROUND

Cooked items, prepared by immersing product into cooking media such as frying, boiling or steaming, are a crucial part of most commercial food service operations. Currently, a variety of manually operated preparation equipment, such as fryers, steamers, or kettles, used to accomplish the cooking operation, require significant labor and places heavy reliance on the human associates to follow the operating instructions regarding uncooked product portion size, cooking temperature, cooking media condition, cooking time, and preparation process to achieve satisfactory cooked product results. Industry pressures on the cost of labor, availability of labor, reduction of waste, and finished product consistency necessary to meet customer experience expectations require automated cooking solutions. Several automated cooking solutions, such as frying stations, steaming stations, grilling and broiling stations, have been introduced to the market. These systems typically include robotic arms and other add-on automation elements being added to otherwise conventional, traditionally manually operated equipment to achieve automation of the cooking process. Such solutions are expensive and large—often increasing the size of the cooking system by a factor of 2 or more, making it very difficult and expensive to install into typical food service operations. Additionally, the most progressive automated cooking systems, for example frying systems, ensure high-volume, batch and single-portion food preparation from industry-common appliances such as deep-fat fryer by continuous passage of uncooked food products through cooking medium such as frying oil—such passage is typically carried out horizontally and requires extensive footprint of cooking media tank or tanks. A need exists for cost-effective automated cooking systems that are designed to achieve desired outputs of finished products from food production stations with meaningfully smaller footprints. Such automated cooking systems can be easily installed across a variety of foodservice operating systems and concepts and production of consistent quality cooked products with minimal human worker involvement.

SUMMARY

Described herein are automated cooking apparatuses for storing and cooking food items as well as methods of operating such apparatuses. In some examples, an automated cooking apparatus comprises a storage unit, a delivery unit, and a cooking unit. The storage unit may be equipped with a refrigeration unit and a container delivery opening. The delivery unit is aligned with this opening and configured to load a set amount of the food items into each food compartment of the cooking unit. The cooking unit moves its food compartments through a cooking tank (e.g., filled with a cooking liquid and heated using a set of heating elements) and into a cooked food receiver. The storage unit or, more specifically, its uncooked food container unit is positioned proximate (e.g., within 200 millimeters in some instances) to the cooking tank thereby reducing the time for transporting the food items relative to the cooking time.

Clause 1. An automated cooking apparatus for storing and cooking food items, the automated cooking apparatus comprising: a storage unit comprising an insulating enclosure, a refrigeration unit, and an uncooked food container unit positioned within the insulating enclosure and comprising a container delivery opening; a delivery unit aligned with the container delivery opening; and a cooking unit comprising (1) a food transporter comprising a plurality of food compartments, (2) a cooking tank comprising a cooking tank opening and a plurality of heating elements, and (3) a cooked food receiver, wherein: the delivery unit is positioned between the uncooked food container unit and the cooking tank and configured to load a set amount of the food items into each one of the plurality of food compartments, the food transporter is configured to transport each one of the plurality of food compartments from the delivery unit through the cooking tank opening into the cooking tank and from the cooking tank to the cooked food receiver, and the uncooked food container unit is positioned proximate to the cooking tank.

Clause 2. The automated cooking apparatus of clause 1, wherein: the automated cooking apparatus comprises an apparatus axis intersecting both the storage unit and the cooking unit, the automated cooking apparatus comprises a transporter chain axis having an angle to the apparatus axis of less than 60 degrees, the food transporter comprises a transporter chain, each one of the plurality of food compartments is mechanically coupled to the transporter chain, and at least a portion of the transporter chain is aligned with the transporter chain axis.

Clause 3. The automated cooking apparatus of clause 1, wherein each one of the plurality of food compartments is configured to close when positioned within the cooking tank.

Clause 4. The automated cooking apparatus of clause 1, further comprising a ventilation unit comprising at least one ventilation fan and a ventilation duct, wherein: the ventilation duct is fluidically coupled with the at least one ventilation fan and the at least one ventilation fan is fluidically coupled with the cooking unit, and the at least one ventilation fan is configured to withdraw a volume of hot air from the cooking unit and expel the volume of hot air into the ventilation duct.

Clause 5. The automated cooking apparatus of clause 4, wherein the ventilation unit further comprises a ventilation filter housing positioned between the cooking unit and the at least one ventilation fan and a ventilation filter positioned within the ventilation filter housing.

Clause 6. The automated cooking apparatus of clause 1, wherein the insulating enclosure comprises an insulating enclosure opening aligned with the container delivery opening.

Clause 7. The automated cooking apparatus of clause 1, wherein the refrigeration unit comprises a compressor, a condenser coil, a circulation fan, and an evaporator, wherein: the compressor, the condenser coil, and the evaporator are fluidically coupled, and the circulation fan is configured to circulate air within the insulating enclosure and over the evaporator, thereby maintaining the air within the insulating enclosure below an ambient temperature.

Clause 8. The automated cooking apparatus of clause 1, wherein: the container delivery opening has a plane and a cross-sectional area in the plane, the uncooked food container unit has a first food container unit side opposite the container delivery opening, the first food container unit side has an area in a plane parallel with the plane of the container delivery opening, and the cross-sectional area of the container delivery opening is smaller than the cross-sectional area of the first food container unit side.

Clause 9. The automated cooking apparatus of clause 1, further comprising a horizontal belt feeder comprising a flexible belt comprising a food contacting surface, a plurality of pulleys, a feeder brush, a feeder roller comprising a roller surface, and a dozer container, wherein: the flexible belt is positioned between the uncooked food container unit and the container delivery opening and is movable relative to both the uncooked food container unit and the container delivery opening, the plurality of pulleys is configured to support the flexible belt, one of the plurality of pulleys rotates about a pully axis, the feeder roller rotates about a roller axis that is parallel with the pully axis, at least a portion of the dozer container is positioned between the flexible belt and the cooking unit, a distance separating the roller surface from the food contacting surface is large enough to permit individual food items to pass out of the uncooked food container unit and into the dozer container when the flexible belt translates, the feeder roller rotates about the roller axis in the same direction that the one of the plurality of pulleys rotates when the flexible belt translates, and the feeder brush is configured to prevent food items from passing out of the uncooked food container unit and into the dozer container when the flexible belt does not translate.

Clause 10. The automated cooking apparatus of clause 9, wherein the horizontal belt feeder further comprises a plurality of belt dividers mechanically coupled to the food contacting surface of the flexible belt, wherein the plurality of belt dividers is configured to contact and transport food items when the flexible belt translates.

Clause 11. The automated cooking apparatus of clause 10, wherein the horizontal belt feeder further comprises a dozer container track, wherein: the dozer container track comprises a dozer container cover and a dozer track opening, the container delivery opening is aligned with the dozer track opening, the dozer container comprises a first dozer container opening and a second dozer container opening opposite the first dozer container opening and facing the dozer container track, the first dozer container opening is configured to align with an end of the flexible belt and the second dozer container opening is configured to align with the dozer container cover when the dozer container is in a receiving position, and the second dozer container opening is configured to align with the dozer track opening when the dozer container is in a delivering position.

Clause 12. The automated cooking apparatus of clause 9, wherein least a portion of the horizontal belt feeder is positioned within the insulating enclosure.

Clause 13. The automated cooking apparatus of clause 1, wherein the uncooked food container unit comprises at least one cassette comprising a plurality of cassette compartments, a cassette axis, a cassette door, a cassette shroud, and a cassette opening, wherein: the cassette opening is an opening in the cassette shroud and is aligned with the container delivery opening, the plurality of cassette compartments is radially arrayed about the cassette axis and rotationally coupled to the cassette, each one of the plurality of cassette compartments comprises a compartment opening, the compartment opening is aligned with the cassette opening when the one of the plurality of cassette compartments is aligned with the cassette opening, the compartment opening is aligned with the cassette shroud when the one of the plurality of cassette compartments is not aligned with the cassette opening, the cassette door is positioned between the one of the plurality of cassette compartments and the cassette opening when the cassette door is in a closed position, and the cassette door is not positioned between the one of the plurality of cassette compartments and the cassette opening when the cassette door is in an open position.

Clause 14. The automated cooking apparatus of clause 9, wherein the delivery unit is configured to accept portions of food from either a cassette or an uncooked food container unit.

Clause 15. The automated cooking apparatus of clause 1, wherein: each one of the plurality of food compartments comprises a food compartment opening sufficiently large for food items to pass through the food compartment opening when the one of the plurality of food compartments is in either a food-receiving position or a food-delivering position within the cooking unit.

Clause 16. The automated cooking apparatus of clause 15, wherein the food transporter is configured to position each one of the plurality of food compartments in one of a food-receiving position within the cooking unit, a food-cooking position within the cooking tank, and a food-delivering position within the cooking unit.

Clause 17. The automated cooking apparatus of clause 16, wherein: each one of the plurality of food compartments is configured to form a basket opening when this one of the plurality of food compartments is positioned in the food-delivering position, and each one of the plurality of food compartments is configured to adopt an orientation when this one of the plurality of food compartments is positioned in the food-delivering position such that the basket opening permits food to exit the one of the plurality of food compartments.

Clause 18. The automated cooking apparatus of clause 1, wherein the automated cooking apparatus further comprises a manual bypass unit.

Clause 19. The automated cooking apparatus of clause 1, further comprising a filtration unit comprising a filtration pump, a filter housing, and a filter, wherein: the filtration pump is fluidically coupled with the cooking tank and the filter housing is fluidically coupled with the filtration pump, the filter is positioned within the filter housing, and at least a portion of the filter housing is positioned between the cooking tank and the storage unit.

Clause 20. The automated cooking apparatus of clause 1, further comprising a cooking tank mounting bearing, rotatably coupling the cooking tank to the cooking unit, thereby enabling tilting of the cooking tank relative to the cooking unit.

Clause 21. A method of cooking food items by using an automated cooking apparatus comprising (1) a storage unit comprising an uncooked food container unit, an insulating enclosure, and a refrigeration unit, (2) a delivery unit, (3) a cooking unit comprising a food transporter comprising a plurality of food compartments, a cooked food receiver, and a cooking tank comprising a cooking tank opening and a plurality of heating elements, and (4) a main controller electronically coupled with the storage unit, the delivery unit, the cooking unit, and the food transporter, the method comprising: positioning the food items in the storage unit; instructing the food transporter by the main controller to align one of the plurality of food compartments with the delivery unit; instructing the delivery unit by the main controller to transfer a portion of the food items from the storage unit to the one of the plurality of food compartments aligned with the delivery unit, such that the portion of food items is positioned within the one of the plurality of food compartments; instructing the food transporter by the main controller to transport the one of the plurality of food compartments through the cooking tank opening and into the cooking tank; and instructing the food transporter by the main controller to transport the one of the plurality of food compartments from the cooking tank to the cooked food receiver and to transfer the portion of food items from the one of the plurality of food compartments to the cooked food receiver.

Clause 22. The method of clause 21, wherein: each one of the plurality of food compartments has a food compartment capacity, the storage unit has a storage unit capacity that is at least 20 times the food compartment capacity, and during the positioning of the food items in the storage unit, the positioned food items have a volume sufficient to fill one of the plurality of food compartments to the capacity of this one of the plurality of food compartments at least 20 times.

Clause 23. The method of clause 21, wherein: a transfer time is defined as the sum of the time elapsing from when a portion of the food is transferred from the storage unit until the portion of food items is transported into the cooking tank and the time elapsing from when the portion of food is transferred from the cooking tank to the cooked food receiver, a cooking time is defined as the time when the portion of food items is in the cooking tank, a time productivity ratio is defined as the ratio of the cooking time to the transfer time, and the time productivity ratio is at least 10.

Clause 24. The method of clause 21, wherein: the uncooked food container unit comprises a container delivery opening aligned with the delivery unit, the automated cooking apparatus further comprises a horizontal belt feeder comprising a flexible belt, a plurality of pulleys, a dozer container, and a dozer container track, wherein: the flexible belt is positioned between the uncooked food container unit and the container delivery opening and moves in translation relative to both the uncooked food container unit and the container delivery opening, the plurality of pulleys is positioned such that the plurality of pulleys supports the flexible belt, the dozer container track comprises a dozer track cover and a dozer track opening, the container delivery opening is aligned with the dozer track opening, the dozer container comprises a first dozer container opening and a second dozer container opening opposite the first dozer container opening and facing the dozer container track, the first dozer container opening is aligned with an end of the flexible belt while the second dozer container opening is aligned with the dozer container cover when the dozer container is in a receiving position, the second dozer container opening is aligned with the dozer track opening when the dozer container is in a delivering position, and when the main controller instructs the delivery unit to transfer a portion of the food items from the storage unit to the one of the plurality of food compartments aligned with the delivery unit, the main controller instructs the horizontal belt feeder to transfer a set portion of food items from the storage unit to the one of the plurality of food compartments.

Clause 25. The method of clause 21, wherein: the storage unit further comprises a cassette comprising a plurality of cassette compartments, a cassette axis, a cassette door, a cassette shroud, and a cassette opening, the cassette opening is an opening in the cassette shroud and is aligned with the container delivery opening, the plurality of cassette compartments is radially arrayed about the cassette axis and rotationally coupled to the cassette, each one of the plurality of cassette compartments comprises a compartment opening, the compartment opening is aligned with the cassette opening when the one of the plurality of cassette compartments is aligned with the cassette opening, the compartment opening of each one of the plurality of cassette compartments is aligned with the cassette shroud when the one of the plurality of cassette compartments is not aligned with the cassette opening, the cassette door is positioned between the one of the plurality of cassette compartments and the cassette opening when the cassette door is in a closed position, the cassette door is not positioned between the one of the plurality of cassette compartments and the cassette opening when the cassette door is in an open position, when the food items are positioned in the storage unit, at least one portion of food is positioned in at least one of the plurality of cassette compartments, and when the main controller instructs the delivery unit to transfer a portion of the food items from the storage unit to the one of the plurality of food compartments, the main controller also instructs the storage unit (1) to rotate the plurality of cassette compartments such that the compartment opening of one of the plurality of cassette compartments in which the portion of the food items is positioned is aligned with the cassette opening, and (2) to open the cassette door.

Clause 26. The method of clause 25, wherein: a first food portion type is positioned in at least one of the plurality of cassette compartments and a second food portion type is positioned in at least one other of the plurality of cassette compartments, and the first food portion type is different from the second food portion type.

Clause 27. The method of clause 21, wherein a cooking medium is positioned within the cooking tank prior to the food transporter transporting the one of the plurality of food compartments through the cooking tank opening and into the cooking tank.

Clause 28. The method of clause 27, wherein a volume of the cooking medium positioned within the cooking tank is such that the portion of food items is immersed in the cooking medium when the one of the plurality of food compartments at least partially protrudes into the cooking tank.

Clause 29. The method of clause 27, further comprising instructing the plurality of heating elements by the main controller to heat the cooking tank, thereby causing evaporation of fluids from within the cooking tank, prior to the positioning of the cooking medium within the cooking tank.

Clause 30. The method of clause 27, wherein: the automated cooking apparatus further comprises a filtration pump fluidically coupled with the cooking tank, a filter housing fluidically coupled with the filtration pump, and a filter positioned within the filter housing, and the method further comprising instructing the filtration pump to transfer a portion of the cooking medium from the cooking tank into the filter housing and through the filter after instructing the food transporter by the main controller to transport the one of the plurality of food compartments through the cooking tank opening and before instructing the food transporter by the main controller to transport the one of the plurality of food compartments from the cooking tank to the cooked food receiver.

Clause 31. The method of clause 21, wherein positioning of the food items in the storage unit positions a bulk quantity of food items sufficient to prepare greater than 50 portions of food items.

Clause 32. The method of clause 21, further comprising instructing the refrigeration unit by the main controller to maintain an air temperature within the insulating enclosure at or below 4° C.

Clause 33. The method of clause 21, further comprising instructing the refrigeration unit by the main controller to maintain an air temperature within the insulating enclosure at or below −18° C.

Clause 34. The method of clause 21, further comprising instructing the plurality of heating elements by the main controller to maintain a cooking medium temperature at or above a set cooking temperature.

Clause 35. The method of clause 34, wherein the set cooking temperature is at least 175° C.

Clause 36. The method of clause 34, wherein the automated cooking apparatus further comprises a cooking unit temperature sensor, a storage unit temperature sensor, and a ventilation unit comprising at least one ventilation fan and a ventilation duct, wherein: the ventilation duct is fluidically coupled with the at least one ventilation fan and the at least one ventilation fan is fluidically coupled with the cooking unit, the storage unit temperature sensor is thermally coupled with a volume of air within the insulating enclosure and electronically coupled with the main controller, and the at least one ventilation fan is instructed by the main controller to withdraw hot air from the cooking unit such that a temperature recorded by the storage unit temperature sensor is maintained at or below a set temperature when the plurality of heating elements maintains a cooking temperature at or above 175° C.

Clause 37. The method of clause 21, further comprising: instructing the delivery unit by the main controller to transfer an additional portion of the food items from the storage unit to one other of the plurality of food compartments, and instructing the food transporter by the main controller to transport the one other of the plurality of food compartments through the cooking tank opening and into the cooking tank before instructing the food transporter by the main controller to transport the one of the plurality of food compartments from the cooking tank to the cooked food receiver.

Clause 38. The method of clause 21, wherein: the cooking unit further comprises a cooking medium temperature sensor positioned within the cooking tank, thermally coupled with the cooking medium, and electronically coupled with the main controller, the main controller records a first cooking temperature measured by the cooking medium temperature sensor when the main controller instructs the food transporter to transport the one of the plurality of food compartments through the cooking tank opening, the main controller records a second cooking temperature measured by the cooking medium temperature sensor after the one of the plurality of food compartments is transported through the cooking tank opening into the cooking tank and before the one of the plurality of food compartments is transported through the cooking tank opening out of the cooking tank, and the second cooking temperature is less than 25° C. different from the first cooking temperature.

Clause 39. The method of clause 38, wherein: the automated cooking apparatus further comprises a filtration unit comprising a filtration pump, a filter housing, and a filter, the filtration pump is fluidically coupled with the cooking tank and the filter housing is fluidically coupled with the filtration pump, the filter is positioned within the filter housing, and the filtration pump is instructed to transfer a portion of the cooking medium from the cooking tank into the filter housing and through the filter, when the first temperature is higher than an ambient temperature.

Clause 40. The method of clause 39, wherein the filter housing is configured to direct the portion of the cooking medium to the cooking tank after the portion of the cooking medium passes through the filter.

Clause 41. The method of clause 21, wherein the food transporter is configured to position each one of the plurality of food compartments in one of a food-receiving position within the cooking unit, a food-cooking position within the cooking tank, and a food-delivering position within the cooking unit.

Clause 42. The method of clause 41, wherein: each one of the plurality of food compartments comprises a basket opening, and each one of the plurality of food compartments is configured to adopt an orientation when this one of the plurality of food compartments is positioned in the food-delivering position such that the basket opening permits food to pass out of the one of the plurality of food compartments.

Clause 43. The method of clause 21, wherein the automated cooking apparatus further comprises a manual bypass unit comprising a manual bypass tray configured such that, when the manual bypass tray is opened, food items are placed in the manual bypass tray, and the manual bypass tray is closed, the food transporter is instructed by the main controller to align one of the plurality of food compartments with the manual bypass tray and the manual bypass tray is instructed by the main controller to transfer the portion of the food items from the manual bypass tray to the one of the plurality of food compartments aligned with the manual bypass unit.

Clause 44. A cooking apparatus battery comprising two or more automated cooking apparatuses for storing and cooking food items, wherein each automated cooking apparatus comprises: a storage unit comprising an insulating enclosure, a refrigeration unit, and an uncooked food container unit positioned within the insulating enclosure and comprising a container delivery opening; a delivery unit aligned with the container delivery opening; and a cooking unit comprising (1) a food transporter comprising a plurality of food compartments, (2) a cooking tank comprising a cooking tank opening and a plurality of heating elements, and (3) a cooked food receiver, wherein: the delivery unit is positioned between the uncooked food container unit and the cooking tank and configured to load a set amount of the food items into each one of the plurality of food compartments, the food transporter is configured to transport each one of the plurality of food compartments from the delivery unit through the cooking tank opening into the cooking tank and from the cooking tank to the cooked food receiver, and the uncooked food container unit is positioned proximate to the cooking tank.

Clause 45. The cooking apparatus battery of clause 44, further comprising a main controller electronically coupled to the storage unit, the delivery unit, and the cooking unit of each one of the two or more automated cooking apparatus.

Clause 46. The cooking apparatus battery of clause 44, wherein at least one of the two or more automated cooking apparatuses further comprises a horizontal belt feeder comprising a flexible belt, a plurality of pulleys, a dozer container, and a dozer container track, wherein: the flexible belt is positioned between the uncooked food container unit and the container delivery opening and moves in translation relative to both the uncooked food container unit and the container delivery opening, the plurality of pulleys is positioned such that the plurality of pulleys supports the flexible belt, the dozer container track comprises a dozer container cover and a dozer track opening, the container delivery opening is aligned with the dozer track opening, the dozer container comprises a first dozer container opening and a second dozer container opening opposite the first dozer container opening and facing the dozer container track, the first dozer container opening is configured to align with an end of the flexible belt and second dozer container opening is configured to align with the dozer container cover when the dozer container is in a receiving position, and the second dozer container opening is configured to align with the dozer track opening when the dozer container is in a delivering position.

Clause 47. The cooking apparatus battery of clause 46, wherein at least a portion of the horizontal belt feeder is positioned within the insulating enclosure.

Clause 48. The cooking apparatus battery of clause 46, wherein at least one of the two or more automated cooking apparatuses comprises a horizontal belt feeder and at least one other of the two or more automated cooking apparatuses comprises a cassette.

Clause 49. The cooking apparatus battery of clause 44, wherein at least one of the two or more automated cooking apparatuses further comprises a cassette comprising a plurality of cassette compartments, a cassette axis, a cassette door, a cassette shroud, and a cassette opening, wherein: the cassette opening is an opening in the cassette shroud and is aligned with the container delivery opening, the plurality of cassette compartments is radially arrayed about the cassette axis and rotationally coupled to the cassette, each one of the plurality of cassette compartments comprises a compartment opening, the compartment opening is aligned with the cassette opening when the one of the plurality of cassette compartments is aligned with the cassette opening, the compartment opening of each one of the plurality of cassette compartments is aligned with the cassette shroud when the one of the plurality of cassette compartments is not aligned with the cassette opening, and the cassette door is positioned between the one of the plurality of cassette compartments and the cassette opening when the cassette door is in a closed position and is not positioned between the one of the plurality of cassette compartments and the cassette opening when the cassette door is in an open position.

Clause 50. The cooking apparatus battery of clause 49, wherein the cassette is positioned within the insulating enclosure.

Clause 51. The cooking apparatus battery of clause 44, wherein at least one of the two or more cooking apparatuses comprises: an apparatus axis intersecting both the storage unit and the cooking unit, a transporter chain axis having an angle to the apparatus axis of less than 60 degrees, wherein: the food transporter comprises a transporter chain, each one of the plurality of food compartments is mechanically coupled to the transporter chain, and at least a portion of the transporter chain is aligned with the transporter chain axis.

Clause 52. The cooking apparatus battery of clause 44, wherein at least one of the two or more cooking apparatuses further comprises a ventilation unit comprising at least one ventilation fan and a ventilation duct, wherein: the ventilation duct is fluidically coupled with the at least one ventilation fan and the at least one ventilation fan is fluidically coupled with the cooking unit, and the ventilation fan is configured to withdraw a volume of hot air from the cooking unit and expel the volume of hot air into the ventilation duct.

Clause 53. The cooking apparatus battery of clause 44, wherein the insulating enclosure of at least one of the automated cooking apparatuses comprises an insulating enclosure opening aligned with the container delivery opening.

Clause 54. The cooking apparatus battery of clause 44, wherein the refrigeration unit of at least one of the automated cooking apparatuses comprises a compressor, a condenser coil, an evaporator, and a circulation fan, wherein: the compressor, the condenser coil, and the evaporator are fluidically coupled, and the circulation fan is configured to circulate air within the insulating enclosure and over the evaporator, thereby maintaining the air within the insulating enclosure below an ambient temperature.

Clause 55. The cooking apparatus battery of clause 44, wherein: the container delivery opening has a plane and a cross-sectional area in the plane, the uncooked food container unit has a first food container unit side opposite the container delivery opening, the first food container unit side has an area in a plane parallel with the plane of the container delivery opening, and the cross-sectional area of the container delivery opening is smaller than the cross-sectional area of the first food container unit side.

Clause 56. The cooking apparatus battery of clause 44, wherein each one of the plurality of food compartments is configured to form a food compartment opening when this one of the plurality of food compartments is in one of a food-receiving position or a food-delivering position within the cooking unit.

Clause 57. The cooking apparatus battery of clause 44, wherein the cooking unit of at least one of the two or more cooking apparatuses further comprises a manual bypass.

Clause 58. The cooking apparatus battery of clause 44, further comprising an external auxiliary transporter configured to receive portions of cooked food from at least two of the automated cooking apparatuses.

Clause 59. The cooking apparatus battery of clause 44, wherein the cooking tank of at least one of the two or more automated cooking apparatus is fluidically coupled with the cooking tank of at least one other of the two or more automated cooking apparatuses.

Clause 60. The cooking apparatus battery of clause 44, wherein the food transporter of at least one of the two or more automated cooking apparatuses is configured to position each one of the plurality of food compartments in one of a food-receiving position within the cooking unit, a food-cooking position within the cooking tank, and a food-delivering position within the cooking unit.

Clause 61. The cooking apparatus battery of clause 60, wherein: each one of the plurality of food compartments is configured to comprise a basket opening when this one of the plurality of food compartments is positioned in the food-delivering position, and each one of the plurality of food compartments is configured to adopt an orientation when this one of the plurality of food compartments is positioned in the food-delivering position such that the basket opening permits food to exit the one of the plurality of food compartments.

Clause 62. The cooking apparatus battery of clause 44, further comprising a cooked food receiver configured to receive food portions from at least two of the automated cooking apparatuses.

These and other embodiments are described further below with reference to the figures.

BRIEF DESCRIPTION OF THE DRAWINGS

The included drawings are for illustrative purposes and serve only to provide examples of possible structures and operations for the disclosed inventive systems, apparatus, and methods. These drawings in no way limit any changes in form and detail that may be made by one skilled in the art without departing from the spirit and scope of the disclosed implementations.

FIGS. 6A-6F are schematic isometric views of the cassette 250, in accordance with some examples.

DETAILED DESCRIPTION

Introduction

As noted above, automated cooking apparatuses may provide solutions to challenges in the food service industry, including labor costs, efficiency pressures, and the need for high product consistency for food products varying in cooking requirements. However, as also noted above, automation elements added to otherwise conventional, manually operated equipment tend to be expensive and large. Likewise, automated cooking systems, for example frying systems, with continuous horizontal passage of uncooked food products through cooking medium such as frying oil may require an extensive footprint in the food service operation.

Described herein are automated cooking apparatuses for storing and cooking food items as well as methods of operating such apparatuses. In some examples, an automated cooking apparatus comprises a storage unit, a delivery unit, and a cooking unit. The storage unit may be equipped with a refrigeration unit and a container delivery opening. The delivery unit is aligned with this opening and configured to load a set amount of the food items into each food compartment of the cooking unit. The cooking unit moves its food compartments through a cooking tank (e.g., filled with a cooking medium and heated using a set of heating elements) and into a cooked food receiver. The storage unit or, more specifically, its uncooked food container unit is positioned proximate (e.g., within 200 millimeters) to the cooking tank thereby reducing the time for transporting the food items relative to the cooking time. Additionally, the proximity of the uncooked food container to the cooking tank enables installation of the apparatuses in a wide variety of existing and new food service operations without infrastructure revisions.

Examples of Automated Cooking Apparatuses

Figure 1:
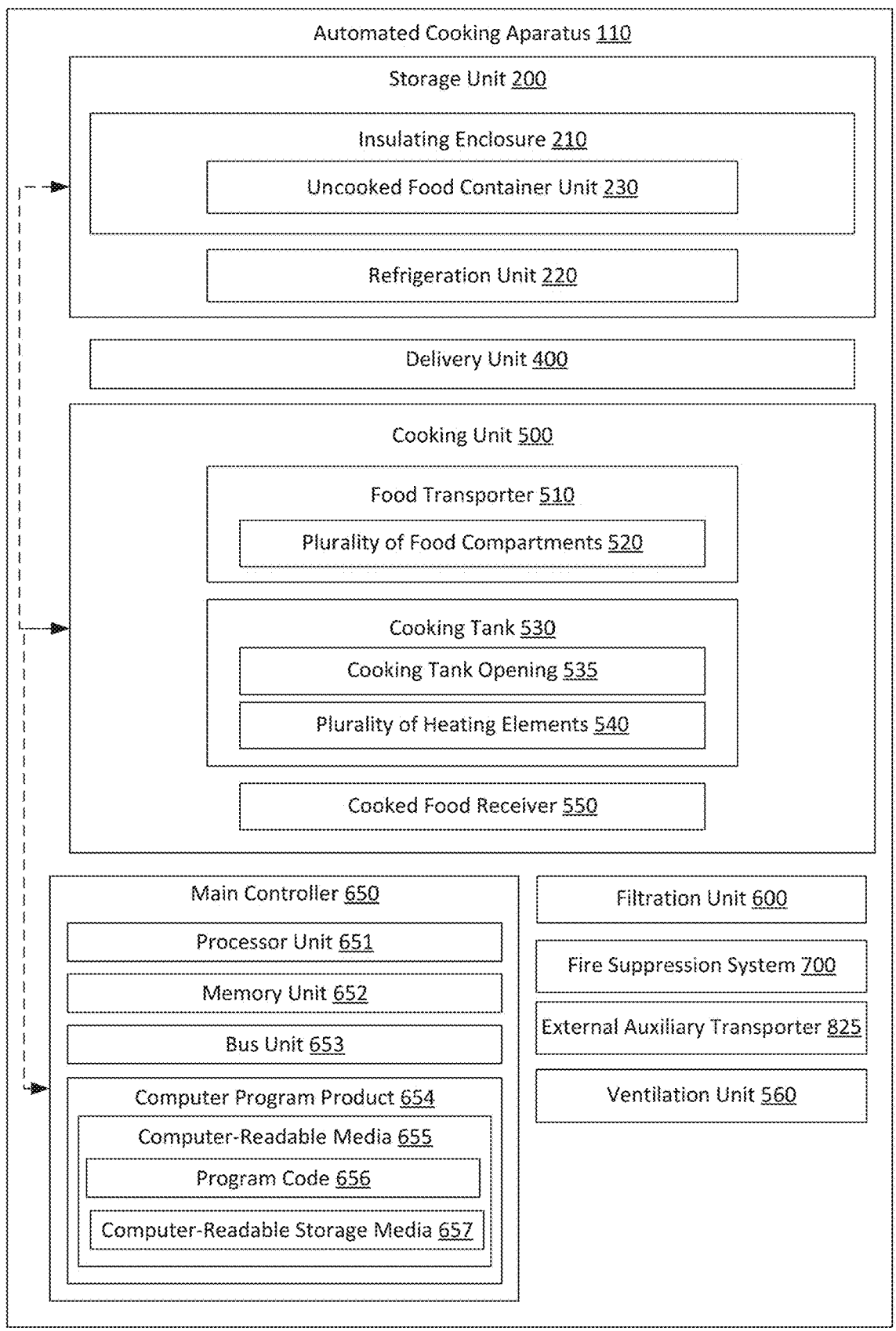
FIG. 1 is a schematic block diagram illustrating relationships between some components of an automated cooking apparatus 110 for storing and cooking food items, in accordance with some examples.

FIG. 1 is a schematic block diagram illustrating relationships between some components of an automated cooking apparatus 110 for storing and cooking food items, in accordance with some examples. The automated cooking apparatus 110 comprises a storage unit 200, a delivery unit 400, and a cooking unit 500.

Figure 5:
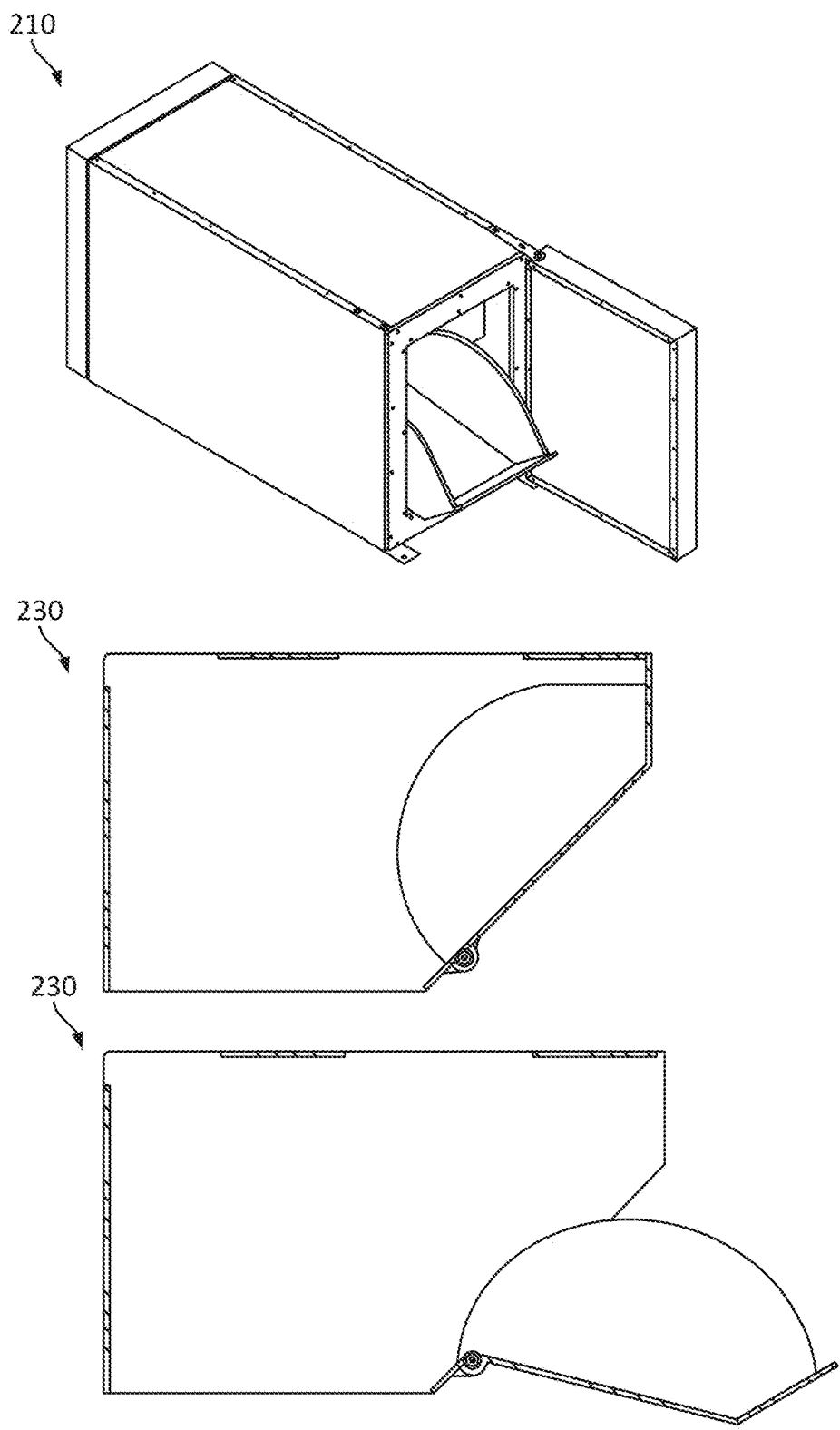
FIG. 5 is a schematic isometric view and two schematic side views of the insulating enclosure 210 and the uncooked food container unit 230, in accordance with some examples.

The storage unit 200 comprises an insulating enclosure 210, an uncooked food container unit 230, and a refrigeration unit 220. The uncooked food container unit 230 is positioned within the insulating enclosure 210. FIG. 5 is a schematic isometric view and two schematic side views of the insulating enclosure 210, in accordance with some examples.

The cooking unit 500 comprises a food transporter 510, a cooking tank 530, and a cooked food receiver 550. The food transporter 510 comprises a plurality of food compartments 520. The cooking tank 530 comprises a cooking tank opening 535 and a plurality of heating elements 540.

Figure 2A:
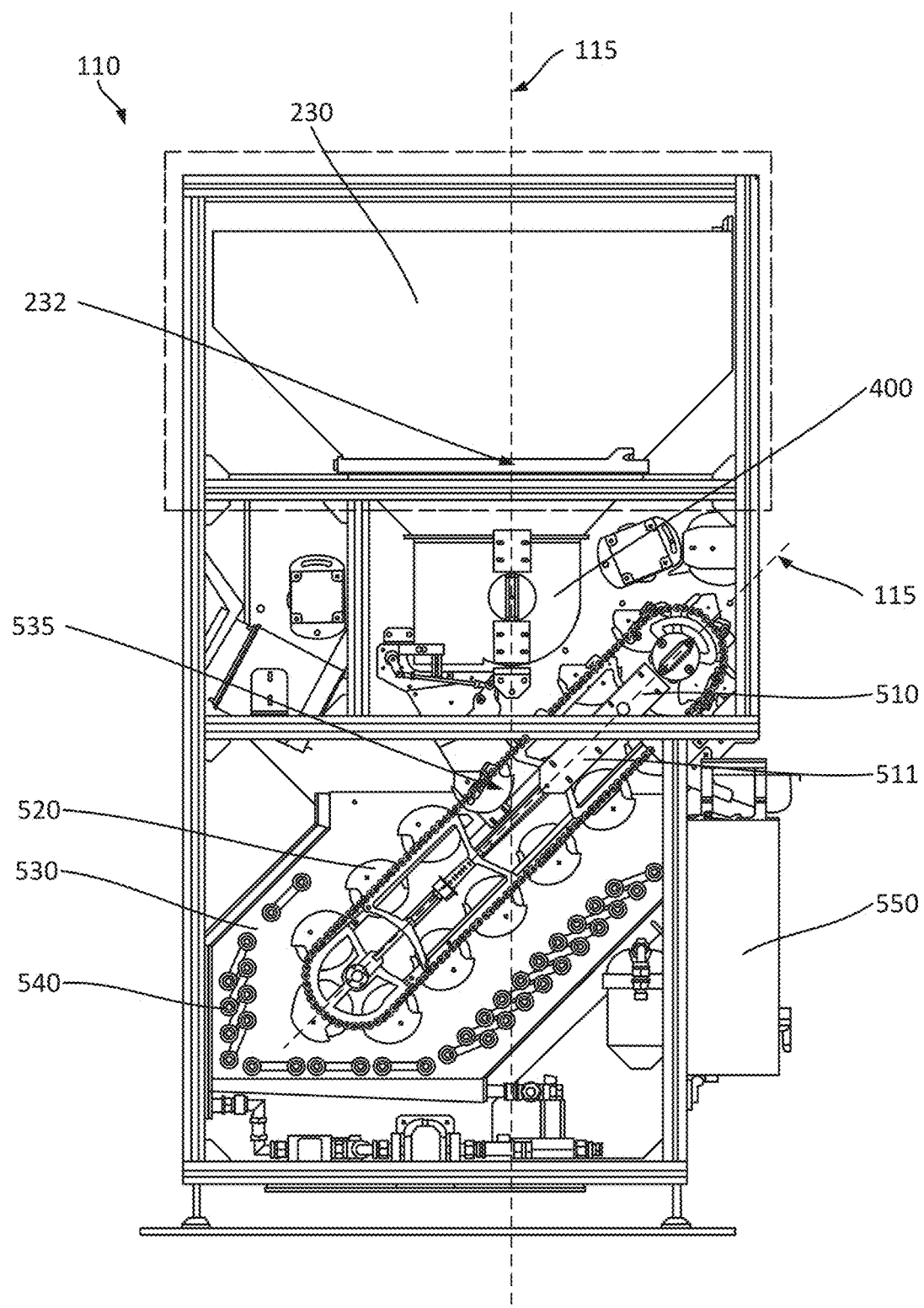
FIG. 2A is a schematic side view of an automated cooking apparatus 110, in accordance with some examples.
Figure 2B:
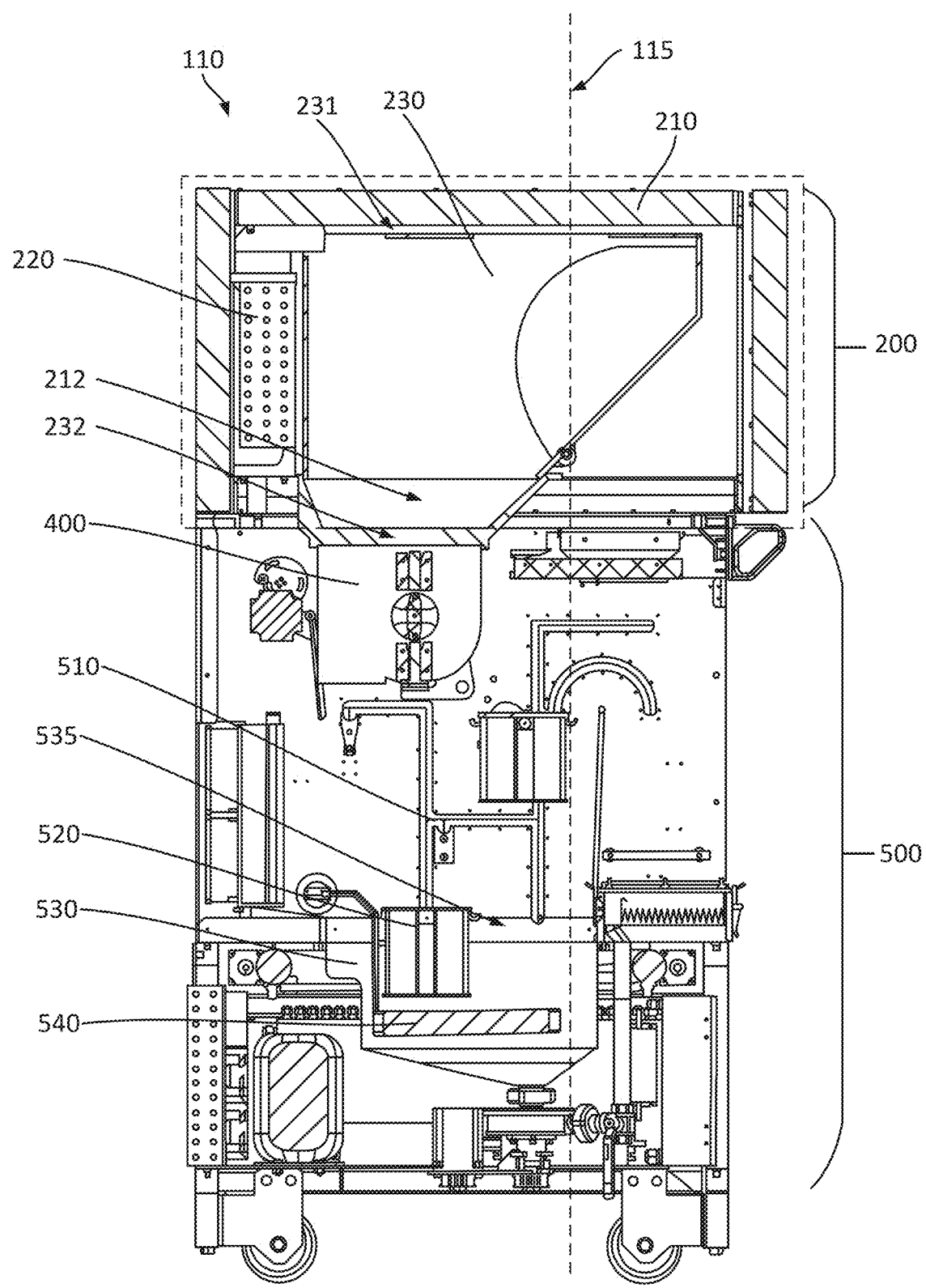
FIG. 2B is also a schematic side view of an automated cooking apparatus 110, in accordance with some examples.

FIG. 2A is a schematic side view of an automated cooking apparatus 110, in accordance with some examples. FIG. 2B is also a schematic side view of an automated cooking apparatus 110, in accordance with some examples. As illustrated in FIGS. 2A and 2B, the uncooked food container unit 230 comprises a container delivery opening 232 positioned on a side of the uncooked food container unit 230 facing the cooking unit 500. The insulating enclosure 210 comprises an insulating enclosure opening 212 aligned with the container delivery opening 232. Also as illustrated in FIGS. 2A and 2B, the cooking tank opening 535 is positioned on a side of the cooking unit 500 that faces the uncooked food container unit 230. The delivery unit 400 is aligned with the container delivery opening 232. As also illustrated in FIGS. 2A and 2B, the delivery unit 400 is positioned between the uncooked food container unit 230 and the cooking tank 530. The delivery unit 400 is configured to load a set amount of food items, stored within the uncooked food container unit 230, into each one of the plurality of food compartments 520. In some examples, some components of delivery unit 400 are positioned within the insulating enclosure 210. In some other examples, all components of the delivery unit 400 are positioned within the insulating enclosure 210.

The food transporter 510 is configured to transport each one of the plurality of food compartments 520 from the delivery unit 400 through the cooking tank opening 535 into the cooking tank 530. The food transporter 510 is also configured to transport each one of the plurality of food compartments 520 from the cooking tank 530 to the cooked food receiver 550.

Figure 2C:
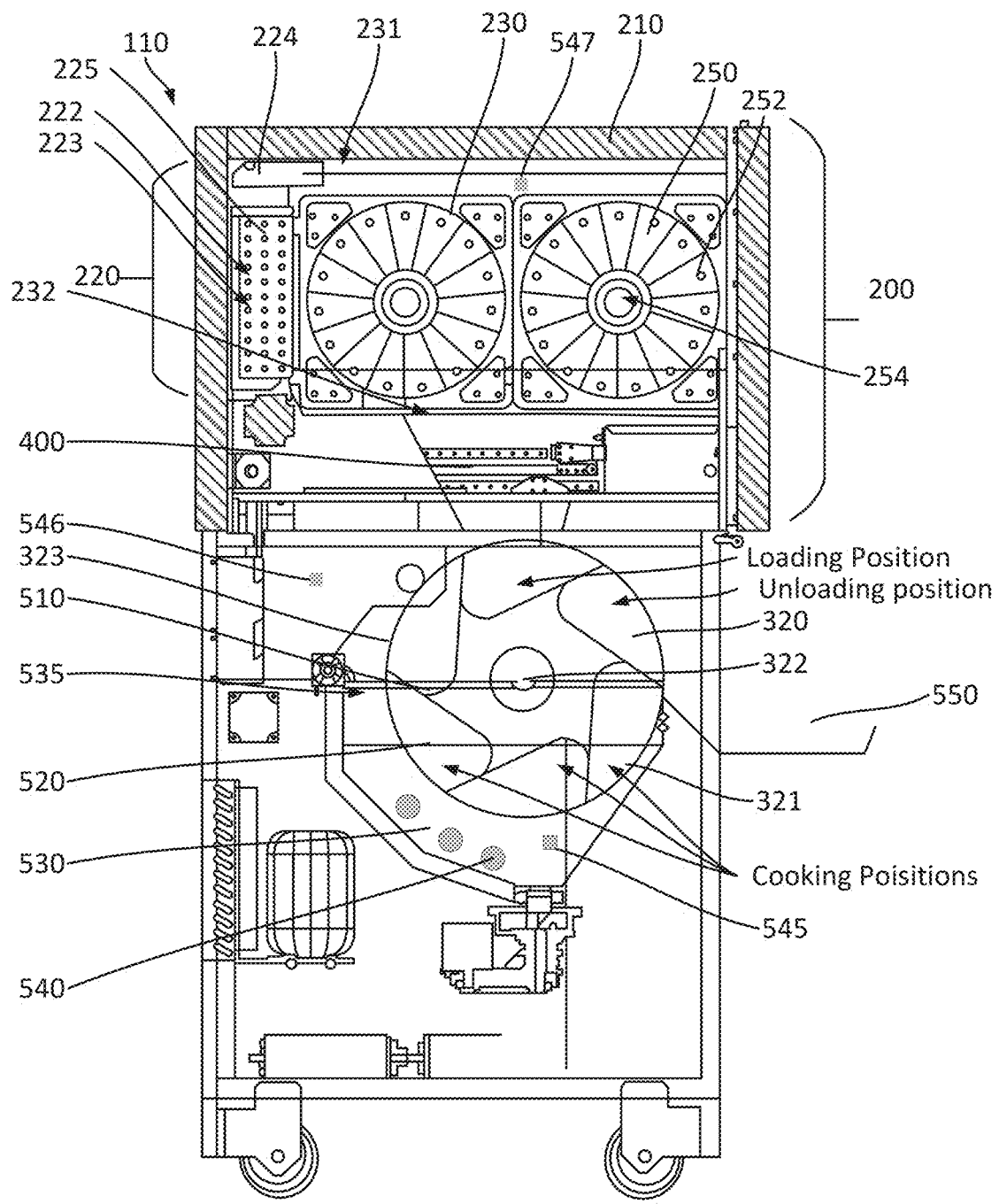
FIG. 2C is a schematic side view of an automated cooking apparatus 110, in accordance with some examples.

The cooked food receiver 550 is configured to receive food transported from the cooking tank 530 by the food transporter 510 and positioned in the cooked food receiver 550. Examples of the cooked food receiver 550 are illustrated in FIGS. 2A and 2C. In some examples, the cooked food receiver 550 is affixed to the automated cooking apparatus 110. In some examples, the cooked food receiver 550 can be detached from the automated cooking apparatus 110. In some examples, the cooked food receiver 550 has a distance measured from the floor that is 600 millimeters, 650 millimeters, 700 millimeters, 760 millimeters, or even 850 millimeters. In some examples, the cooked food receiver 550 has a height measured from a floor that the automated cooking apparatus 110 is installed on that is less than or equal to 900 millimeters, less than or equal to 800 millimeters, or even less than or equal to 730 millimeters. In some examples, the cooked food receiver 550 has a height measured from the floor that is a working counter height or standing counter height. In some examples, the cooked food receiver 550 is heated. cooked food receiver 550 configured to receive food portions from at least two of the automated cooking apparatuses 110. In some examples, the cooked food receiver 550 is affixed to at least one of the automated cooking apparatuses 110 of the cooking apparatus battery 800.

The uncooked food container unit 230 is positioned proximate to the cooking tank 530. In some examples, the uncooked food container unit 230 is positioned such that a distance between the container delivery opening 232 and the cooking tank opening 535 is less than 200 millimeters. In some examples, the distance between the container delivery opening 232 and the cooking tank opening 535 may be greater than 150 millimeters, greater than 250 millimeters, greater than 450 millimeters, or even greater than 500 millimeters. In some examples the distance between the container delivery opening 232 and the cooking tank opening 535 may be less than 680 millimeters, less than 500 millimeters, less than 380 millimeters, or even less than 250 millimeters. Food items are stored, transported for cooking, and cooked within the automated cooking apparatus 110 (i.e. without food products being transported outside of the 110 until after they have been cooked).

In some examples, when the apparatus axis 115 is oriented substantially parallel with a gravitational vertical the automated cooking apparatus 110 projects a footprint on a surface supporting the automated cooking apparatus 110. The footprint has a width of between 300-425 millimeters, between 375-475 millimeters, or even between 400-500 millimeters. The footprint has a depth, measured perpendicular to the width, of between 800-1000 millimeters, between 900-1150 millimeters, or even between 900-1250 millimeters. A footprint with such dimensions overlaps with a footprint of traditional (non-automated) cooking appliances such as single vat fryers, thereby enabling installation of the automated cooking apparatus 110 into a variety of existing and new foodservice locations.

In some examples, the automated cooking apparatus 110 comprises an apparatus axis 115 intersecting both the storage unit 200 and the cooking unit 500, as shown in FIGS. 2A and 2B. As shown in FIG. 2A, in some further examples, the automated cooking apparatus 110 also comprises a transporter chain axis 517. The transporter chain axis 517 has an angle θ to the apparatus axis 115 of less than 60 degrees. In some examples, θ is greater than 15 degrees, greater than 30 degrees, greater than 40 degrees, or even greater than 70 degrees. In some examples, θ is less than 90 degrees, less than 65 degrees, less than 40 degrees, or even less than 20 degrees. In these examples, the food transporter 510 comprises a transporter chain 515 and each one of the plurality of food compartments 520 is mechanically coupled to the transporter chain 515. At least a portion of the transporter chain 515 is aligned with the transporter chain axis 517. Movement of the transporter chain 515 in either direction transports each one of the plurality of food compartments 520 between different positions within the cooking unit 500. In some examples, the transporter chain axis 517 is parallel with the apparatus axis 115.

Examples of Food Transporters

In some examples, the food transporter 510 comprises a food transporter frame 511. The food transporter frame 511 comprises a plurality of food transporter gears 512 rotatably affixed to the food transporter frame 511. The plurality of food transporter gears 512 are mechanically coupled to the transporter chain 515. In some examples, the food transporter 510 further comprises an additional transporter chain 516, which is mechanically coupled to the plurality of food transporter gears 512. In some further examples, the transporter chain 515 and the additional transporter chain 516 wrap around at least a portion of one of the plurality of food transporter gears 512 and extend between two or more of the plurality of food transporter gears 512. In the example illustrated in FIG. 2A, the food transporter 510 is shown in profile and the transporter chain 515 is shown wrapping around portions of and extending between two of the plurality of food transporter gears 512. However, other configurations of the transporter chain 515, the plurality of food transporter gears 512, and the additional transporter chain 516, if present, are within the scope. In some examples, the food transporter frame 511 is affixed to the cooking unit 500 via a plurality of quick-release couplings, the plurality of quick-release couplings simplifying removal of the food transporter 510 from the cooking unit 500 for cleaning, maintenance, and replacement. In some examples, the food transporter 510 has a longest dimension that is sufficiently short that the food transporter 510 may fit into a commercial door-type dishwasher for cleaning.

The transporter chain 515 comprises a plurality of mounting fittings. Each one of the plurality of mounting fittings may rotatably couple one of the plurality of food compartments 520 to the transporter chain 515. Each one of the plurality of mounting fittings may have one of the plurality of food compartments 520 attached to it. The plurality of mounting fittings may comprise sufficient mounting fittings for attachment of one food compartment, two or more food compartments, four or more food compartments, ten or more food compartments, or even fourteen or more food compartments. Less than each of the plurality of mounting fittings may have one of the plurality of food compartments 520 attached to it, depending on the production needs of the automated cooking system.

In some examples, each one of the plurality of food compartments 520 has sufficient capacity to contain a single portion of the food products. The plurality of food compartments 520 is formed from a food safe material with a sufficiently high operating temperature to be safely immersed in a hot cooking medium such as boiling water or frying oil. In some examples, the plurality of food compartments 520 is formed from a stainless steel.

Figure 3A:
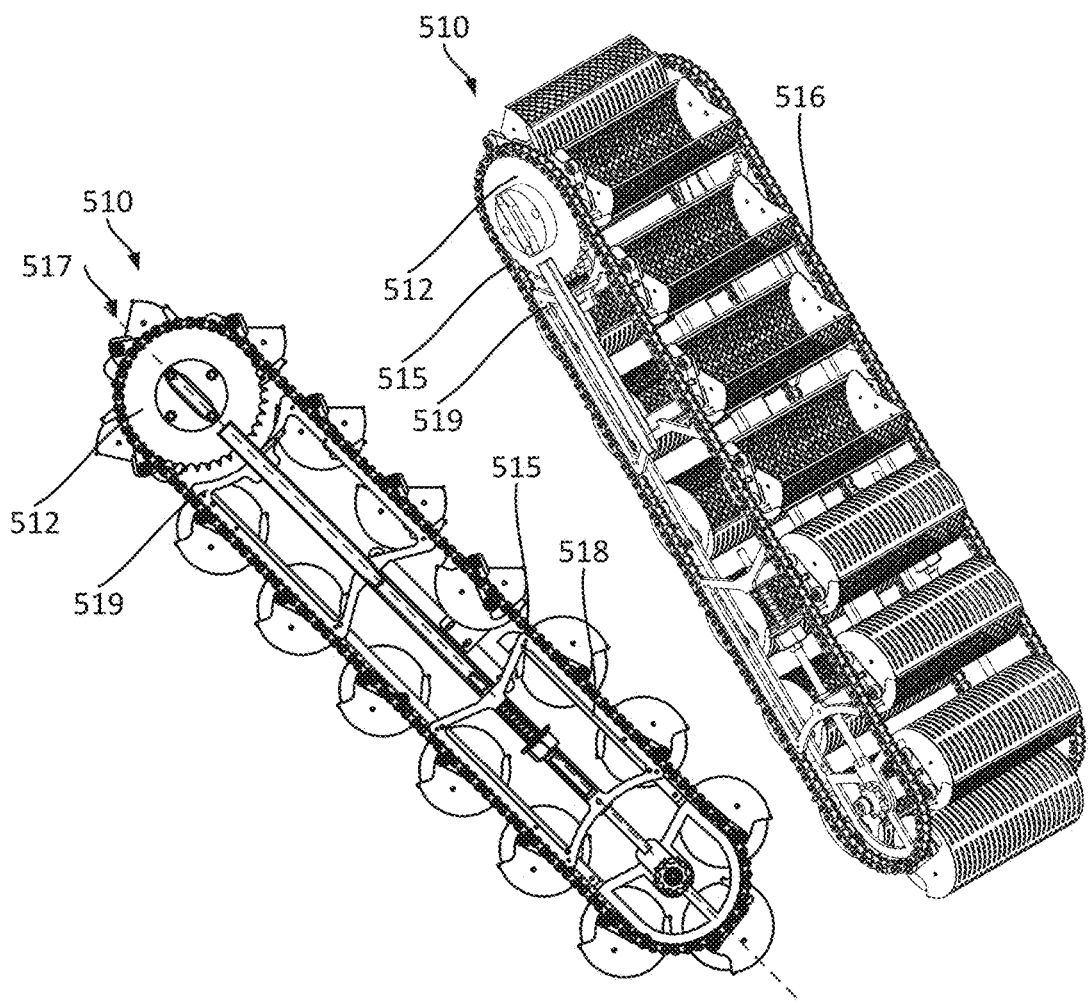
FIG. 3A is an isometric view and a side view showing the food transporter 510, in accordance with some examples.
Figure 3B:
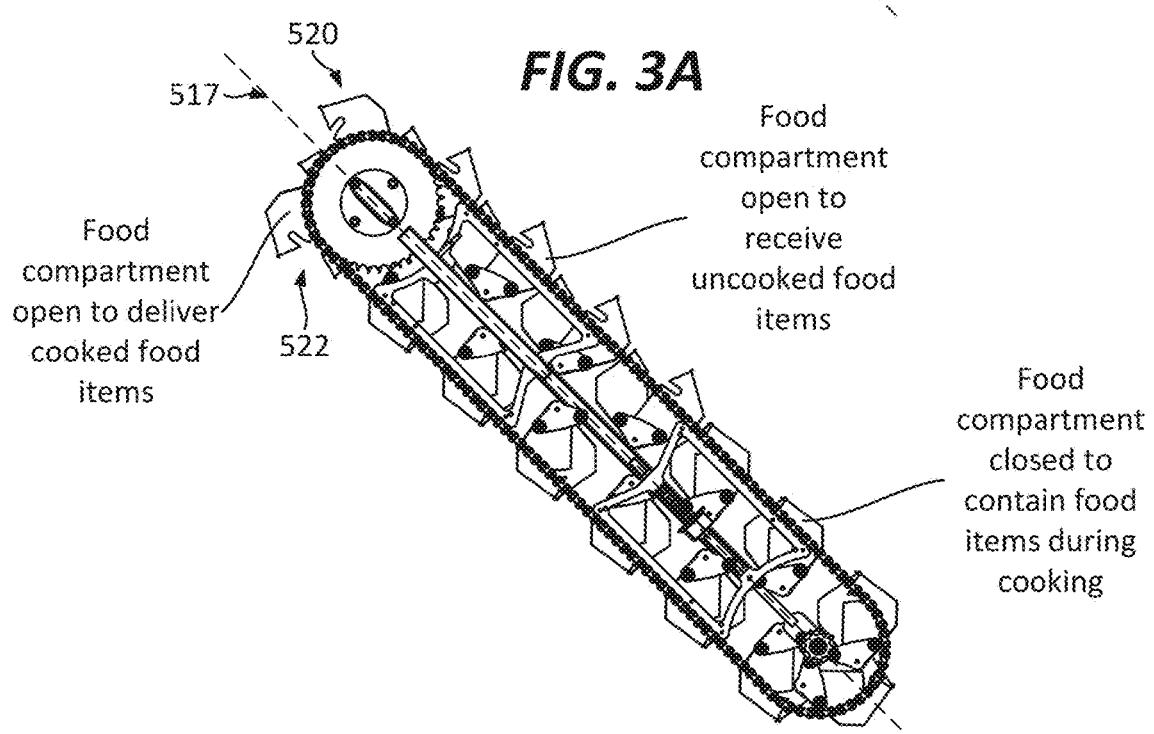
FIG. 3B is a side view showing the food transporter 510, in accordance with some examples.

FIG. 3A is an isometric view showing the food transporter 510, in accordance with some examples. The attachment of the plurality of food compartments 520 to the transporter chain 515 is illustrated in FIG. 3A. FIG. 3B is a side view showing the food transporter 510, in accordance with some examples. In some examples, each one of the plurality of food compartments 520 is configured to close when positioned within the cooking tank 530, to open after exiting the cooking tank 530, and to be open when aligned with the delivery unit 400. In some examples, each one of the plurality of food compartments 520 is configured to be open when aligned with the container delivery opening 232. Each one of the plurality of food compartments 520 that is closed when positioned within the cooking tank 530 assures secure passage of the food items through a cooking medium that may be positioned within the cooking tank 530. For example, water boiling out of food items when they are immersed in frying oil positioned within the cooking tank 530 can cause vigorous agitation and even flotation of food items within the cooking medium. A closed food compartment secures the food within the food compartment during cooking. Opening after exiting the cooking tank 530 enables each one of the plurality of food compartments 520 to deliver cooked food items to another component of the automated cooking apparatus 110, for example, an intermediate storage tray or container, heated storage tray or container, or onto an external transporter. Each one of the plurality of food compartments 520 that is open when aligned with the delivery unit 400 is enabled to receive uncooked food items from the delivery unit 400.

Figure 3C:
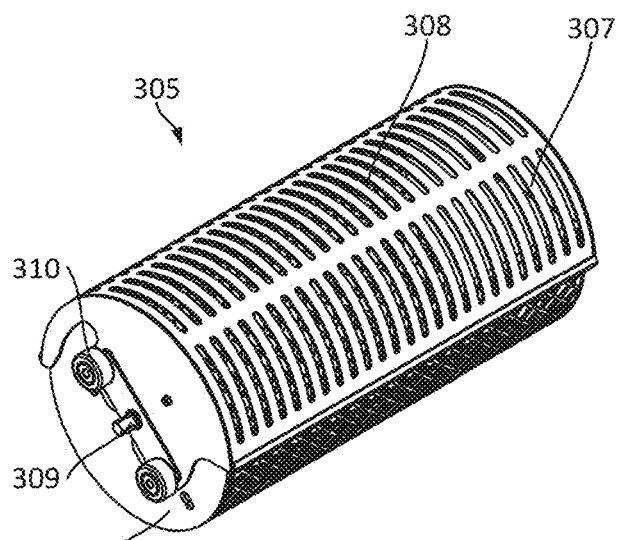
FIG. 3C is an isometric view of one round food container 305, in a closed configuration, in accordance with some examples.
Figure 3E:
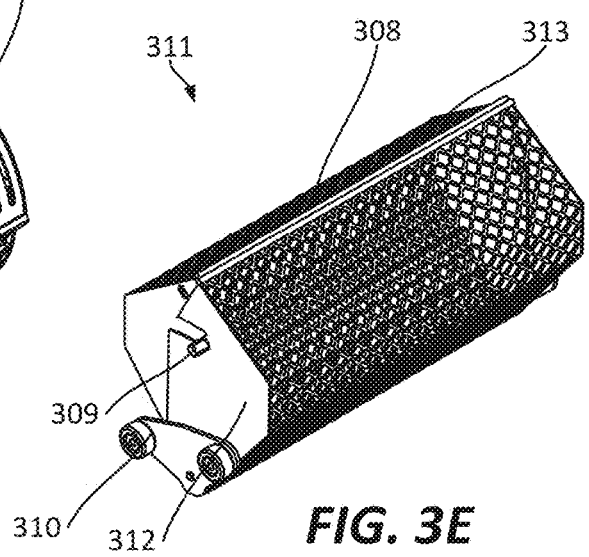
FIG. 3E is an isometric view of one hexagonal food container 311, in a closed configuration, in accordance with some examples.
Figure 3D:
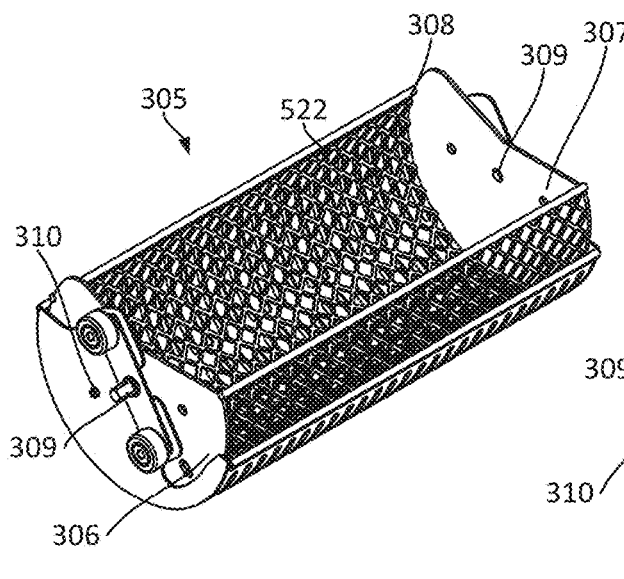
FIG. 3D is an isometric view of one round food container 305, in an open configuration, in accordance with some examples.

In some examples, at least one of the plurality of food compartments 520 is a round food container 305. FIG. 3C is an isometric view of one round food container 305, in a closed configuration, in accordance with some examples. FIG. 3D is an isometric view of the round food container 305 shown in FIG. 3C, in an open configuration, in accordance with some examples. The one round food container 305 illustrated in FIGS. 3C and 3D comprises a stationary basket 306, a basket cover 307, a plurality of basket perforations 308, a pair of mounting pins 309, and a pair of position change cams 310. The one round food container 305 has a first side and a second side opposite the first side. The mounting pins 309 are configured to enable attachment of the self-closing round fry baskets to transporter chain 515. One of the mounting pins 309 is affixed to the first side, and the other of the mounting pins 309 is affixed to the second side. Portions of both the stationary basket 306 and the basket cover 307 extend between the first side and the second side. These portions are hemicylindrical in shape. The hemicylindrical portion of the basket cover 307 has an outer radius and the hemicylindrical portion of the stationary basket 306 has an inner radius. The outer radius is smaller than the inner radius. The one round food container 305 has an axis intersecting both of the mounting pins 309. The basket cover 307 is rotatably coupled to the stationary basket 306 such that it rotates about the axis relative to the stationary basket 306, thereby creating a food compartment opening 522 in the open configuration, and closing the one round food container 305 in the closed configuration. A plurality of basket perforations 308 enables cooking medium unobstructed recirculation within and around the one round food container 305 when the one round food container 305 is immersed in cooking medium. The plurality of basket perforations 308 may pierce the stationary basket 306, the basket cover 307, or both the stationary basket 306 and the basket cover 307.

In some examples, the food transporter frame 511 further comprises a plurality of guides 518 and a plurality of senders 519. Returning to FIGS. 3A and 3B. As the food transporter 510 transports the one round food container 305 in a closed configuration out of the cooking tank 530, the plurality of senders engage the position change cams, thereby pushing basket cover 307 into the open configuration. When the one round food container 305 passes the plurality of guides on the food transporter frame 511, the plurality of guides engage the position change cams, thereby pushing basket cover 307 into the closed configuration.

Figure 3F:
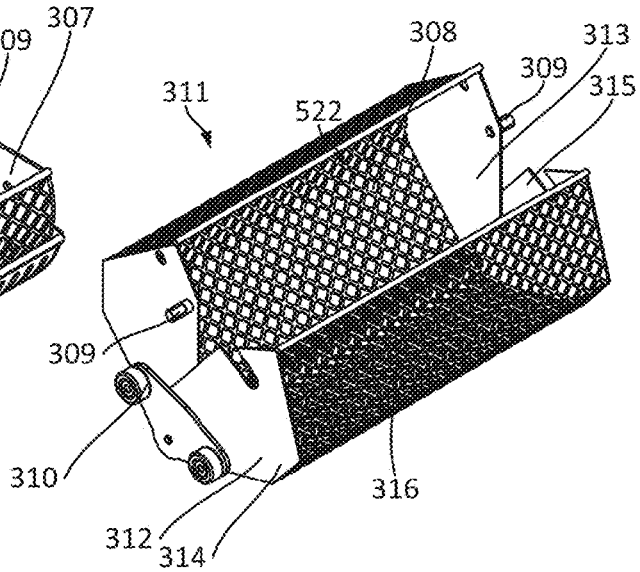
FIG. 3F is an isometric view of one hexagonal food container 311, in an open configuration, in accordance with some examples.

In some examples, at least one of the plurality of food compartments 520 is a hexagonal food container 311. FIG. 3E is an isometric view of one hexagonal food container 311, in a closed configuration, in accordance with some examples. FIG. 3F is an isometric view of the hexagonal food container 311 shown in FIG. 3C, in an open configuration, in accordance with some examples. The hexagonal food container 311 comprises a first hexagonal basket half 312 and a second hexagonal basket half 313. Both the first hexagonal basket half 312 and the second hexagonal basket half 313 comprise a first hexagonal side 314 and a second hexagonal side 315, opposite the first hexagonal side 314. Extending between the first hexagonal side 314 and the second hexagonal side 315 of each of the first hexagonal basket half 312 and the second hexagonal basket half 313 are three rectangular sides. The first hexagonal basket half 312 and the second hexagonal basket half 313 are rotatably coupled by a hexagonal basket hinge 316. A plurality of basket perforations 308 enables cooking medium unobstructed recirculation within and around the hexagonal food container 311 when the hexagonal food container 311 is immersed in cooking medium. The plurality of basket perforations 308 may pierce the first hexagonal basket half, the second hexagonal basket half, or both. The hexagonal basket hinge 316 enables the first hexagonal basket half 312 and the second hexagonal basket half 313 to close against one another in the closed configuration, and partially separate, creating a food compartment opening 522, in the open configuration. A length of the rectangular sides extending between the first hexagonal side 314 and the second hexagonal side 315 of the second hexagonal basket half 313 is less than a length of the rectangular sides extending between the first hexagonal side 314 and the second hexagonal side 315 of the first hexagonal basket half 312. This enables the second hexagonal basket half 313 to partially nest within the first hexagonal basket half 312 when the hexagonal food container 311 is in the open configuration. The mounting pins 309 are positioned, one on the first hexagonal side 314 of the second hexagonal basket half 313 and one on the second hexagonal side 315 of the second hexagonal basket half 313, such that, when the basket halves move to the closed configuration, both pins enter a corresponding cutout on the first hexagonal side 314 and the second hexagonal side 315 of the first hexagonal basket half 312. The engagement of the mounting pins 309 with the cutouts enables secure connection between the basket halves in the closed configuration.

As the food transporter 510 transports the hexagonal food container 311 in a closed configuration out of the cooking tank 530, the plurality of senders engage the position change cams, thereby pushing first hexagonal basket half 312 and second hexagonal basket half 313 apart and into the open configuration. When the hexagonal food container 311 passes the plurality of guides on the food transporter frame 511, the plurality of guides engage the position change cams, thereby pushing first hexagonal basket half 312 and second hexagonal basket half 313 together into the closed configuration.

In some examples, at least one of the plurality of food transporter gears 512 is mechanically coupled with a food transporter motor, which is electronically coupled with a main controller 650. In some examples, the transporter motor may be used transport the plurality of food compartments 520 not only between positions within the cooking unit 500, but also to move one or more of the plurality of food compartments 520 in a way that agitates the food items positioned within one or more of the plurality of food compartments 520 during the cooking process. Agitating the food items may desirably improve cooking performance, for example by preventing clumping of food items and ensuring uniform cooking of the food items.

FIG. 2B is a schematic side view of an automated cooking apparatus 110, in accordance with some examples. As shown in FIG. 2B, in some examples, the food transporter 510 is a robotic spatial transfer mechanism comprising a plurality of food compartments 520 and a trackway. Each one of the plurality of food compartments 520 is mechanically coupled with the trackway. The trackway transports each one of the plurality of food compartments 520 between a loading position, where food items can be positioned in one of the plurality of food compartments 520 by the delivery unit 400, a holding position, a cooking position, where one of the plurality of food compartments 520 is at least partially transported through the cooking tank opening 535 and into the cooking tank 530, and a product unloading position, where food items may be deposited from one of the plurality of food compartments 520. In the example shown in FIG. 2B, the robotic spatial transfer mechanism comprises a plurality of food compartments 520 comprising two food compartments. In this example, one of the plurality of food compartments 520 may be in any of the four positions at one time, with the exception that two of the plurality of food compartments 520 may be in the cooking position at one time. Two portions of food items may thereby be cooked simultaneously in parallel, one after the other, or with cooking times overlapping. In some examples, the robotic spatial transfer mechanism agitates any one of the plurality of food compartments 520 in the cooking position, thereby preventing clumping of food items.

Figures 9A, 9B:
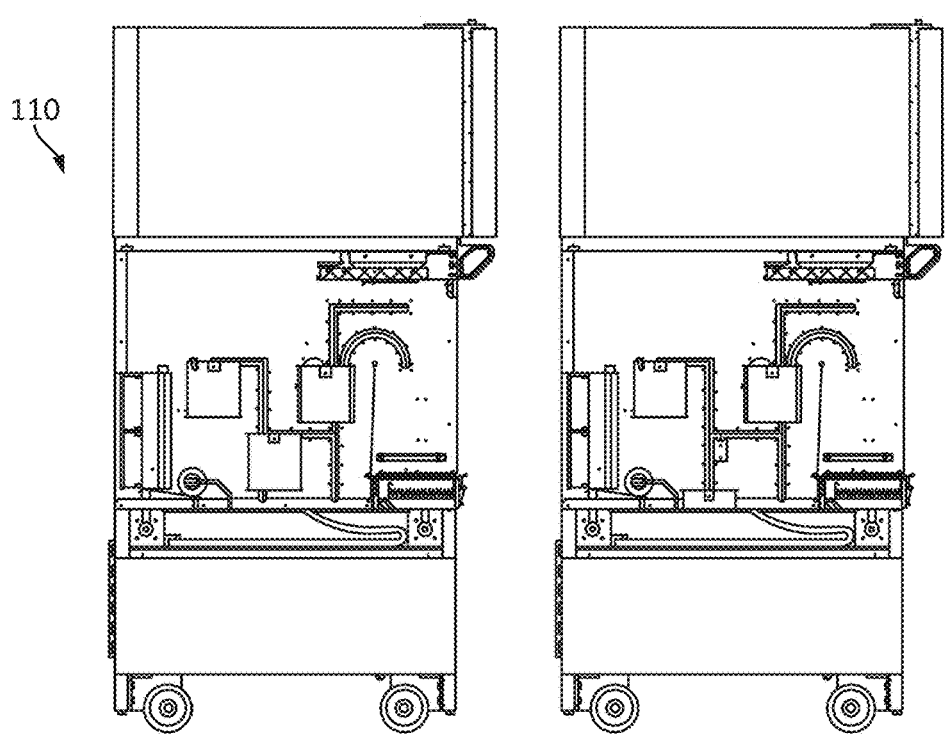
FIGS. 9A-9D are schematic side views of automated cooking apparatus 110 comprising robotic spatial transfer mechanisms comprising a plurality of food compartments 520 in various operating positions, in accordance with some examples.
Figures 9C, 9D:
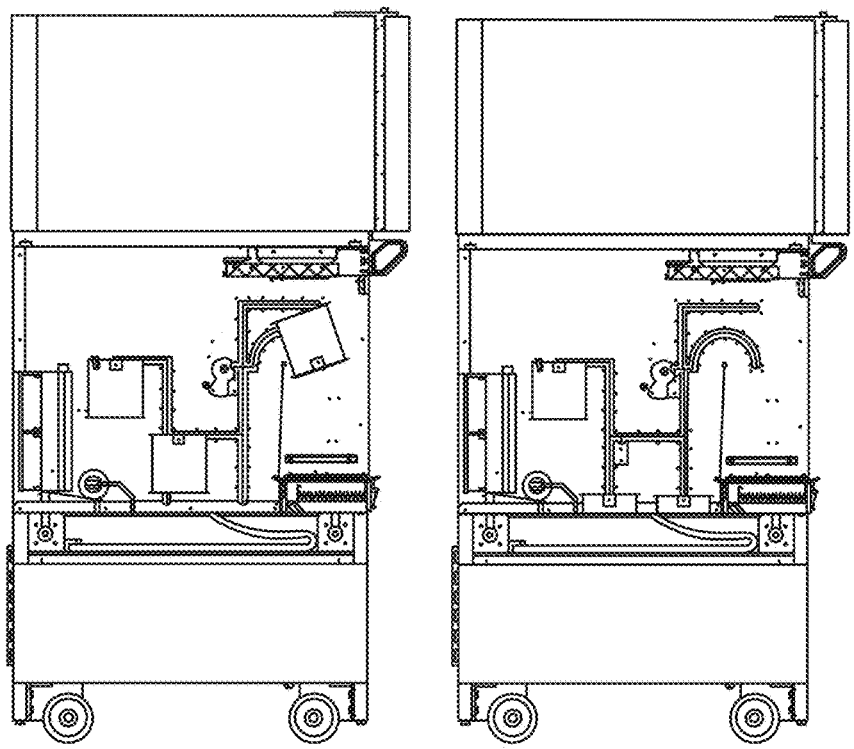

FIGS. 9A-9D are schematic side views of automated cooking apparatus 110 comprising robotic spatial transfer mechanisms comprising a plurality of food compartments 520 comprising three food compartments. In FIG. 9A, one food compartment is positioned in a loading position and the other two food compartments are positioned in holding positions. In FIG. 9B, one food compartment is positioned in a loading position, one food compartment is positioned in a cooking position, and one food compartment is positioned in a hold position. In FIG. 9C, one food compartment is positioned in a loading position, one food compartment is positioned in a hold position, and one food compartment is positioned in a product unloading position. In FIG. 9D, one food compartment is positioned in a loading position, and two food compartments are positioned in cooking positions.

FIG. 2C is a schematic side view of an automated cooking apparatus 110, in accordance with some examples. As shown in FIG. 2C, in some examples, the food transporter 510 is a rotary conveyor 320. The rotary conveyor 320 comprises at least one cylindrical drum 321 rotating about a rotary conveyor axis 322 and a plurality of food compartments 520. The at least one cylindrical drum 321 rotates clockwise in the view of FIG. 2C, propelled by a transporter drum gear mechanically coupled with at least one transporter drum chain or belt linking the rotary conveyor axis 322 with a drum motor. The at least one cylindrical drum 321 is rotatably coupled to the automated cooking apparatus 110 by two quick-release couplings, thereby providing removal of the at least one cylindrical drum 321 for cleaning, maintenance or repair, and re-installation. The at least one cylindrical drum 321 has a sufficiently small diameter, measured perpendicular to the rotary conveyor axis 322, that it will fit into a standard door-type dishwasher for washing. The at least one cylindrical drum 321 comprises a plurality of food compartments 520 comprising up to eight food compartments.

When one of the plurality of food compartments 520 of the rotary conveyor 320 reaches unloading position, that is, the at least one cylindrical drum 321 rotates such that the one of the plurality of food compartments 520 exits the cooking tank 530, the now cooked food items will along the surface of the one of the plurality of food compartments 520 into another component of the cooking unit 500, for example a stationary or portable container tray or work surface or a cooked food receiver 550. After the deposition of the food products, the rotation of the at least one cylindrical drum 321 resumes clockwise until the one of the plurality of food compartments 520 reaches the loading position. At the loading position, the one of the plurality of food compartments 520 is aligned with the delivery unit 400. Unloading, loading, and cooking positions of each one of the plurality of food compartments 520 may be reported to the main controller 650 by position sensors in the cooking unit 500. For example, when the rotation of the at least one cylindrical drum 321 brings one of the plurality of food compartments 520 into alignment with the delivery unit 400, a position sensor may enable stopping the rotation of the at least one cylindrical drum 321 so that food items may be deposited into the one of the plurality of food compartments 520.

In some examples, the at least one cylindrical drum 321 may comprise flat, circular sides enclosures formed of fine wire mesh or having perforations. The side enclosures may enable exchange of cooking medium through the body of the at least one cylindrical drum 321 when any of the plurality of food compartments 520 are immersed in cooking medium in a cooking position. The rotary conveyor 320 further comprises a rotary conveyor shroud 323. The rotary conveyor shroud 323 is a semicylinder with an axis that is the rotary conveyor axis 322. The wall of the semicylinder is perforated. In some examples, the wall of the semicylinder is formed from a wire mesh. The wall of the semicylinder extends within the cooking tank 530. The diameter of the semicylinder is larger than an outer diameter of the at least one cylindrical drum 321, such that the at least one cylindrical drum 321 may rotate freely within the rotary conveyor shroud 323, but food items positioned within any one of the plurality of food compartments 520 are securely contained within the plurality of food compartments 520 when immersed in cooking medium. For example, in the example shown in FIG. 2C, where the plurality of food compartments 520 comprises six food compartments, four food compartments will be aligned with the rotary conveyor shroud 323. The rotary conveyor 320 may provide a benefit of lower manufacturing cost due to a lower number of required components than, for example, the food transporter 510 comprising either the one round food container 305 or the hexagonal food container 311. Additional benefits may include an improved mechanical reliability and simplified cleaning and maintenance requirement, also due to fewer components.

Examples of Ventilation Units

Figures 10A, 10B:
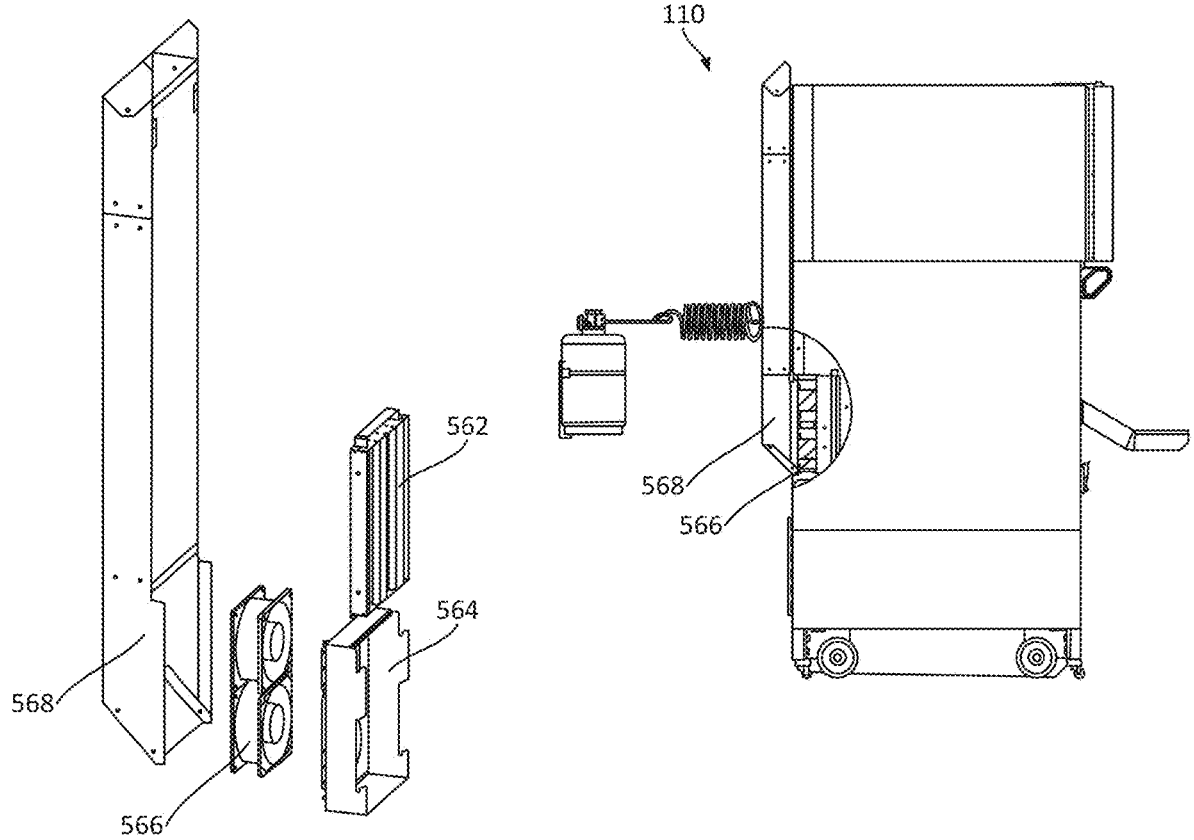
FIG. 10A is an exploded isometric view of a ventilation unit 560, in accordance with some examples.
FIG. 10B is a side view of the automated cooking apparatus 110 comprising a ventilation unit 560, in accordance with some examples.

FIG. 10A is an exploded isometric view of a ventilation unit 560, in accordance with some examples. In some examples, the automated cooking apparatus 110 further comprises a ventilation unit 560 comprising at least one ventilation fan 566 and a ventilation duct 568 fluidically coupled with the at least one ventilation fan 566. The at least one ventilation fan 566 is fluidically coupled with the cooking unit 500. FIG. 10B is a side view of the automated cooking apparatus 110 comprising a ventilation unit 560, in accordance with some examples. The at least one ventilation fan 566 is configured to withdraw a volume of hot air from the cooking unit 500 and expel the volume of hot air into the ventilation duct 568. In this way, the ventilation unit 560 creates an airflow pattern through the automated cooking apparatus 110 that thermally decouples the storage unit 200 from the hotter cooking unit 500. Heated air from the cooking unit 500 is removed and replaced with cooler air. The cooler air may enter from outside the automated cooking apparatus 110, or from a cooler section of the automated cooking apparatus 110. The thermal decoupling of the storage unit 200 from the cooking unit 500 enables a closer placement of the storage unit 200 to the cooking unit 500, which in turn enables a more compact and energy efficient design of the automated cooking apparatus 110. The ventilation unit 560 also may desirably remove smoke, grease-laden vapors, and unpleasant odors from the cooking unit 500.

In some further examples, the ventilation unit 560 may further comprise at least one down-draft cold air fan, positioned to blow a volume of ambient air from outside the automated cooking apparatus 110 into the cooking unit 500. In some other examples, the ventilation unit 560 may further comprise an air fan that transports a volume of cold air from within the insulating enclosure 210 to the cooking unit 500. In these examples, at least one cold air duct pierces the insulating enclosure 210 to allow transport of the cold air volume.

In some examples, the ventilation unit 560 further comprises a ventilation filter housing 564 positioned between the cooking unit 500 and the at least one ventilation fan 566 and a ventilation filter 562 positioned within the ventilation filter housing 564. The ventilation filter 562 is removable for replacement or cleaning. The ventilation filter 562 is positioned upstream of the at least one ventilation fan 566 in the air flow through the ventilation unit 560 in order to capture grease and thereby protect the at least one ventilation fan 566 from damage by the grease. In some examples, the ventilation unit 560 comprises two or more fans.

In some examples, the ventilation duct 568 is attached to the automated cooking apparatus 110 on an opposite side as the cooked food receiver 550. In the same or other examples, the ventilation duct 568 is oriented such that its longest dimension is parallel with the apparatus axis 115, as in the example shown in FIG. 10B. In some examples, the duct may direct air, grease, and/or smoke to an external exhaust ventilation system.

In some examples, the ventilation unit 560 may comprise a recirculating air curtain, positioned within the cooking unit 500, that removes smoke and grease-laden vapors via a highly-efficient filtration process meeting or exceeding the EPA Method 202 requirements. In these examples, the ventilation unit 560 does not transfer air to an external exhaust hood or ductwork. In some examples, the ventilation unit 560 may comprise a recirculating ventless hood that may be of countertop or free-standing design. Such recirculating ventless hood may be utilized to provide ventilation for a single automated cooking apparatus 110 or a battery of automated cooking apparatuses.

Examples of Refrigeration Units

In some examples, the uncooked food container unit 230 comprises a refrigeration opening. The refrigeration opening may be located, for example, near the first food container unit side 231. In some examples, the refrigeration opening admits cold air from a refrigeration unit 220. In some examples, the refrigeration unit 220 comprises a compressor 222, a condenser coil 223, a circulation fan 224, and an evaporator 225. The compressor 222, the condenser coil 223, and the evaporator 225 are fluidically coupled. The circulation fan 224 is configured to circulate air within the insulating enclosure 210 and over evaporator 225, thereby maintaining the air within the insulating enclosure 210 below an ambient temperature. In other examples, the refrigeration opening admits cold air from an external refrigeration system.

Examples of Uncooked Food Container Units

In some examples, the uncooked food container unit 230 comprises an internal volume of 50 liters or more, 75 liters or more, 100 liters or more, or even 125 liters or more. The internal volume of the uncooked food container unit 230 enables storage of sufficient amount of food items to enable operation of the automated cooking apparatus 110 for at least 1 hour at typical restaurant production throughput without requiring reloading of the uncooked food container unit 230 with food items. In some examples, the shape of the uncooked food container unit 230 enables gravity-fed flow of food items towards the container delivery opening 232. In some examples, the uncooked food container unit 230 is formed from an NSF approved material for food contact, such as food-safe bisphenol A (BPA)-free plastic or food-safe stainless steel. The uncooked food container unit 230 has an uncooked food container unit 230 interior surface and an uncooked food container unit 230 exterior surface. In some examples, at least one temperature probe and two flow deflectors are attached to the internal surface. Such flow deflectors are designed to control the flow of uncooked frozen product towards container delivery opening 232 during operation of the automated cooking apparatus 110. The position of each flow deflector is controlled by flow deflector position sensor that switches on or off designated flow deflector motor. The flow deflector controls are electronically coupled with the main controller 650.

In some examples, the uncooked food container unit 230 comprises a container delivery opening door, which is insulated. The container delivery opening door is configured to seal the container delivery opening 232 when food items are not being transported to the delivery unit 400, and open when food items are being transported to the delivery unit 400.

In some examples, the uncooked food container unit 230 comprises a loading door equipped with loading door handle and a loading door lock assuring air-tight closure of the loading door when it is in a closed configuration. When the loading door is in an open configuration, food items may be placed in the uncooked food container unit 230 through an opening in the insulating enclosure 210. The insulation of the insulating enclosure 210 may be at least 25 millimeters, at least 50 millimeters, at least 100 millimeters, or even at least 200 millimeters in thickness.

In some examples, the container delivery opening 232 has a plane and a cross-sectional area in the plane. The uncooked food container unit 230 has a first food container unit side 231 opposite the container delivery opening 232. The first food container unit side 231 has an area in a plane parallel with the plane of the container delivery opening 232. The cross-sectional area of the container delivery opening 232 is smaller than the cross-sectional area of the first food container unit side 231.

Examples of Horizontal Belt Feeders

Referring to FIGS. 7A-7D, in some examples, an automated cooking apparatus 110 further comprises a horizontal belt feeder 233. The horizontal belt feeder 233 may be a part of the storage unit 200, a part of the delivery unit 400, or a standalone unit (e.g., in addition to or instead of various examples of the delivery unit 400 described above). The horizontal belt feeder 233 is configured to collect set amounts (one at the time) of the food items from the uncooked food container unit 230.

The horizontal belt feeder 233 comprises a flexible belt 234 comprising a food contacting surface 241 and a plurality of pulleys 235, a feeder brush 237, a feeder roller 238 comprising a roller surface 240, and one or more dozer containers 245. The flexible belt 234 is positioned between the uncooked food container unit 230 and the container delivery opening 232 and is movable relative to both the uncooked food container unit 230 and the container delivery opening 232. The plurality of pulleys 235 is configured to support the flexible belt 234 and rotate about their respective pulley axes 236. One or both pulleys 235 may be driven by a motor thereby moving the flexible belt 234 (e.g., in the clockwise direction with reference to the view in FIGS. 7A and 7B).

The feeder roller 238 rotates about a roller axis 239 that is parallel with the pulley axis 236. This rotation may be used to advance the food items into the gap between the flexible belt 234 and the feeder roller 238 or, more specifically, between the food contacting surface 241 and the roller surface 240 (e.g., by rotating the feeder roller 238 and the flexible belt 234/plurality of pulleys 235 in the opposite directions such as rotating the feeder roller 238 in the counterclockwise direction while rotating the flexible belt 234/plurality of pulleys 235) or to prevent the food items from being stacked in this gap (e.g., by rotating the feeder roller 238 and the flexible belt 234/plurality of pulleys 235 in the same direction such as the clockwise direction with reference to the view in FIG. 7A).

Figure 7A:
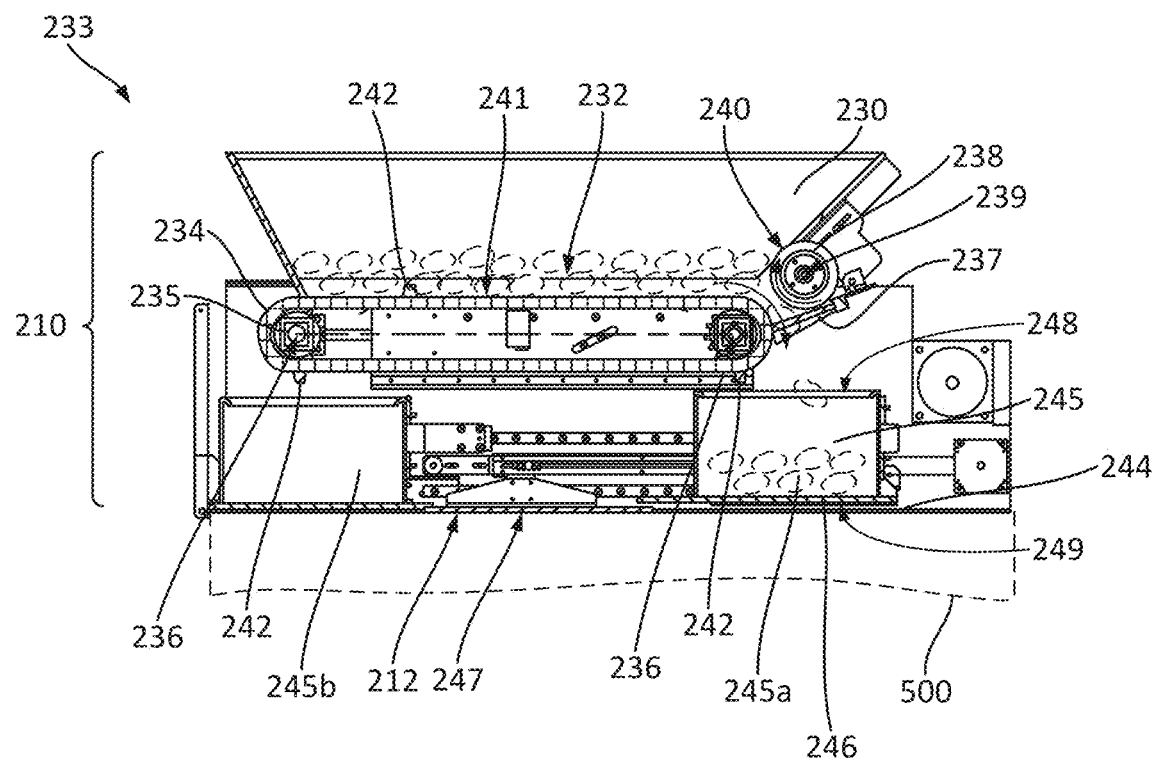
FIGS. 7A-7D are schematic side views illustrating details of the horizontal belt feeder 233, in accordance with some examples.
Figure 7B:
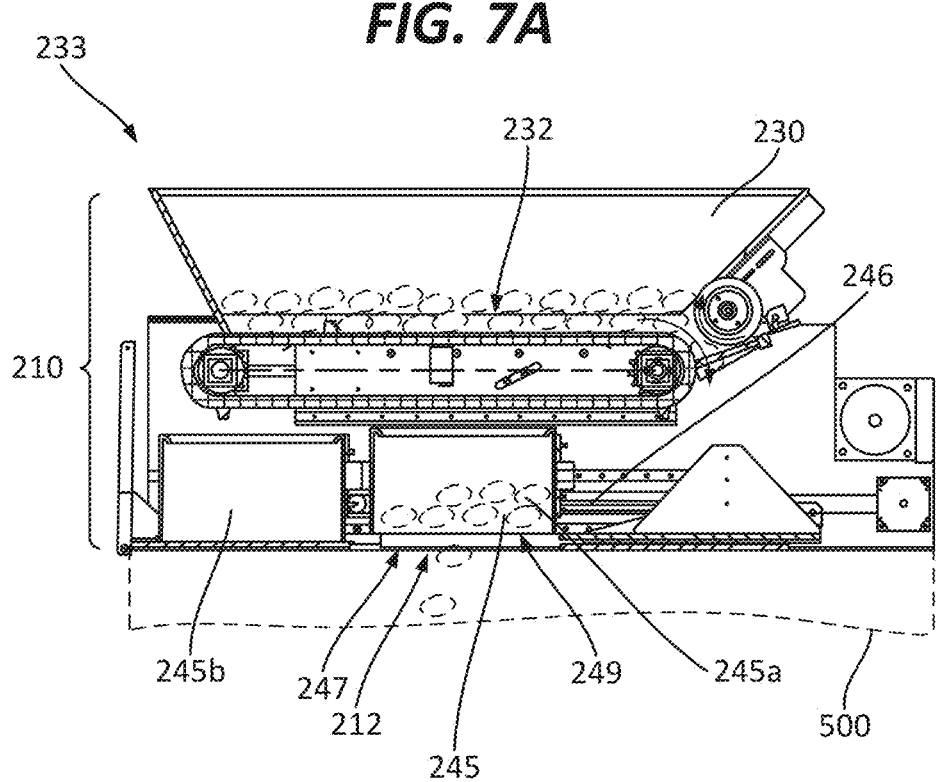

Referring to FIG. 7A, during the automated loading operation, one of dozer containers 245 is aligned with the end of the flexible belt 234 such that the food items fall (due to the gravity) from the flexible belt 234 into the dozer container 245 as the flexible belt 234 turns about one of the respective pulley axes 236. Overall, a set of dozer containers 245 may be positioned between the flexible belt 234 and the cooking unit 500. These dozer containers 245 can slide between a loading position (e.g., at the end of the flexible belt 234 as shown in FIG. 7A) and an unloading position (e.g., over the dozer track opening 247 as shown in FIG. 7B).

As noted above, the distance separating the roller surface 240 from the food contacting surface 241 is large enough to permit individual food items to pass out of the uncooked food container unit 230 and into the dozer container 245 when the flexible belt 234 translates (e.g., as schematically shown in FIG. 7A). During the automated loading operation, the feeder roller 238 rotates about the roller axis 239 (e.g., in the same direction as the one of the plurality of pulleys 235 when the flexible belt 234 translates or in the opposite direction).

Referring to FIG. 7A, the feeder brush 237 is configured to prevent food items from passing out of the uncooked food container unit 230 and into the dozer container 245 when the flexible belt 234 does not translate. For example, the feeder brush 237 may have a set flexibility (e.g., defined by the material of brush bristles), may be a structure preloaded with a spring, and/or may be an actuatable gate (e.g., which is open when the flexible belt 234 translates and closed when the flexible belt 234 does not translate). Other examples of the feeder brush 237 are within the scope which (a) allow the food items to pass from the gap between the flexible belt 234 and the feeder roller 238 into the dozer container 245 when the flexible belt 234 translates and also (b) does not allow the food items to pass from the gap between the flexible belt 234 and the feeder roller 238 into the dozer container 245 when the flexible belt 234 does not translate.

Referring to FIG. 7A, in some examples, the horizontal belt feeder 233 or, more specifically, the flexible belt 234 further comprises a plurality of belt dividers 242 mechanically coupled to the food contacting surface 241 of the flexible belt 234. The plurality of belt dividers 242 is configured to contact and transport food items when the flexible belt 234 translates. While FIG. 7A illustrates three belt dividers 242, any number of belt dividers 242 is within the scope, e.g., one, two, three, four, or more. The number, size of each belt divider 242, the distance/pitch between adjacent belt dividers 242 is determined by the type/side of food items. In some examples, the flexible belt 234 or the entire horizontal belt feeder 233 may be replaced for different food items.

Figure 7C:
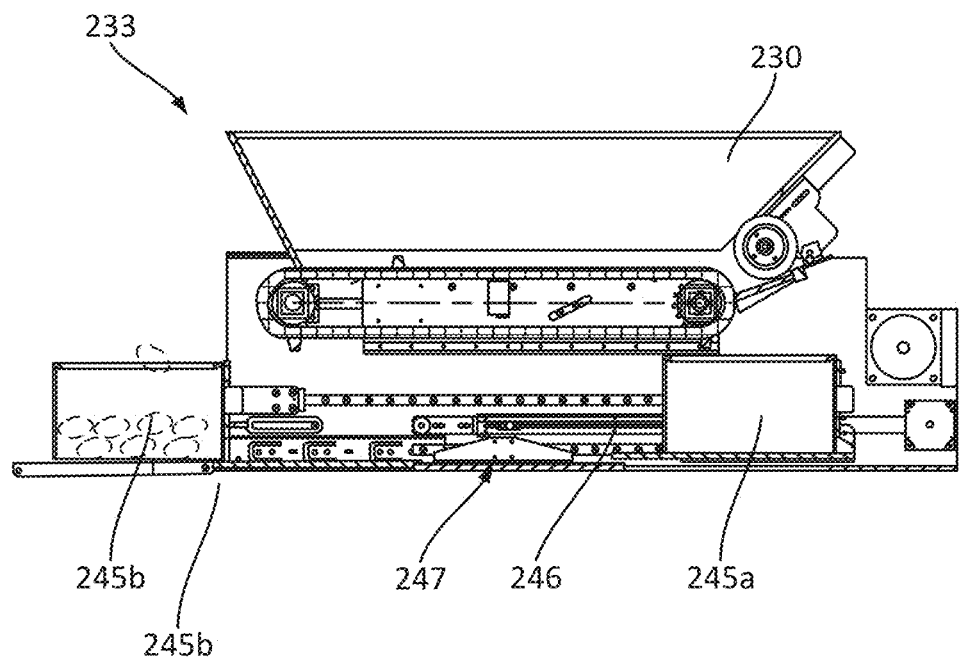
Figure 7D:
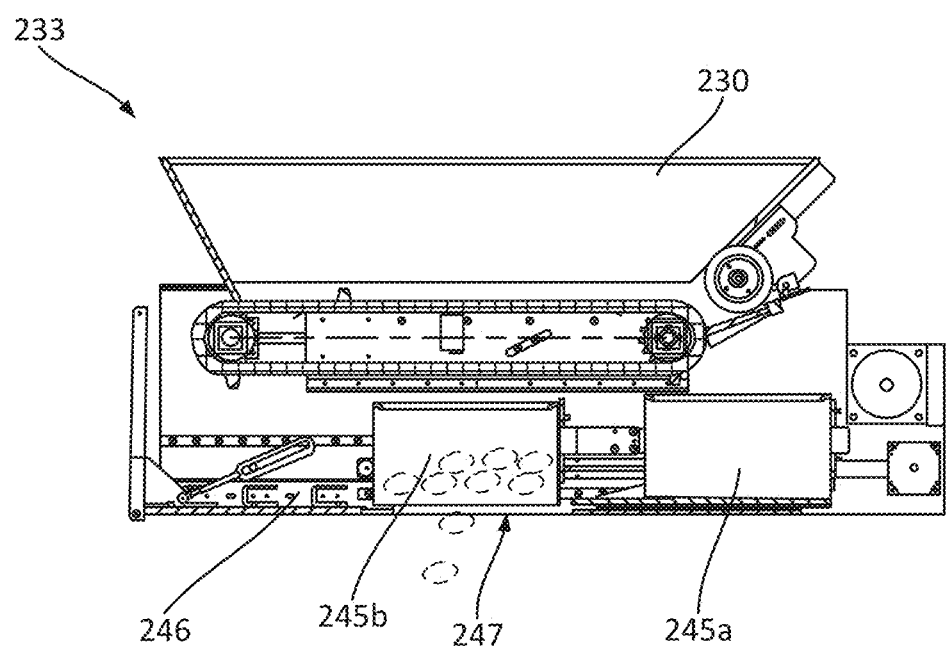

Referring to FIGS. 7A-7D, in some examples, the horizontal belt feeder 233 further comprises a dozer container track 244 for moving the dozer container 245 to various positions (e.g., a receiving position/automated loading position shown in FIG. 7A, a delivering position/unloading position shown in FIGS. 7B and 7D, and a manual loading position shown in FIG. 7C). For keeping and unloading the food items from the dozer containers 245, the dozer container track 244 comprises a dozer container cover 246 and a dozer track opening 247.

The container delivery opening 232 is aligned with the dozer track opening 247, e.g., as shown in FIG. 7A. The container delivery opening 232 may define the insulating enclosure 210. As such, in some examples, the horizontal belt feeder 233 is positioned within the insulating enclosure 210. In some examples, a portion of the horizontal belt feeder 233 is positioned within the insulating enclosure 210. This feature reduces the risk of food contamination by maintaining cold storage conditions for food items longer, improving apparatus uptime, and enables more efficient food portioning.

Each dozer container 245 comprises a first dozer container opening 248 (which may be also referred to as a top container opening) and a second dozer container opening 249 (which may be also referred to as a bottom container opening) opposite the dozer container cover 246. The first dozer container opening 248 is configured to align with the end of the flexible belt 234 in an automated loading position shown in FIG. 7A.

The second dozer container opening 249 is configured to align with the dozer container cover 246 when the dozer container 245 is in a receiving position. The dozer container cover 246 retains the food items in the dozer container 245. When the dozer container cover 246 is aligned with the dozer track opening 247, the food items are transferred (fall under the gravity) from the dozer container 245 and through the dozer track opening 247 (e.g., into the cooking unit 500). In other words, the second dozer container opening 249 is configured to align with the dozer track opening 247 when the dozer container 245 is in a delivering position thereby allowing the food items to transfer from the dozer container 245 to the cooking unit 500.

Referring to FIG. 7A, in some examples, the horizontal belt feeder 233 is positioned within the insulating enclosure 210. In some examples, a portion of the horizontal belt feeder 233 is positioned within the insulating enclosure 210. This feature reduces the risk of food contamination by maintaining cold storage conditions for food items longer, improving apparatus uptime, and enables more efficient food portioning (in the cold format).

Cassette Examples

Figure 6A:
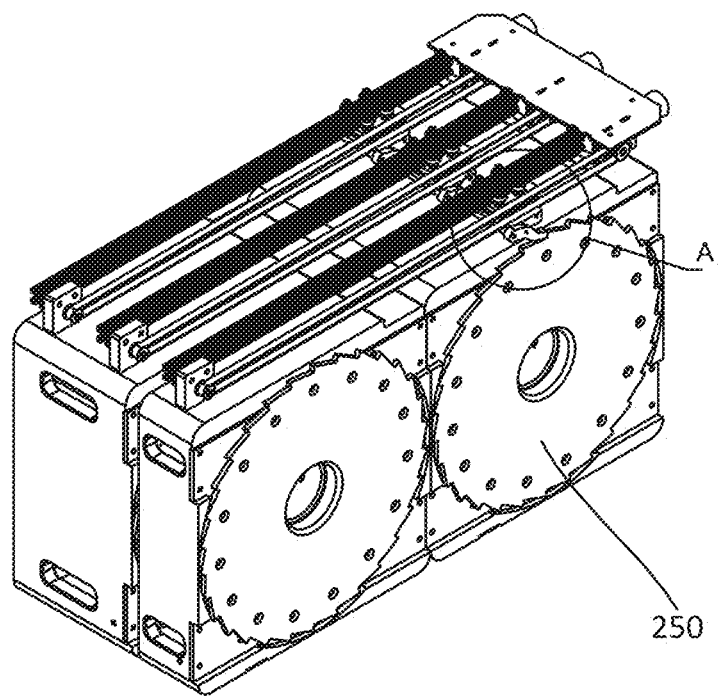
Figure 6B:
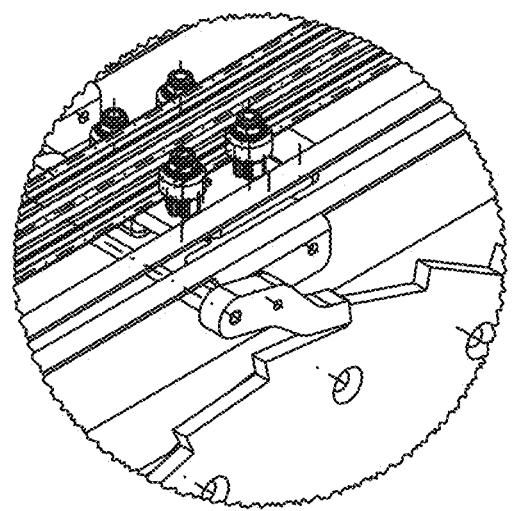

Referring to FIGS. 2C and 6A-6F, in some examples, the uncooked food container unit 230 comprises a cassette 250 comprising a plurality of cassette compartments 252, a cassette axis 254, a cassette door 256, a cassette shroud 257, and a cassette opening 258. The plurality of cassette compartments 252 allows pre-portioning the food items prior to installing the cassette 250 to the automated cooking apparatus 110. Specifically, each cassette compartment 252 is loaded with desired amounts of the desired food items. In some examples, different cassette compartments 252 may have different amounts of food items (e.g., different size portions) and/or different types of food items. Alternatively, all cassette compartments 252 have the same amount and type of food items. However, an automated cooking apparatus 110 may include multiple cassettes 250 (e.g., six cassettes 250 are shown in FIG. 6A) and different cassettes 250 may have different amounts and/or types of food items. In either case, the same automated cooking apparatus 110 may be configured to cook different portions (size, food type) of food items based on the use input (and using the same cooking unit 500). Additionally, the main controller 650 may be configured to identify the amount and type of food item in each one of the plurality of cassette compartments 252 and instruct other components of the automated cooking apparatus 110 to operate such that, once a portion of food items has been transferred from one of the plurality of cassette compartments 252, a cooking time and a cooking temperature are appropriate for the portion of food items. After loading, the plurality of cassette compartments 252 are covered by a cassette cover 251. Installation of the cassette cover 251 assures the food items remain inside the plurality of cassette compartments 252 until delivery.

Specifically, the cassette opening 258 is an opening in the cassette shroud 257 and is aligned with the container delivery opening 232 (e.g., as shown in FIG. 2C). The cassette opening 258 allows removing the food items from one of the cassette compartments 252 that is currently aligned with the cassette opening 258. The plurality of cassette compartments 252 is radially arrayed about the cassette axis 254 and rotationally coupled to the cassette 250 (thereby allowing different ones of the cassette compartments 252 to align with the cassette opening 258). Specifically, each one of the plurality of cassette compartments 252 comprises a compartment opening 259 that can be aligned with the cassette opening 258 when this cassette compartment 252 is aligned with the cassette opening 258 in a delivering position. Alternatively, in a non-delivery position, the compartment opening 259 of this cassette compartment 252 is aligned with the cassette shroud 257 (and is not aligned with the cassette opening 258). The cassette shroud 257 blocks and retains the food items in this cassette compartment 252 until reaching the delivery position.

The cassette door 256 can be actuated between a closed position and an open position. In the closed position, the cassette door 256 blocks the food items. In the open position, the cassette door 256 allows the food items to leave the corresponding cassette compartment 252. Specifically, the cassette door 256 is positioned between the one of the plurality of cassette compartments 252 and the cassette opening 258, when the cassette door 256 is in a closed position. The cassette door 256 is not positioned between the one of the plurality of cassette compartments 252 and the cassette opening 258 when the cassette door 256 is in an open position.

In some examples, the horizontal belt feeder 233 (described above with reference to FIGS. 7A-7D) is configured to accept portions of food from either a cassette 250 or an uncooked food container unit 230.

Manual Bypass Examples

Figure 8:
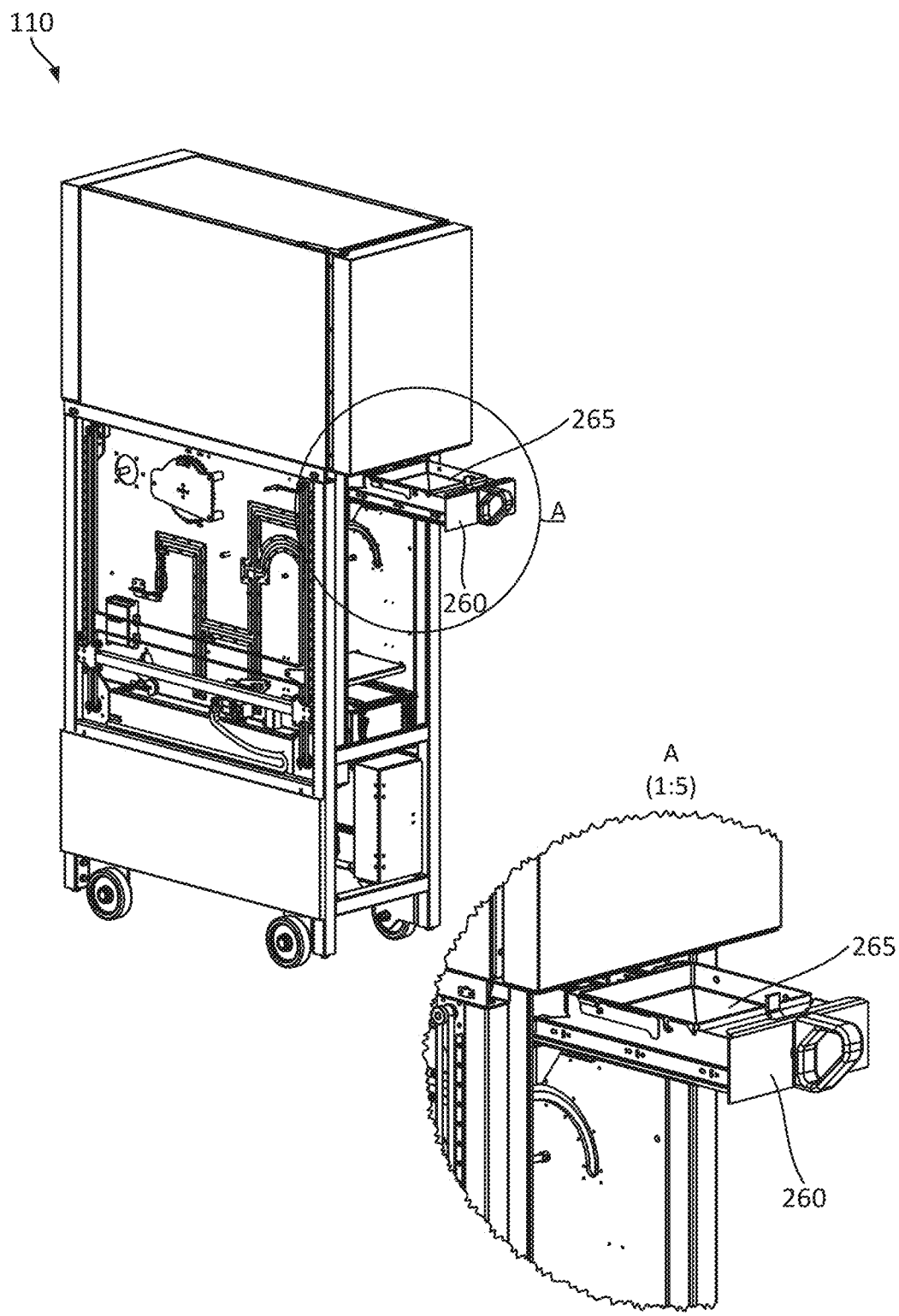
FIG. 8 is an isometric schematic view of the automated cooking apparatus 110 illustrating the manual bypass unit 260 unit in an open configuration, in accordance with some examples.

In some examples, the automated cooking apparatus 110 further comprises a manual bypass unit 260. FIG. 8 is an isometric schematic view of the automated cooking apparatus 110 illustrating the manual bypass unit 260 in an open configuration. The manual bypass unit 260 is attached to the cooking unit 500 and has a closed configuration and an open configuration. In the open configuration, the manual bypass unit 260 extends from an outer surface of the automated cooking apparatus 110 and enables reception of a portion of food items through an opening in the manual bypass unit 260. In some examples, the manual bypass unit 260 comprises a manual bypass tray 265. In these examples, the portion of food is positioned in the manual bypass tray 265. The portion of food items are then transferred by the manual bypass unit 260 to the food transporter 510 when the manual bypass unit 260 is reconfigured in the closed configuration. In some examples, the manual bypass unit 260 has an internal volume sufficiently large to hold at least one portion of food items. In some examples, the manual bypass unit 260 also comprises a loading door and a handle affixed to the loading door. In these examples, applying a force in one direction to the handle opens the loading door and configures the manual bypass unit 260 in the open configuration. Applying force to the handle in another direction closes the door and configures the manual bypass unit 260 in the closed configuration. In some examples, the manual bypass tray 265 can be separated from the automated cooking apparatus 110 for cleaning. In some examples, the manual bypass unit 260 can be separated from the automated cooking apparatus 110 for cleaning or maintenance. The manual bypass unit 260, or in some examples, the manual bypass tray 265, is formed from a food safe material, such as but not limited to stainless steel (e.g. grade 304 or 306). The manual bypass unit 260 increases flexibility in operation of the automated cooking apparatus 110, for example, by providing an option to cook food items not loaded in the uncooked food container unit 230 or in the cassette 250, if present.

In some examples, the manual bypass unit 260 is electronically coupled with the main controller 650. In some further examples, the manual bypass unit 260 comprises a sensor configured to detect food items positioned in the manual bypass unit 260. In these examples, when the sensor detects food items positioned in the manual bypass unit 260, the detection of food items is communicated to the main controller 650. The main controller 650 may then provide instructions to other components of the automated cooking apparatus 110, as will be described in more detail below.

Examples of Filtration Units

Figure 11A:
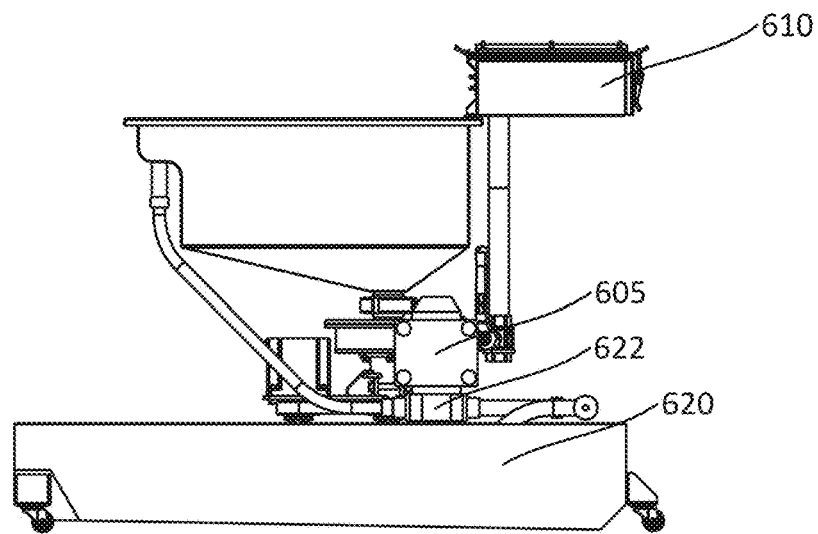
FIG. 11A is a schematic side view of the filtration unit 600, in accordance with some examples.
Figure 11B:
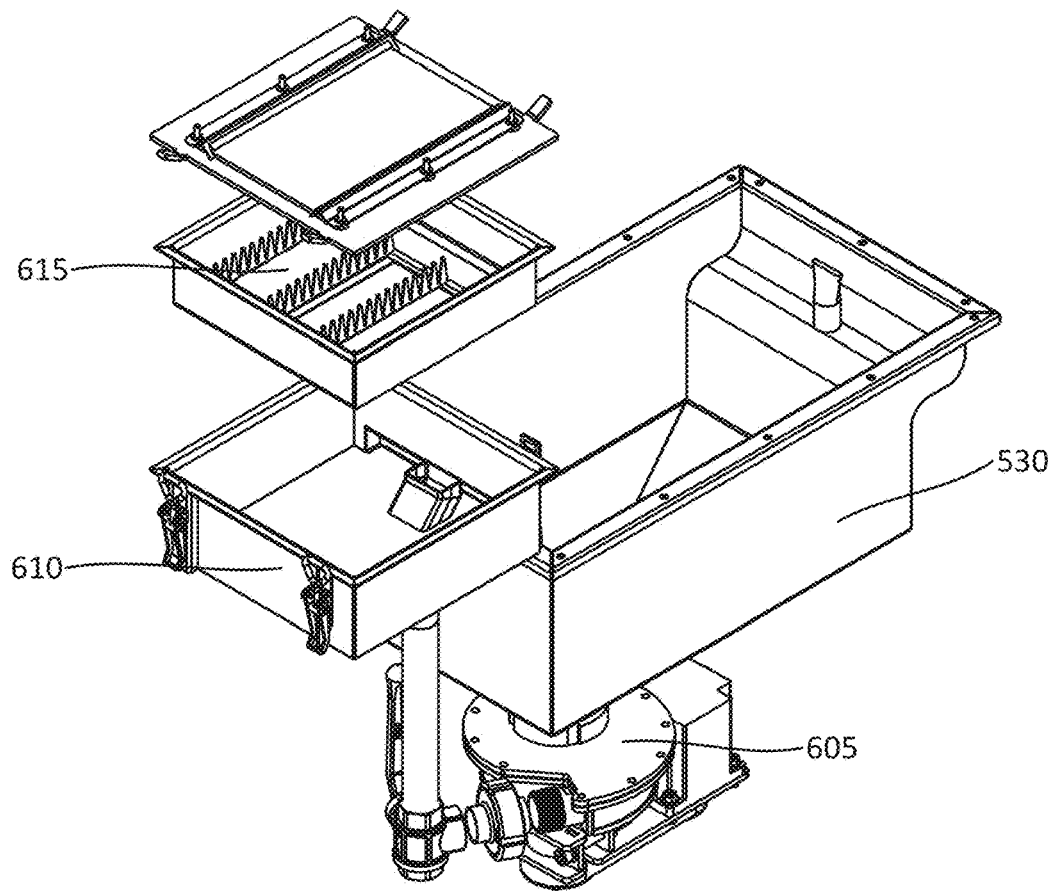
FIG. 11B is a schematic isometric view showing the relationship of components of the filtration unit 600 with the cooking tank 530, in accordance with some examples.

In some examples, the automated cooking apparatus 110 comprises a filtration unit 600. FIG. 11A is a schematic side view of the filtration unit 600, in accordance with some examples. The filtration unit 600 projects a footprint on a surface supporting the automated cooking apparatus 110 that fits within a footprint projected on the surface supporting the automated cooking apparatus 110. FIG. 11B is a schematic isometric view showing the relationship of components of the filtration unit 600 with the cooking tank 530, in accordance with some examples. The filtration unit 600 comprises a filtration pump 605, a filter housing 610, and a filter 615. The filtration pump 605 is fluidically coupled with the cooking tank 530 and the filter housing 610 is fluidically coupled with the filtration pump 605. The filter 615 is positioned within the filter housing 610. At least a portion of the filter housing 610 is positioned between the cooking tank 530 and the storage unit 200. When a cooking medium is positioned within the cooking tank 530, operation of the filtration pump 605 transfers a portion of the cooking medium from the cooking tank 530 to the filter housing 610 and through the filter 615. When the cooking medium passes through the filter 615, the filter 615 removes contaminants from the cooking medium, for example, hard particulate sediment, cooking particles, and frying froth. The filter 615 is removable from the filter housing 610, for cleaning or replacement. In some examples, the filter housing 610 has an outlet that permits transfer of cooking medium back to the cooking tank 530 after the cooking medium passes through the filter 615. In some further examples, the filtration unit 600 further comprises an expansion tank 620, which is fluidically coupled with the filtration pump 605 and, in some further examples, with the filter housing 610. In the same or other examples, the filtration unit 600 further comprises a valve 622, fluidically coupled with the expansion tank 620, the filter housing 610, and the cooking tank 530 and electronically coupled with the main controller 650. The expansion tank 620 has an expansion tank volume and the cooking tank 530 has a cooking tank volume. The expansion tank volume is equal to or greater than the cooking tank volume. In these examples, the valve 622 may be configured such that the cooking medium may pass through the filter 615, out of the filter housing 610, and into the cooking tank 530, or into the expansion tank 620. The filtration unit 600 may extend a useful lifetime of a volume of cooking medium placed in the cooking tank 530 by removing contaminants. As cooking medium is removed from the cooking tank 530, the valve 622 may be configured such that cooking medium from the expansion tank 620 may be transferred to the cooking tank 530 to maintain a constant volume of cooking medium in the cooking tank 530. In some examples, the cooking unit 500 comprises a cooking medium level sensor 548 positioned within the cooking tank 530 and electronically coupled with the main controller 650, configured to signal to the main controller 650 that cooking media should be transferred from the expansion tank 620 to the cooking tank 530. In these examples, the main controller 650 may record a cooking medium level measured by the cooking medium level sensor 548, and the main controller 650 may instruct the filtration pump 605 to transfer a portion of cooking media from the expansion tank 620 to the cooking tank 530. Fried foods, for example, absorb cooking media such as oil during cooking. Different types of foods absorb different amounts of oil per portion, which is removed from the cooking tank 530 with the cooked food items. Replenishment of the cooking medium in the cooking tank 530 during cooking processes provides benefits of simplification of the cooking process and improvement of cooking efficiency. In some yet further examples, the expansion tank 620 comprises a plurality of tank heating elements 621 positioned inside the expansion tank 620 and electronically coupled with the main controller 650. In these examples, the plurality of tank heating elements 621 is configured to heat the cooking media in the expansion tank 620. In these examples, the plurality of tank heating elements 621 is fluidically coupled with cooking media when the expansion tank 620 contains cooking media. The main controller 650 instructs the plurality of tank heating elements 621 to heat the cooking media in the expansion tank 620 to a tank set temperature prior to instructing the filtration pump 605 to transfer cooking media to the cooking tank 530 so that the temperature of the cooking media in the cooking tank 530 does not deviate from a cooking temperature during the transfer. In some examples, the expansion tank 620 may be configured to dissolve oil conditioning additives to cooking medium within the expansion tank 620. In some examples, the expansion tank 620 contains water. In these examples, the filtration pump 605 is configured to transfer a portion of the water from the expansion tank 620 to the cooking tank 530 for cleaning of the cooking tank 530. Specifically, the water may contain dissolved cleaning additives. In further examples, the filtration pump 605 may further transfer the water through the filter housing 610 and the filter 615. In some examples, the filtration unit 600 is detachable from the automated cooking apparatus 110 and may be attached to the cooking unit 500 of other cooking appliances to enable topping off of cooking media, filtration of cooking media, and cleaning of other cooking apparatuses. In some examples, the expansion tank 620 may comprise two or more sub-tanks. For example, a first sub-tank may contain clean cooking media and dirty cooking media removed from the cooking tank 530 may be directed to a second sub-tank. In some examples, the expansion tank 620 may be detached from the automated cooking apparatus 110.

Examples of Cooking Tank Mounting Bearings

Figure 13:
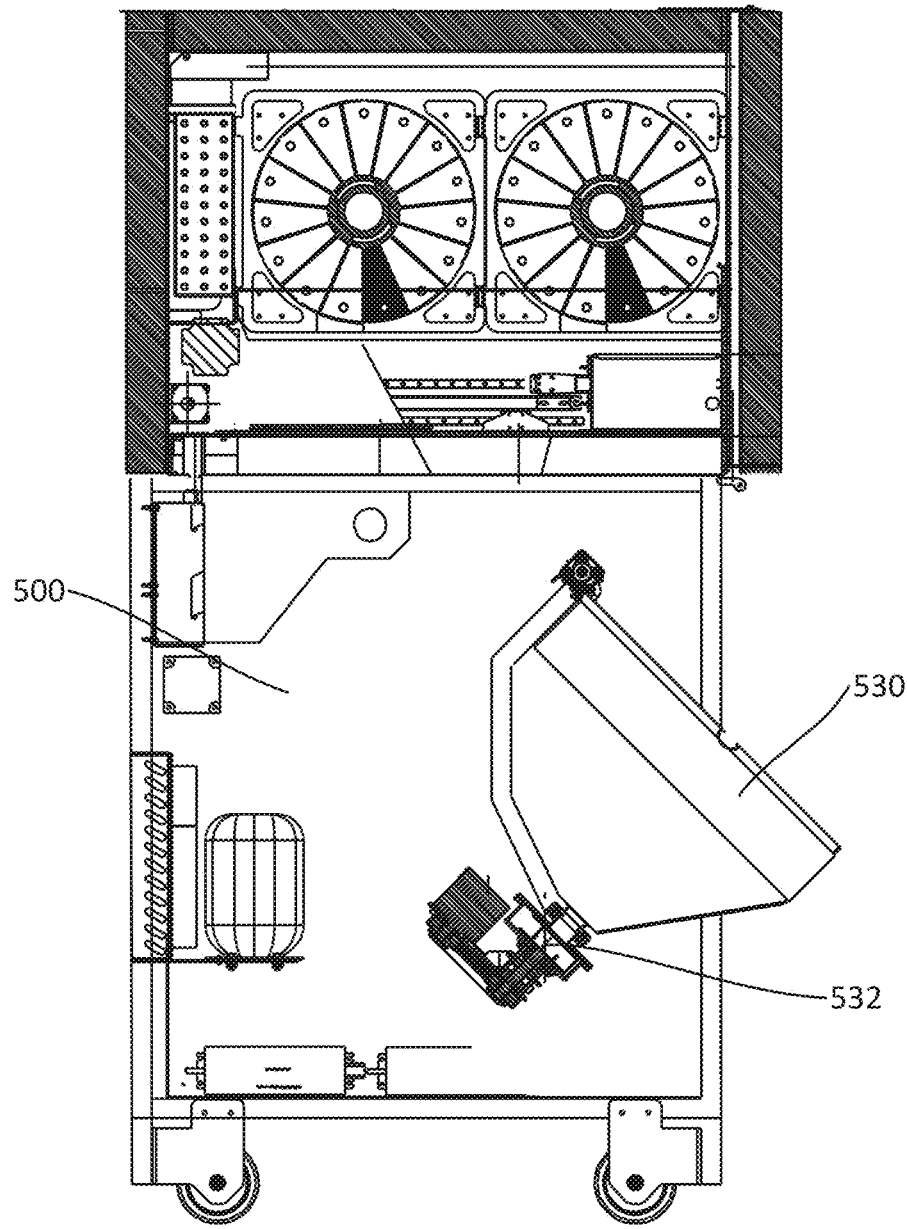
FIG. 13 is a schematic side view of the automated cooking apparatus 110 and a cooking tank 530 tilted on a bearing axis relative to the cooking unit 500, in accordance with some examples.

In some examples, the automated cooking apparatus 110 comprises a cooking tank mounting bearing 532. FIG. 13 is a schematic side view of the automated cooking apparatus 110 and a cooking tank 530 tilted relative to the cooking unit 500, in accordance with some examples. The cooking tank mounting bearing 532 rotatably couples the cooking tank 530 with the cooking unit 500, thereby enabling tilting of the cooking tank 530 relative to the cooking unit 500. Tilting of the cooking tank 530 relative to the cooking unit 500 may be especially desirable to simplify cleaning and maintenance of the cooking tank 530.

Examples of Fire Suppression Systems

Figure 12:
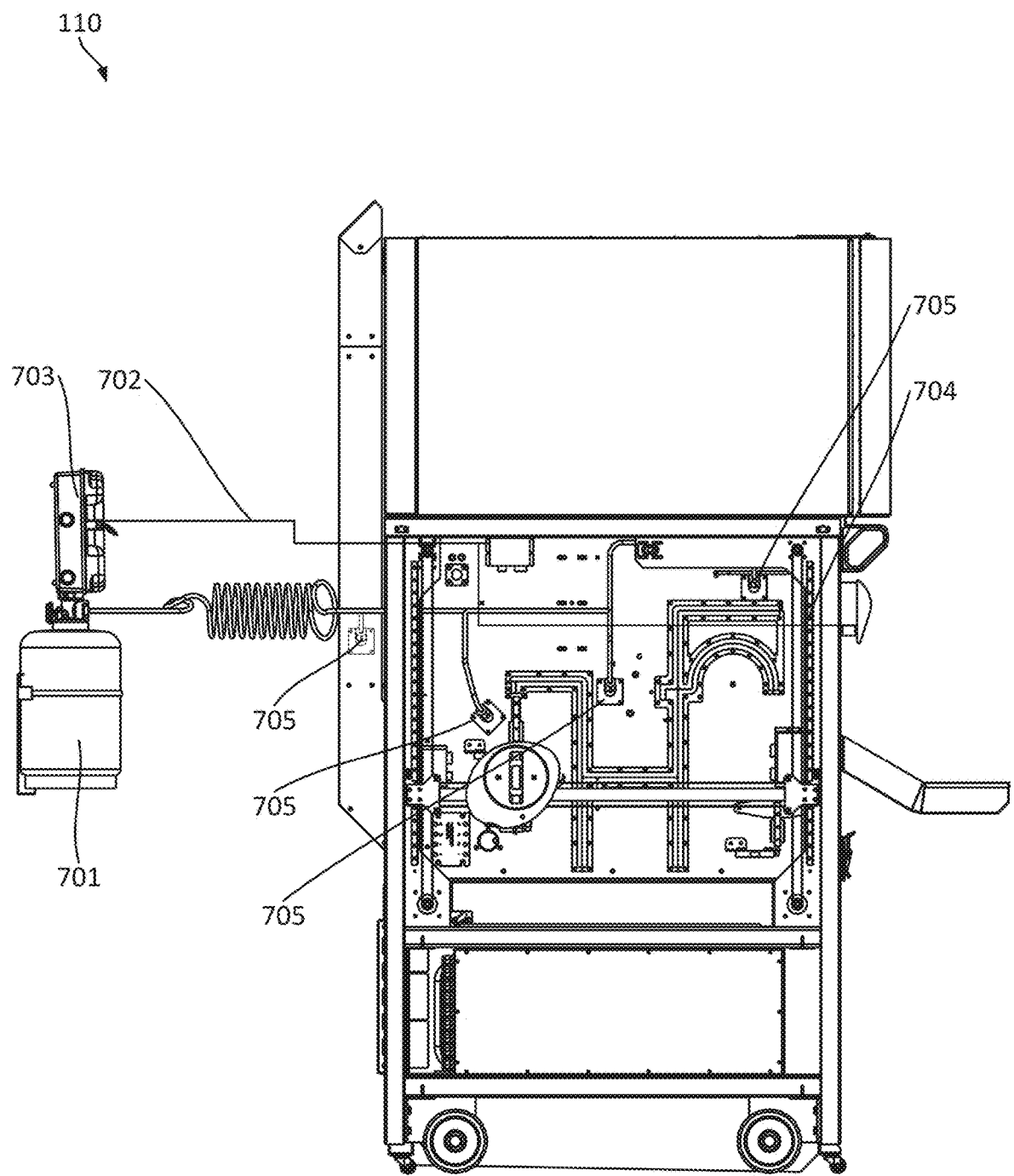
FIG. 12 is a schematic side view of an automated cooking apparatus 110 illustrating the relationships of components of the fire suppression system 700, in accordance with some examples.

FIG. 12 is a schematic side view of an automated cooking apparatus 110 comprising a fire suppression system 700, in accordance with some examples. In some examples, the automated cooking apparatus 110 comprises a fire suppression system 700. The fire suppression system 700 comprises a fire bottle 701, a trigger cable 702, a thermal trigger 703, a manual pull cable 704, and a suppressant distribution nozzle 705. The fire bottle contains a liquid fire suppressant, for example, a fire suppressant that meets NFPA 96 and NFPA 17A requirements by application, chemical composition, and quantity. The fire bottle 701 is fluidically coupled with the suppressant distribution nozzle 705, for example, by external and internal system hard piping and/or external flexible chemical agent distribution hose. The fire bottle 701 may be mounted outside of the automated cooking station 110, for example, to a kitchen wall. Alternatively, the fire bottle 701 may be affixed to an outside surface of the automated cooking apparatus 110. The fire bottle 701 is mechanically coupled to a trigger cable 702, which is in turn mechanically coupled to a thermal trigger 703. The thermal trigger 703 may be, for example, a fusible link set to a temperature between 280-325 degrees F. °. The suppressant distribution nozzle 705 is positioned within the cooking unit 500. For example, locations for the nozzle may be selected such that the nozzle is aimed directly at a specific fire hazard areas of an automated cooking station 110, such that a fire suppressant discharged would quickly knock down flames and cool down hot surfaces while generating a vapor-securing blanket over the hazard zone to prevent fire propagation and reflash. For example, the nozzle may comprise at least two nozzles, one located above and directed towards the cooking tank opening 535, and one located in a ventilation duct 568 of the 600, specifically at an end of the ventilation duct 568 opposite the at least one ventilation fan 566.

The 653 may be coupled to thermal trigger assembly with s-hooks. When the thermal trigger 703 is activated, the liquid fire suppressant is discharged through the suppressant distribution nozzle 705. In some examples, the thermal trigger 703 may also be electronically coupled with the main controller 650. In these examples, the automated cooking apparatus 110 may also be fully disconnected from an electrical power source by the main controller 650 when the thermal trigger 703 is activated.

The manual pull cable 704 is mechanically coupled with the thermal trigger 703. In some examples, a portion of the manual pull cable 704 may be affixed to a surface of the automated cooking apparatus 110 accessible to operators of the automated cooking apparatus 110, or, for example, under a manual bypass access door mounted on a surface of the automated cooking apparatus 110. When pulled, for example by an operator, the manual pull cable 704 actuates the fire suppression system 700. The fire suppression system 700 may quickly detect a fire hazard inside the automated cooking apparatus 110 and rapidly extinguish it directly at the source and at the exit section of the rear-mounted vertical ventilation duct, thereby desirably avoiding propagation of fire into built-in recirculating ventless hood or external kitchen exhaust ventilation system.

Figure 14:
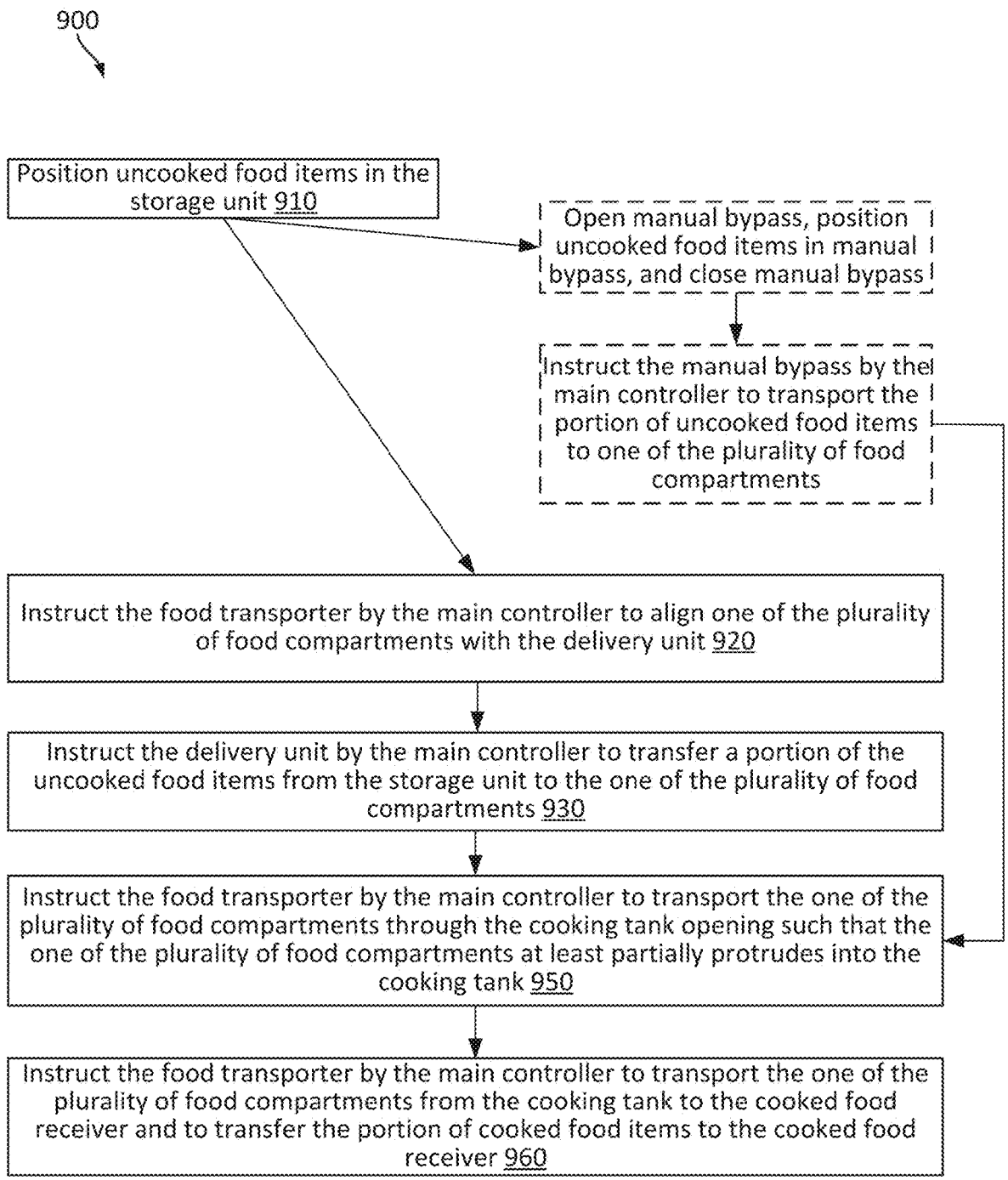
FIG. 14 is a process flowchart corresponding to a method 900 of cooking food items by using an automated cooking apparatus 110, in accordance with some examples.

Examples of Methods of Cooking Food Items by Using Automated Cooking Apparatuses FIG. 14 is a process flowchart corresponding to a method 900 of cooking food items by using an automated cooking apparatus 110, in accordance with some examples. Various aspects of automated cooking apparatuses 110 are described above. For example, an automated cooking apparatus 110 may comprise a storage unit 200, a delivery unit 400, a cooking unit 500, and a main controller 650. The storage unit 200 comprises an uncooked food container unit 230 or cassettes, an insulating enclosure 210, and a refrigeration unit 220. The cooking unit 500 comprises a food transporter 510 comprising a plurality of food compartments 520, a cooked food receiver 550, and a cooking tank 530 comprising a cooking tank opening 535 and a plurality of heating elements 540. The main controller 650 is electronically coupled with the storage unit 200, the delivery unit 400, the cooking unit 500, and the food transporter 510.

Briefly referring to FIG. 1, the main controller 650 may be a computing system with one or more components of this computing system that may be implemented as onboard components, such as ECUs. Specifically, the main controller 650 may comprise a processor unit 651, a memory unit 652, and a bus unit 653. In some examples, the main controller 650 comprises includes a communication unit (not shown) that enables interactions with other automated cooking apparatuses, external user devices, and the like and may include a network interface card, USB interface, or other suitable communication devices/interfaces.

The processor unit 651 executes instructions for software that may be loaded into the memory unit 652. The instructions may correspond to various operations of method 900 described below. In some examples, the processor unit 651 has multiple processors, a multi-processor core, or other types of processors, depending on the specific implementation. The memory unit 652 is an example of storage devices, including computer-readable storage components. The memory unit 652 can be a type of RAM or any other suitable volatile or non-volatile storage device and, in some examples, include hard drives, flash memory, or a combination thereof. Instructions for the operating system, applications, and programs may reside within these storage devices.

These instructions are referred to as program code 656, computer-usable program code, or computer-readable program code. The program code 656 may be embodied in various physical or computer-readable storage media 657, such as memory or persistent storage. The program code 656 can be found on the computer-readable media 655 that may be loaded onto or transferred to the computing system for execution by the processor unit. The program code 656 and computer-readable media 655 together form a computer program product 654. Computer-readable media 655 can include computer-readable storage media 657, which is a physical or tangible storage device, or computer-readable signal media (not shown), such as propagated data signals containing the program code.

The method 900 comprises positioning food items in the storage unit 200. In some examples, positioning of the food items in the storage unit 200 positions a bulk quantity of food items sufficient to prepare greater than 50 portions of food items (e.g., food items may be added into the uncooked food container unit 230). Food items may be added to the uncooked food container unit 230 at any time, including during cooking. Alternatively, food items may be pre-portioned into each of the plurality of cassette compartments 252 as described below. The amount of food items provided in the storage unit 200 may be sufficient to cook at least 30 portions, at least 100 portions, or even at least 300 portions. For example, each food compartment 520 (used for cooking in the cooking unit 500) has a food compartment capacity (defining a maximum portion size). The storage unit 200 has a storage unit capacity that is at least 20 times the food compartment capacity. In some examples, the storage unit capacity is at least 30 times, at least 50 times, or even at least 100 times the food compartment capacity. The positioned food items may have a total volume sufficient to fill each food compartment 520 to the capacity of this food compartment 520 at least 30 times, or at least 100 times, or even at least 300 times. It should be noted that when portions of food items are positioned in each food compartment 520 (from the storage unit 200), the food compartment 520 may be filled to its maximum capacity (defining a maximum portion size) or to less than its maximum capacity (e.g., between 10% and 90% of the maximum capacity). In some examples, the food compartment capacity is 1 kilogram and less than 1 kilogram, less than 0.75 kilograms, less than 0.5 kilograms, or even less than 0.25 kilograms of food items may be positioned in any one of the plurality of food compartments 520. In these examples, the storage unit capacity may be at least 20 kilograms, at least 30 kilograms, at least 50 kilograms, or even at least 100 kilograms of food items.

In some examples, method 900 further comprises instructing the refrigeration unit 220 by the main controller 650 to maintain an air temperature within the insulating enclosure 210 at or below 4° C. or, more specifically 0-4° C. (which may be referred to as refrigeration storage conditions). In other examples, method 900 further comprises instructing the refrigeration unit 220 by the main controller 650 to maintain an air temperature within the insulating enclosure 210 at or below −18° C. or, more specifically, below −20° C. or even below −22° C. (which may be referred to as freezer storage conditions). In some other examples, method 900 further comprises instructing the refrigeration unit 220 by the main controller 650 to maintain an air temperature within the insulating enclosure 210 at a set temperature that is within a temperature limit of an ambient temperature. For example, if the ambient temperature is 25° C., and the temperature limit is 4° C., the main controller 650 will instruct the refrigeration unit 220 to maintain an air temperature within the insulating enclosure 210 between 21° C. and 29° C.

In some examples, the method 900 cleaning the cooking tank 530 and filling the cooking tank 530 with a cooking medium. For example, the method may comprise instructing the plurality of heating elements 540 by the main controller 650 to heat the cooking tank 530 thereby causing evaporation of fluids from within the cooking tank 530, prior to the positioning of the cooking medium within the cooking tank 530. For example, water may be used to clear the cooking tank 530. The cooking tank 530 may be heated to at least 60° C., at least 80° C., or even at least 100° C. to dry out the cooking tank 530. It should be noted that the plurality of heating elements 540 used for this drying operation may be the same as used for heating the cooking medium at a later operation described below.

Referring to FIG. 14, the method 900 comprises instructing the food transporter 510 by the main controller 650 to align one of the plurality of food compartments 520 with the delivery unit 400. In some examples, the main controller 650 instructs the food transporter 510 to align one of the plurality of food compartments 520 with the container delivery opening 232. After this operation, the aligned food compartment is ready to receive food items from the delivery unit 400.

Referring to FIG. 14, the method 900 comprises instructing the delivery unit 400 by the main controller 650 to transfer a portion of the food items from the storage unit 200 to the one of the plurality of food compartments 520 aligned with the delivery unit 400, such that the portion of food items is positioned within the one of the plurality of food compartments 520.

Referring to FIGS. 7A-7B and the description of these figures presented above, in some examples, the uncooked food container unit 230 comprises a container delivery opening 232 aligned with the delivery unit 400. The automated cooking apparatus 110 further comprises a horizontal belt feeder 233 comprising a flexible belt 234, a plurality of pulleys 235, a dozer container 245, and a dozer container track 244. The flexible belt 234 is positioned between the uncooked food container unit 230 and the container delivery opening 232 and moves in translation relative to both the uncooked food container unit 230 and the container delivery opening 232 (as a part of transferring the food items from the storage unit 200 to a food compartment 520, which is aligned with the container delivery opening 232 and is ready for receiving these food items). The plurality of pulleys 235 is positioned such that the plurality of pulleys 235 supports the flexible belt 234. The dozer container track 244 comprises a dozer container cover 246 and a dozer track opening 247 such that the container delivery opening 232 is aligned with the dozer track opening 247. The dozer container 245 comprises a first dozer container opening 248 and a second dozer container opening 249 opposite the first dozer container opening 248 and facing the dozer container track 244.

In these examples, the step of transferring the food items from the storage unit 200 to a food compartment 520 involves (1) the first dozer container opening 248 is aligned with an end of the flexible belt 234 while the second dozer container opening 249 is aligned with the dozer container cover 246 when the dozer container 245 is in a receiving position, and (2) the second dozer container opening 249 is aligned with the dozer track opening 247 when the dozer container 245 is in a delivering position. Specifically, in the receiving position, the food items are transferred from the uncooked food container unit 230 to the dozer container 245. The dozer container 245 is then moved into the delivering position (by aligning the second dozer container opening 249 with the dozer track opening 247) and the food items are discharged to the food compartment 520. In these examples, when the main controller 650 instructs the delivery unit 400 to transfer a portion of the food items from the storage unit 200 to the one of the plurality of food compartments 520 aligned with the delivery unit 400, the main controller 650 also instructs the horizontal belt feeder 233 to transfer a set portion of food items from the storage unit 200 to the one of the plurality of plurality of food compartments 520.

Referring to FIGS. 2C and 6A-6F and the description of these figures presented above, in some examples, the storage unit 200 further comprises a cassette 250 comprising a plurality of cassette compartments 252, a cassette axis 254, a cassette door 256, a cassette shroud 257, a cassette opening 258 and a cassette cover 251. At least some of the cassette compartments 252 may be loaded with uncooked food items. The main controller 650 is aware of the content of each cassette compartment 252. It should be noted that the same automated cooking apparatus 110 may include multiple cassettes 250, each comprising multiple cassette compartments 252. The cassette opening 258 is an opening in the cassette shroud 257 and is aligned with the container delivery opening 232. The plurality of cassette compartments 252 is radially arrayed about the cassette axis 254 and rotationally coupled to the cassette 250. The one of the plurality of cassette compartments 252 comprises a compartment opening 259. In specific examples, a first food portion type is positioned in at least one of the plurality of cassette compartments 252, and a second food portion type is positioned in at least one other of the plurality of cassette compartments 252 such that the first food portion type is different from the second food portion type (e.g., French fries and chicken nuggets, different size portions).

In these examples, in order to transfer a portion of the food items from the storage unit 200 to the one of the plurality of food compartments 520, the compartment opening 259 is aligned with the cassette opening 258 when the one of the plurality of cassette compartments 252 is aligned with the cassette opening 258 thereby allowing the food items from this specific cassette compartment 252 to be removed and transferred into the food compartment 520 for cooking. The amount of food items in each cassette compartment 252 determines the portion size cooked in the corresponding food compartment 520. The compartment openings 259 of other cassette compartments 252 are aligned with the cassette shroud 257 when the one of the plurality of cassette compartments 252 is not aligned with the cassette opening 258 and the food items are secured in these compartments (not being dispensable).

Specifically, during the food dispensing from the corresponding compartment, the cassette door 256 is opened (i.e., is not positioned between this cassette compartment 252 and the cassette opening 258). Before or after dispensing the food items, the cassette door 256 is positioned between the cassette compartment 252 and the cassette opening 258, meaning that the cassette door 256 is in a closed position.

In these examples, when the main controller 650 instructs the delivery unit 400 to transfer a portion of the food items from the storage unit 200 to the one of the plurality of food compartments 520, the main controller 650 also instructs the storage unit 200 (1) to rotate the plurality of cassette compartments 252 such that the compartment opening 259 of one of the plurality of cassette compartments 252 in which a portion of food is positioned is aligned with the cassette opening 258, and (2) to open the cassette door 256.

Referring to FIG. 14, the method 900 comprises instructing the food transporter 510 by the main controller 650 to transport the one of the plurality of food compartments 520 through the cooking tank opening 535 and into the cooking tank 530. The food portion positioned in the one of the plurality of food compartments 520 is agitated by the motion of the one of the plurality of food compartments 520 through cooking media positioned within the 530 via motion induced by movement of the food transporter 510. The agitation is the result of cooking media flowing through the plurality of basket perforations 308. The agitation prevents clumping of individual items within the portion of food items without any additional components.

In some examples, a cooking medium (e.g., a cooking liquid such as oil, broth, water) is positioned within the cooking tank 530 prior to the food transporter 510 transporting the one of the plurality of food compartments 520 through the cooking tank opening 535 and into the cooking tank 530. In more specific examples, the volume of the cooking medium positioned within the cooking tank 530 is such that the portion of food items is immersed in the cooking medium when the one of the plurality of food compartments 520 at least partially protrudes into the cooking tank 530.

In some examples, the method 900 further comprises instructing the plurality of heating elements 540 by the main controller 650 to maintain a cooking medium temperature at or above a set cooking temperature. For example, the set cooking temperature is at least 150° C., at least 180° C., at least 200° C., or even at least 220° C. In some examples the set cooking temperature is at least 175° C.

In some examples, the automated cooking apparatus 110 further comprises a cooking unit temperature sensor 546, a storage unit temperature sensor 547, and a ventilation unit 560 comprising at least one ventilation fan 566 and a ventilation duct 568. The ventilation duct 568 is fluidically coupled with the at least one ventilation fan 566 and the at least one ventilation fan 566 is fluidically coupled with the cooking unit 500. The storage unit temperature sensor 547 is thermally coupled with a volume of air within the insulating enclosure 210 and electronically coupled with the main controller 650. The at least one ventilation fan 566 is instructed by the main controller 650 to withdraw hot air from the cooking unit 500 such that a temperature recorded by the storage unit temperature sensor 547 is maintained at or below a set temperature when the plurality of heating elements 540 maintains a cooking temperature at a set cooking temperature. In some examples, the set cooking temperature may be at least 95° C., at least 100° C., at least 175° C., at least 180° C., at least 185° C., at least 200° C., or even at least 210° C.

In some examples, the cooking unit 500 further comprises a cooking medium temperature sensor 545 positioned within the cooking tank 530, thermally coupled with the cooking medium, and electronically coupled with the main controller 650. In these examples, the method 900 may comprise the main controller 650 recording a first cooking temperature measured by the cooking medium temperature sensor 545 when the main controller 650 instructs the food transporter 510 to transport the one of the plurality of food compartments 520 through the cooking tank opening 535. The method 900 may comprise the main controller 650 recording a second cooking temperature measured by the cooking medium temperature sensor 545 after the one of the plurality of food compartments 520 is transported through the cooking tank opening 535 into the cooking tank 530 and before the one of the plurality of food compartments 520 is transported through the cooking tank opening 535 out of the cooking tank 530. The difference between the first and second cooking temperatures may be less than 25° C., less than 10° C., less than 5° C., or even less than 3° C. Such a low temperature differential is ensured by the design and position of the plurality of heating elements 540 and sizing the food portions. Specifically, the timing between introducing different portions is sufficient for the plurality of heating elements 540 to bring the temperature back to the desired level. For example, the timing between introducing a portion and the plurality of heating elements 540 bringing the temperature back to the desired level may be less than 120 seconds, less than 60 seconds, or even less than 30 seconds. It should be noted that the movement of the plurality of food compartments 520 through the cooking tank 530 also creates substantial convection of the cooking medium in the cooking tank 530 and provides temperature uniformity. This is in contrast with conventional deep fryers that utilize batch processing associated with significant temperature variations over time and gradients within the cooking vessel.

Referring to FIG. 14, the method 900 comprises instructing the food transporter 510 by the main controller 650 to transport the one of the plurality of food compartments 520 from the cooking tank 530 to the cooked food receiver 550 and to transfer the portion of food items from the one of the plurality of food compartments 520 to the cooked food receiver 550.

In some examples, the food transporter 510 is configured to position each one of the plurality of food compartments 520 in one of a food-receiving position within the cooking unit 500, a food-cooking position within the cooking tank 530, and a food-delivering position within the cooking unit 500. For example, each one of the plurality of food compartments 520 comprises a basket opening. Each one of the plurality of food compartments 520 is configured to adopt an orientation when this one of the plurality of food compartments 520 is positioned in the food-delivering position such that the basket opening permits food to pass out of the one of the plurality of food compartments 520.

In some examples, the operations represented by block 930, block 950, and block 960 may be repeated multiple times to cook additional portions of the food. Furthermore, the operation represented by block 930 for a new portion may be initiated before the operation represented by block 960 is completed. Specifically, the method 900 may further comprise instructing the delivery unit 400, which may comprise the horizontal belt feeder 233, by the main controller 650 to transfer an additional portion of the food items from the storage unit 200 to one other of the plurality of food compartments 520 (i.e., a second food compartment). This additional portion may be delivered to this second food compartment while the initial portion of the food items is still in the first food compartment (before being delivered to the cooked food receiver 550). Specifically, the method 900 comprises instructing the food transporter 510 by the main controller 650 to transport the one other of the plurality of food compartments 520 through the cooking tank opening 535 and into the cooking tank 530 before instructing the food transporter 510 by the main controller 650 to transport the one of the plurality of food compartments 520 from the cooking tank 530 to the cooked food receiver 550. This may be referred to an overlap cooking operation, while multiple food portions are cooked at the same time at least for a period of time thereby increasing the overall throughput of the automated cooking apparatus 110. In some examples, the delivery unit 400, the food transporter 510, and the cooking tank 530 may be instructed by the main controller 650 to deliver, transport, and cook a series of portions of food items continuously at a set temperature for the food items until a set cooking time has elapsed. In other examples, the delivery unit 400, the food transporter 510, and the cooking tank 530 may be instructed by the main controller 650 to deliver, transport, and cook a series of portions of food items continuously at a set temperature until a set number of food portions has been delivered to the cooked food receiver 550. In still further examples, the delivery unit 400, the food transporter 510, and the cooking tank 530 may be instructed by the main controller 650 to deliver, transport, and cook a series of portions of food items continuously at a set temperature until the main controller 650 records an instruction to stop the cooking of food items. In these examples, the main controller 650 may receive a set number of food portions, a set cooking time, and/or an instruction to stop the cooking of food items from, for example, an operator.

In some examples, the automated cooking apparatus 110 has a time productivity ratio, defined as the ratio of the cooking time to the transfer time, of at least 4, at least 10, at least about 20. For purposes of this disclosure, a transfer time is defined as the sum of the time elapsing from when a portion of the food is transferred from the storage unit 200 until the portion of food items is transported into the cooking tank 530 and the time elapsing from when a portion of food is transferred from the cooking tank 530 until the portion of food is transferred to the cooked food receiver 550. Cooking time is defined as the time the portion of food items is in the cooking tank 530. Such high productivity ratios are ensured by the short distances required for transporting food items before and after cooking (provided by various design aspects of the automated cooking apparatus 110 described above).

Figure 11C:
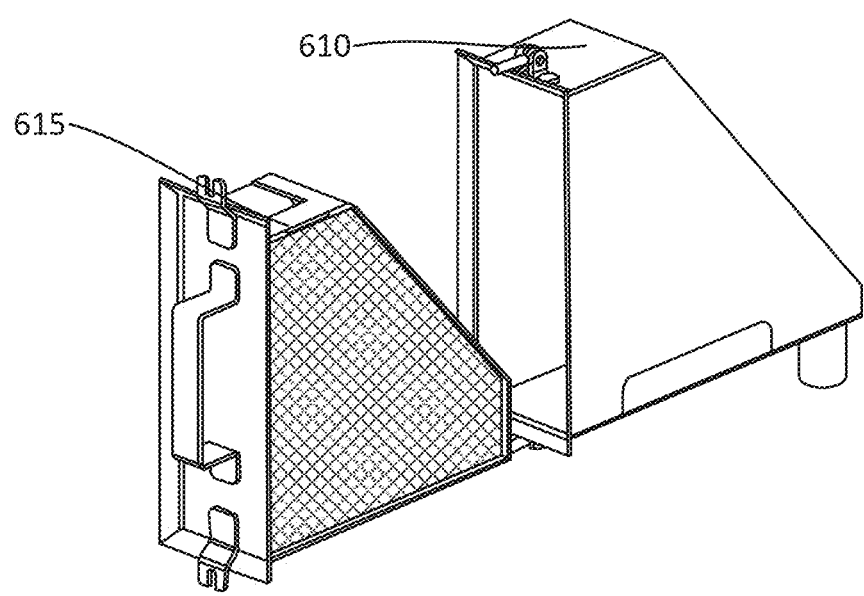
FIG. 11C is an exploded isometric view illustrating some components of the filtration unit 600, in accordance with some examples.

Referring to FIGS. 11A-11C, in some examples, the automated cooking apparatus 110 further comprises a filtration unit 600 comprising a filtration pump 605, a filter housing 610, and a filter 615. The filtration pump 605 is fluidically coupled with the cooking tank 530 and the filter housing 610 is fluidically coupled with the filtration pump 605. Filter 615 is positioned within the filter housing 610. During the operation of the automated cooking apparatus 110, method 900 comprises the filtration pump 605 being instructed to transfer a portion of the cooking medium from the cooking tank 530 into the filter housing 610 and through the filter 615. Specifically, the first temperature is higher than an ambient temperature. In some examples, the filter housing 610 is configured to direct the portion of the cooking medium to the cooking tank 530 after the portion of the cooking medium passes through the filter 615.

In some examples, the automated cooking apparatus 110 further comprises a filtration pump 605 fluidically coupled with the cooking tank 530, a filter housing 610 fluidically coupled with the filtration pump 605, and a filter 615 positioned within the filter housing 610. In these examples, the method 900 further comprising instructing the filtration pump 605 by the main controller 650 to transfer a portion of the cooking medium from the cooking tank 530 into the filter housing 610 and through the filter 615 after instructing the food transporter 510 by the main controller 650 to transport the one of the plurality of food compartments 520 through the cooking tank opening 535 and before instructing the food transporter 510 by the main controller 650 to transport the one of the plurality of food compartments 520 from the cooking tank 530 to the cooked food receiver 550. In some other examples, the main controller 650 instructs the filtration pump 605 to transfer a portion of the cooking medium from the cooking tank 530 into the filter housing 610 and through the filter 615 before instructing the food transporter 510 to transport one of the plurality of food compartments 520 through the cooking tank opening 535. In some still other examples, the main controller 650 instructs the filtration pump 605 to transfer a portion of the cooking medium from the cooking tank 530 into the filter housing 610 and through the filter 615 without instructing the food transporter 510 to transport one of the plurality of food compartments 520 through the cooking tank opening 535.

In some further examples, the filtration unit 600 further comprises an expansion tank 620, which is fluidically coupled with the filtration pump 605 and, in some further examples, with the filter housing 610. In the same or other examples, the filtration unit 600 further comprises a valve 622 fluidically coupled with the expansion tank 620, the filtration pump 605, the filter housing 610, and the cooking tank 530 and electronically coupled with the main controller 650. The expansion tank 620 has an expansion tank volume and the cooking tank 530 has a cooking tank volume. The expansion tank volume is equal to or greater than the cooking tank volume. In these examples, cooking medium may pass through the filter 615, out of the filter housing 610, and into the cooking tank 530, or into the expansion tank 620. The filtration unit 600 may extend a useful lifetime of a volume of cooking medium placed in the cooking tank 530 by removing contaminants. Then, as cooking medium is removed from the cooking tank 530, cooking medium from the expansion tank 620 may be transferred to the cooking tank 530 to maintain a constant volume of cooking medium in the cooking tank 530. In some examples, the cooking unit 500 comprises a cooking medium level sensor 548 positioned within the cooking tank 530 and electronically coupled with the main controller 650. In these examples, the main controller 650 may record a cooking medium level measured by the cooking medium level sensor 548, and the main controller 650 may instruct the filtration pump 605 and the valve 622 to transfer a portion of cooking media from the expansion tank 620 to the cooking tank 530 if the cooking medium level is below a set cooking medium level. Fried foods, for example, absorb cooking media such as oil during cooking. Different types of foods absorb different amounts of oil per portion, which is removed from the cooking tank 530 with the cooked food items. Replenishment of the cooking medium in the cooking tank 530 during cooking processes provides benefits of simplification of the cooking process and improvement of cooking efficiency. In some yet further examples, the expansion tank 620 comprises a plurality of tank heating elements 621 positioned inside the expansion tank 620 and electronically coupled with the main controller 650. In these examples, the plurality of tank heating elements 621 is fluidically coupled with cooking media when the expansion tank 620 contains cooking media. The main controller 650 instructs the plurality of tank heating elements 621 to heat the cooking media in the expansion tank 620 to a tank set temperature prior to instructing the filtration pump 605 to transfer cooking media to the cooking tank 530, thereby preventing the temperature of the cooking media in the cooking tank 530 from deviating from a cooking temperature during the transfer. In some examples, the expansion tank 620 dissolves oil conditioning additives into the cooking medium within the expansion tank 620. In some examples, the 620 contains water. In these examples, the filtration pump main controller 650 instructs the filtration pump 605 and the valve 622 to transfer a portion of the water from the expansion tank 620 to the cooking tank 530 for cleaning of the cooking tank 530. Specifically, the water may contain dissolved cleaning additives. In further examples, the main controller 650 may further instruct the filtration pump 605 to transfer the water through the filter housing 610 and the filter 615.

In some examples, the automated cooking apparatus 110 further comprises a manual bypass unit 260 comprising a manual bypass tray 265 configured such that, when the manual bypass tray 265 is opened, food items are placed in the manual bypass tray 265. When the manual bypass tray 265 is closed, the food transporter 510 is instructed by the main controller 650 to align one of the plurality of food compartments 520 with the manual bypass unit 260. The manual bypass unit 260 is then instructed by the main controller 650 to transfer the portion of the food items from the manual bypass tray 265 to the one of the plurality of food compartments 520 aligned with the manual bypass unit 260. In some examples, the manual bypass unit 260 is electronically coupled with the main controller 650. In some further examples, the manual bypass unit 260 comprises a sensor configured to detect food items positioned in the manual bypass unit 260. In these examples, when the sensor detects food items positioned in the manual bypass unit 260, the detection of food items is communicated to the main controller 650. The main controller 650 may then provide instructions to other components of the automated cooking apparatus 110. For example, when the sensor communicates to the main controller 650 that uncooked product is positioned in the manual bypass unit 260, the main controller 650 may instruct the plurality of heating elements 540 to increase or decrease the heat the plurality of heating elements 540 applies to a cooking medium in the cooking tank 530 such that a temperature of the cooking medium is changed to a new temperature that is appropriate for the food items positioned in the manual bypass unit 260. The main controller 650 may instruct the food transporter 510 to transport the plurality of food compartments 520 at a new speed such that the food items transferred from the manual bypass unit 260 to one of the plurality of food compartments 520 are positioned in the cooking tank 530 for a different cooking time than items positioned in other ones of the plurality of food compartments 520 from the delivery unit 400. The main controller 650 may instruct the delivery unit 400, or if present, horizontal belt feeder 233 to not dispense food items to one of the plurality of food compartments 520, or to advance or delay the dispensing of food items to one of the plurality of food compartments 520. In some examples, the main controller 650 is configured to determine a type and amount of food of the portion of food items positioned in the manual bypass unit 260 and instruct other components of the automated cooking apparatus 110 to operate or not operate. In other examples, the main controller 650 is configured to receive the type and amount of food of the portion of food items positioned in the manual bypass unit 260 from a human operator and instruct other components of the automated cooking apparatus 110 to operate or not operate. For example, the main controller 650 may comprise an interface unit and may receive the type and amount of food of the portion of food items positioned in the manual bypass unit 260 via the interface unit. In some examples, when a portion of food items is positioned in the manual bypass unit 260, the main controller 650 instructs the manual bypass unit 260 to contain the portion of food items until one of the plurality of food compartments 520 has deposited cooked food items to the cooked food receiver 550 and is then ready to be aligned with the manual bypass unit 260 and receive the portion of food items contained in the manual bypass unit 260.

Examples of Cooking Apparatus Batteries

Figure 4A:
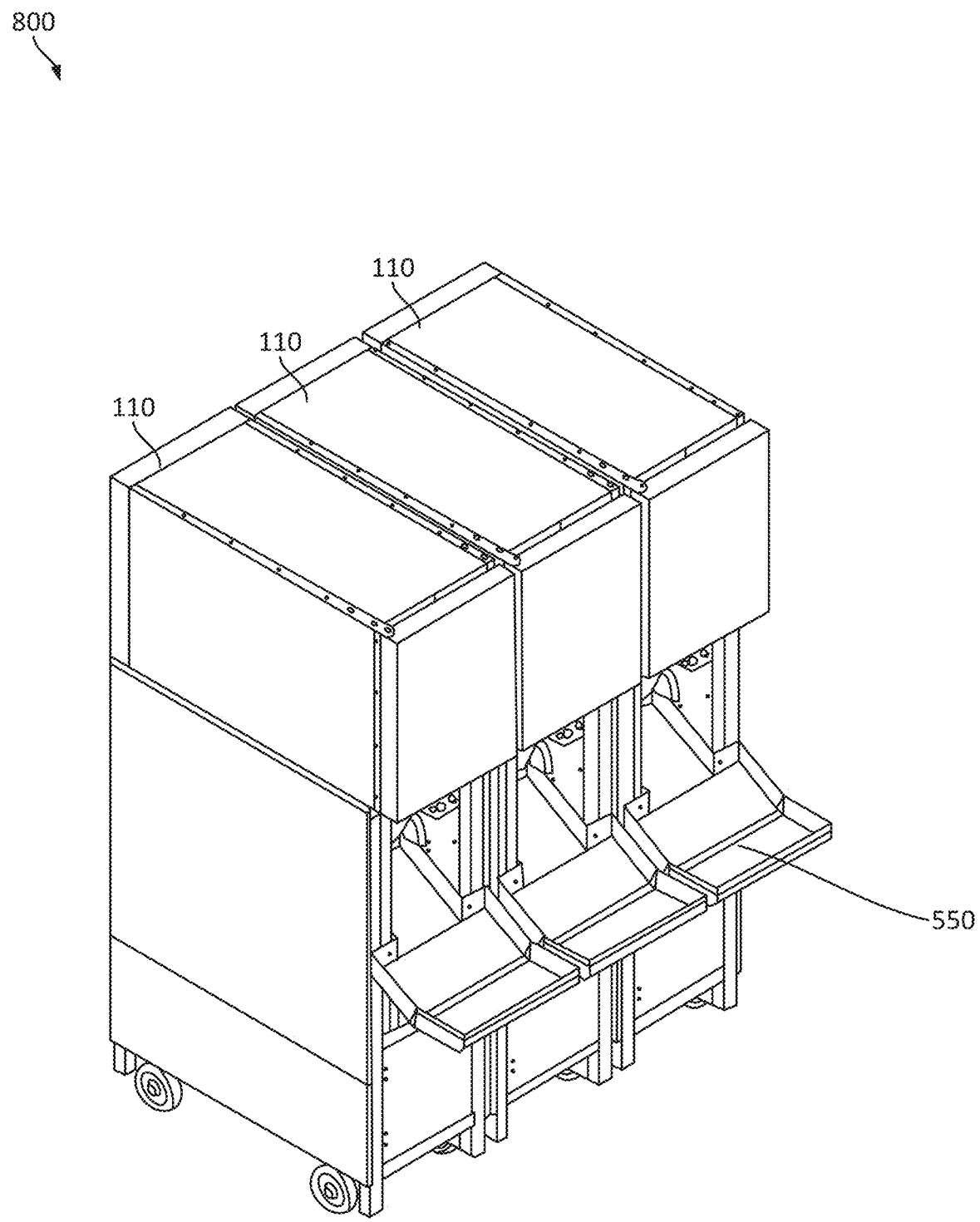
FIGS. 4A-4B are schematic isometric views of cooking apparatus batteries 800 comprising three automated cooking apparatuses 110, in accordance with some examples.
Figure 4B:
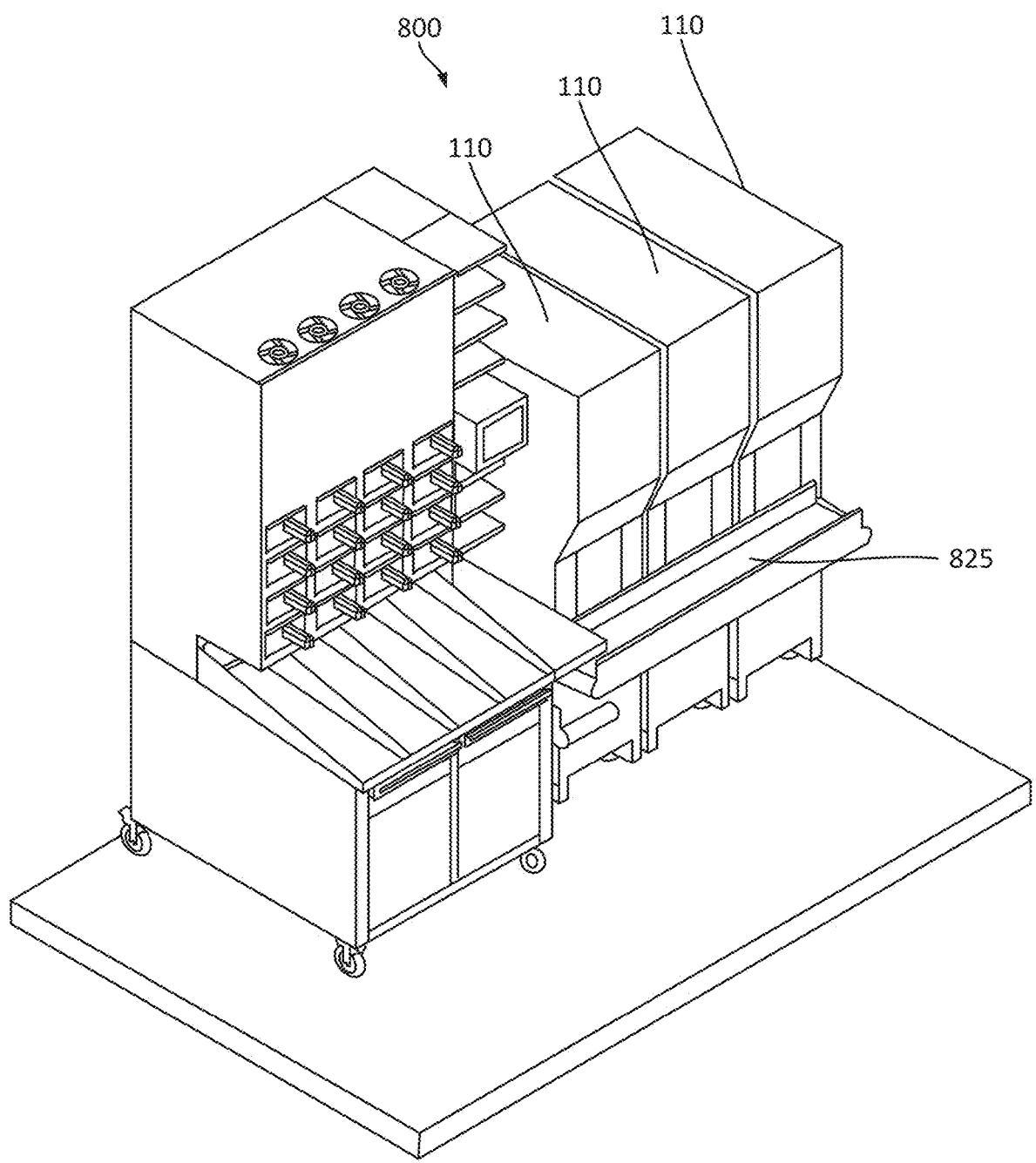

FIGS. 4A-4B are schematic isometric views of cooking apparatus battery 800 comprising three automated cooking apparatuses 110, in accordance with some examples. The cooking apparatus battery 800 comprises two or more automated cooking apparatuses 110 for storing and cooking food items. Each automated cooking apparatus 110 of the 800 comprises a storage unit 200, a delivery unit 400, and a cooking unit 500. Each storage unit 200 comprises an insulating enclosure 210, a refrigeration unit 220, and an uncooked food container unit 230 positioned within the insulating enclosure 210 and comprising a container delivery opening 232. Each delivery unit 400 is aligned with a container delivery opening 232. Each cooking unit 500 comprises a food transporter 510, a cooking tank 530, and a cooked food receiver 550. Each food transporter 510 comprises a plurality of food compartments 520. Each cooking tank 530 comprises a cooking tank opening 535 and a plurality of heating elements 540. Each delivery unit 400 is positioned between the uncooked food container unit 230 and the cooking tank 530 of one automated cooking apparatus 110. Each delivery unit 400 is configured to load a set amount of the food items into each one of the plurality of food compartments 520 of one automated cooking apparatus 110. Each food transporter 510 is configured to transport each one of the plurality of food compartments 520 of one automated cooking apparatus 110 from the delivery unit 400 of that automated cooking apparatus 110 through the cooking tank opening 535 into the cooking tank 530 of that automated cooking apparatus 110 and from the cooking tank 530 to the cooked food receiver 550 of that automated cooking apparatus 110. Each uncooked food container unit 230 is positioned proximate to the cooking tank 530 in the same automated cooking apparatus 110. In some examples, each uncooked food container unit 230 is positioned such that a distance between the container delivery opening 232 and the cooking tank opening 535 of the cooking tank 530 in the same automated cooking apparatus 110 is less than 200 millimeters. In some examples, the distance between the container delivery opening 232 and the cooking tank opening 535 of the same automated cooking apparatus 110 may be greater than 150 millimeters, greater than 250 millimeters, greater than 450 millimeters, or even greater than 500 millimeters. In some examples, the distance between the container delivery opening 232 and the cooking tank opening 535 of the same automated cooking apparatus 110 may be less than 680 millimeters, less than 500 millimeters, less than 380 millimeters, or even less than 250 millimeters. In some examples, the insulating enclosure 210 of at least one of the automated cooking apparatuses 110 comprises an insulating enclosure opening 212 aligned with the container delivery opening 232 of that automated cooking apparatus 110.

In some examples, the cooking apparatus battery 800 further comprises a main controller 650 electronically coupled to the storage unit 200, the delivery unit 400, and the cooking unit 500 of each one of the two or more automated cooking apparatus 110. Examples of main controllers 650 have been described in detail above.

In some examples, at least one of the two or more automated cooking apparatuses 110 further comprises a horizontal belt feeder 233 comprising a flexible belt 234, a plurality of pulleys 235, a dozer container 245, and a dozer container track 244. The flexible belt 234 is positioned between the uncooked food container unit 230 and the container delivery opening 232 of one automated cooking apparatus 110 and moves in translation relative to both the uncooked food container unit 230 and the container delivery opening 232. The plurality of pulleys 235 is configured to support the flexible belt 234 and rotate about their respective pulley axes 236. One or both pulleys 235 may be driven by a motor thereby moving the flexible belt 234 (e.g., in the clockwise direction with reference to the view in FIGS. 7A and 7B).

Referring to FIGS. 7A-7D, in some examples, the horizontal belt feeder 233 further comprises a dozer container track 244 for moving the dozer container 245 to various positions (e.g., a receiving position/automated loading position shown in FIG. 7A, a delivering position/unloading position shown in FIGS. 7B and 7D, and a manual loading position shown in FIG. 7C). For keeping and unloading the food items from the dozer containers 245, the dozer container track 244 comprises a dozer container cover 246 and a dozer track opening 247.

The container delivery opening 232 is aligned with the dozer track opening 247, e.g., as shown in FIG. 7A. The container delivery opening 232 may define the insulating enclosure 210. As such, in some examples, the horizontal belt feeder 233 is positioned within the insulating enclosure 210. This feature reduces the risk of food contamination, increasing processing time, and enabling more efficient food portioning.

Each dozer container 245 comprises a first dozer container opening 248 (which may be also referred to as a top container opening) and a second dozer container opening 249 (which may be also referred to as a bottom container opening) opposite the dozer container cover 246. The first dozer container opening 248 is configured to align with the end of the flexible belt 234 in an automated loading position shown in FIG. 7A.

The second dozer container opening 249 is configured to align with the dozer container cover 246 when the dozer container 245 is in a receiving position. The dozer container cover 246 retains the food items in the dozer container 245. When the dozer container cover 246 is aligned with the dozer track opening 247, the food items are transferred (fall under the gravity) from the dozer container 245 and through the dozer track opening 247 (e.g., into the cooking unit 500). In other words, the second dozer container opening 249 is configured to align with the dozer track opening 247 when the dozer container 245 is in a delivering position thereby allowing the food items to transfer from the dozer container 245 to the cooking unit 500.

Referring to FIG. 7A, in some examples, the horizontal belt feeder 233 is positioned within the insulating enclosure 210. This feature reduces the risk of food contamination, increasing apparatus uptime, and enabling more efficient food portioning.

In some examples, at least one of the two or more automated cooking apparatuses 110 comprises a cassette 250 comprising a plurality of cassette compartments 252, a cassette axis 254, a cassette door 256, a cassette shroud 257, and a cassette opening 258. Specifically, the cassette opening 258 is an opening in the cassette shroud 257 and is aligned with the container delivery opening 232 (e.g., as shown in FIG. 2C). The cassette opening 258 allows removing the food items from one of the cassette compartments 252 that is currently aligned with the cassette opening 258. The plurality of cassette compartments 252 is radially arrayed about the cassette axis 254 and rotationally coupled to the cassette 250 (thereby allowing different ones of the cassette compartments 252 to align with the cassette opening 258). Specifically, each one of the plurality of cassette compartments 252 comprises a compartment opening 259 that can be aligned with the cassette opening 258 when this cassette compartment 252 is aligned with the cassette opening 258 in a delivering position. Alternatively, in a non-delivery position, the compartment opening 259 of this cassette compartment 252 is aligned with the cassette shroud 257 (and is not aligned with the cassette opening 258). The cassette shroud 257 blocks and retains the food items in this cassette compartment 252 until reaching the delivery position.

The cassette door 256 can be actuated between a closed position and an open position. In the closed position, the cassette door 256 blocks the food items. In the open position, the cassette door 256 allows the food items to leave the corresponding cassette compartment 252. Specifically, the cassette door 256 is positioned between the one of the plurality of cassette compartments 252 and the cassette opening 258, when the cassette door 256 is in a closed position. The cassette door 256 is not positioned between the one of the plurality of cassette compartments 252 and the cassette opening 258 when the cassette door 256 is in an open position.

In some examples, the horizontal belt feeder 233 (described above with reference to FIGS. 7A-7D) of at least one of the two or more automated cooking apparatuses 110 is configured to accept portions of food from either a cassette 250 or an uncooked food container unit 230. In some examples, at least one of the two or more automated cooking apparatuses 110 of the cooking apparatus battery 800 comprises an uncooked food container unit 230 and at least one other of the two or more automated cooking apparatuses 110 comprises a cassette 250. In some further examples, the cassette 250 is positioned within the insulating enclosure 210.

In some examples, at least one of the two or more cooking apparatuses 110 comprise an apparatus axis 115, a transporter chain axis 517, and a food transporter 510. The apparatus axis 115 intersects both the storage unit 200 and the cooking unit 500. The transporter chain axis 517 has an angle to the apparatus axis 115 of less than 60 degrees. The food transporter 510 comprises a transporter chain 515 and a plurality of plurality of food compartments 520. Each one of the plurality of food compartments 520 is mechanically coupled to the transporter chain 515. At least a portion of the transporter chain 515 is aligned with the transporter chain axis 517.

In some examples, at least one of the two or more cooking apparatuses 110 comprises a ventilation unit 560 comprising at least one ventilation fan 566 and a ventilation duct 568. The ventilation duct 568 is fluidically coupled with the ventilation fan 566 and the at least one ventilation fan 566 is fluidically coupled with the cooking unit 500. The at least one ventilation fan 566 is configured to withdraw a volume of hot air from the cooking unit 500 and expel the volume of hot air into the ventilation duct 568. In some examples, two or more of the automated cooking apparatuses 110 comprise ventilation units ventilation unit 560. In some further examples, multiple ventilation units 560 of multiple automated cooking apparatus 110 may share components in order to increase compactness of the cooking apparatus battery 800. For example, the ventilation unit 560 of one automated cooking apparatus 110 and another automated cooking apparatus 110 may each have at least one ventilation fan 566 that expels air into a shared ventilation duct 568. In other examples, the ventilation units 560 of two or more automated cooking apparatus 110 may expel volumes of hot air into a shared recirculating ventless hood.

In some examples, the refrigeration unit 220 of at least one of the automated cooking apparatuses 110 comprises a compressor 222, a condenser coil 223, an evaporator 225, and a circulation fan 224. The compressor 222, the condenser coil 223, and the evaporator 225 are fluidically coupled. The circulation fan 224 is configured to circulate air within the insulating enclosure 210 and over the evaporator 225, thereby maintaining the air within the insulating enclosure 210 below an ambient temperature. In some examples, one refrigeration unit 220 may be configured to circulate air within the insulating enclosure 210 of two or more automated cooking apparatus 110. In some other examples, cold air is circulated in the insulating enclosure 210 of two or more automated cooking apparatuses 110 by an external refrigeration unit fluidically coupled to the two or more automated cooking apparatuses 110.

In some examples, the container delivery opening 232 of at least one of the two or more automated cooking apparatuses 110 of the cooking apparatus battery 800 has a plane and a cross-sectional area in the plane. The uncooked food container unit 230 has a first food container unit side 231 opposite the container delivery opening 232, and the first food container unit side 231 has an area in a plane parallel with the plane of the container delivery opening 232. The cross-sectional area of the container delivery opening 232 is smaller than the cross-sectional area of the first food container unit side 231.

In some examples, each one of the plurality of food compartments 520 of the food transporter 510 of at least one of the two or more automated cooking apparatuses 110 is configured to form a food compartment opening 522 when one of the plurality of food compartments 520 is in one of a food-receiving position or a food-delivering position within the cooking unit 500. Various examples of plurality of food compartments 520 are provided above. In some examples, the cooking unit 500 of at least one of the two or more cooking apparatuses 110 further comprises a manual bypass.

In some examples, the cooking apparatus battery 800 further comprises an external auxiliary transporter 825. The external auxiliary transporter 825 is configured to receive portions of cooked food from at least two of the automated cooking apparatuses 110. Such an external auxiliary transporter 825 is configured to receive cooked food items deposited from any one of the at least two automated cooking apparatuses 110 and transport the cooked food items to a hot product holding or ambient temperature storage zone nearby.

In some examples, the cooking tank 530 of at least one of the two or more automated cooking apparatus 110 is fluidically coupled with the cooking tank 530 of at least one other of the two or more automated cooking apparatuses 110. Fluidically coupled cooking tanks may allow for transfer of cooking medium between one automated cooking apparatus 110 and a coupled automated cooking apparatus 110 during, for example, cleaning or maintenance of one of the automated cooking apparatuses 110.

In some examples, the food transporter 510 of at least one of the two or more automated cooking apparatuses 110 is configured to position each one of the plurality of food compartments 520 in one of a food-receiving position within the cooking unit 500, a food-cooking position within the cooking tank 530, and a food-delivering position within the cooking unit 500. In some further examples, each one of the plurality of food compartments 520 is configured to comprise a basket opening when this one of the plurality of food compartments 520 is positioned in the food-delivering position. In the same or other further examples, each one of the plurality of food compartments 520 is configured to adopt an orientation when this one of the plurality of food compartments 520 is positioned in the food-delivering position such that the basket opening permits food to exit the one of the plurality of food compartments 520.

In some examples, the cooking apparatus battery 800 further comprises a cooked food receiver 550 configured to receive food portions from at least two of the automated cooking apparatuses 110. In some examples, the cooked food receiver 550 is affixed to at least one of the automated cooking apparatuses 110 of the cooking apparatus battery 800. In some examples, the cooked food receiver 550 can be detached from the at least one automated cooking apparatus 110. Other examples of cooked food receivers 550 are described above.

CONCLUSION

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

The invention claimed is:

1. A method of cooking food items by using an automated cooking apparatus comprising (1) a storage unit comprising an uncooked food container unit, an insulating enclosure, and a refrigeration unit, (2) a delivery unit, (3) a cooking unit comprising a food transporter comprising a plurality of food compartments, a cooked food receiver, and a cooking tank comprising a cooking tank opening and a plurality of heating elements, (4) a main controller electronically coupled with the storage unit, the delivery unit, the cooking unit, and the food transporter, and (5) a manual bypass unit comprising a manual bypass tray, the method comprising:
   positioning a portion of the food items within one of the plurality of food compartments, by performing one of:
   (a) positioning the food items in the storage unit, instructing the food transporter by the main controller to align one of the plurality of food compartments with the delivery unit, and instructing the delivery unit by the main controller to transfer a portion of the food items from the storage unit to the one of the plurality of food compartments aligned with the delivery unit, such that the portion of food items is positioned within the one of the plurality of food compartments; or
   (b) placing a portion of the food items in the manual bypass tray, instructing the food transporter by the main controller to align one of the plurality of food compartments with the manual bypass tray, and instructing the manual bypass unit by the main controller to transfer the portion of the food items from the manual bypass tray to the one of the plurality of food compartments aligned with the manual bypass tray;
   instructing the food transporter by the main controller to transport the one of the plurality of food compartments through the cooking tank opening and into the cooking tank; and
   instructing the food transporter by the main controller to transport the one of the plurality of food compartments from the cooking tank to the cooked food receiver and to transfer the portion of food items from the one of the plurality of food compartments to the cooked food receiver.

2. The method of claim 1, wherein one or more components of delivery unit 400 are positioned within the insulating enclosure.

3. The method of claim 1, further comprising instructing the plurality of heating elements by the main controller to maintain a cooking medium temperature at or above a set cooking temperature at or above 175° C.

4. The method of claim 1, wherein:
   each one of the plurality of food compartments has a food compartment capacity,
   the storage unit has a storage unit capacity that is at least 20 times the food compartment capacity, and
   during the positioning of the food items in the storage unit, the positioned food items have a volume sufficient to fill one of the plurality of food compartments to the capacity of this one of the plurality of food compartments at least 20 times.

5. The method of claim 1, wherein:
   a transfer time is defined as a sum of the time elapsing from when a portion of the food is transferred from the storage unit until the portion of food items is transported into the cooking tank and the time elapsing from when the portion of the food is transferred from the cooking tank to the cooked food receiver,
   a cooking time is defined as the time when the portion of food items is in the cooking tank,
   a time productivity ratio is defined as the ratio of the cooking time to the transfer time, and
   the time productivity ratio is at least 10.

6. The method of claim 1, further comprising:
   instructing the delivery unit by the main controller to transfer a portion of the food items from the storage unit to one other of the plurality of food compartments, and
   instructing the food transporter by the main controller to transport the one other of the plurality of food compartments through the cooking tank opening and into the cooking tank before instructing the food transporter by the main controller to transport the one of the plurality of food compartments from the cooking tank to the cooked food receiver.

7. The method of claim 1, wherein a cooking medium is positioned within the cooking tank prior to the food transporter transporting the one of the plurality of food compartments through the cooking tank opening and into the cooking tank.

8. The method of claim 7, wherein:
   the automated cooking apparatus further comprises a filtration pump fluidically coupled with the cooking tank, a filter housing fluidically coupled with the filtration pump, and a filter positioned within the filter housing, and
   the method further comprising instructing the filtration pump to transfer a portion of the cooking medium from the cooking tank into the filter housing and through the filter after instructing the food transporter by the main controller to transport the one of the plurality of food compartments through the cooking tank opening and before instructing the food transporter by the main controller to transport the one of the plurality of food compartments from the cooking tank to the cooked food receiver.

9. The method of claim 7, wherein a volume of the cooking medium positioned within the cooking tank is such that the portion of food items is immersed in the cooking medium when the one of the plurality of food compartments at least partially protrudes into the cooking tank.

10. The method of claim 7, wherein the automated cooking apparatus further comprises a cooking unit temperature sensor, a storage unit temperature sensor, and a ventilation unit comprising at least one ventilation fan and a ventilation duct, wherein:
    the ventilation duct is fluidically coupled with the at least one ventilation fan and the at least one ventilation fan is fluidically coupled with the cooking unit,
    the storage unit temperature sensor is thermally coupled with a volume of air within the insulating enclosure and electronically coupled with the main controller, and
    the at least one ventilation fan is instructed by the main controller to withdraw hot air from the cooking unit such that a temperature recorded by the storage unit temperature sensor is maintained at or below a set temperature when the plurality of heating elements maintains a cooking temperature at or above 175° C.

11. The method of claim 1, further comprising instructing the refrigeration unit by the main controller to maintain an air temperature within the insulating enclosure at or below −18° C.

12. The method of claim 1, wherein:
the cooking unit further comprises a cooking medium temperature sensor positioned within the cooking tank, thermally coupled with the cooking medium, and electronically coupled with the main controller,
the main controller records a first cooking temperature measured by the cooking medium temperature sensor when the main controller instructs the food transporter to transport the one of the plurality of food compartments through the cooking tank opening,
the main controller records a second cooking temperature measured by the cooking medium temperature sensor after the one of the plurality of food compartments is transported through the cooking tank opening into the cooking tank and before the one of the plurality of food compartments is transported through the cooking tank opening out of the cooking tank, and
the second cooking temperature is less than 25° C. different from the first cooking temperature.

13. The method of claim 12, wherein:
the automated cooking apparatus further comprises a filtration unit comprising a filtration pump, a filter housing, and a filter,
the filtration pump is fluidically coupled with the cooking tank and the filter housing is fluidically coupled with the filtration pump,
the filter is positioned within the filter housing, and
an expansion tank having an expansion tank volume and fluidically coupled with the filtration pump, wherein:
cooking media is positioned within the expansion tank,
the cooking tank has a cooking tank volume,
the expansion tank volume is larger than the cooking tank volume,
the cooking unit further comprises a cooking medium level sensor positioned within the cooking tank, electronically coupled with the main controller,
the main controller records a cooking medium level measured by the cooking medium level sensor, and
the main controller instructs the filtration pump to transfer a portion of cooking media from the expansion tank to the cooking tank if the cooking medium level measured by the cooking medium level sensor is lower than a set cooking medium level.

14. The method of claim 1, wherein the food transporter is configured to position each one of the plurality of food compartments in one of a food-receiving position within the cooking unit, a food-cooking position within the cooking tank, and a food-delivering position within the cooking unit, wherein:
each one of the plurality of food compartments comprises a basket opening, and
each one of the plurality of food compartments is configured to adopt an orientation when this one of the plurality of food compartments is positioned in the food-delivering position such that the basket opening permits food to pass out of the one of the plurality of food compartments.

15. The method of claim 1, wherein:
the automated cooking apparatus further comprises a cooking tank mounting bearing rotatably coupling the cooking tank to the cooking unit, and
the method further comprises tilting the cooking tank relative to the cooking unit.

16. The method of claim 1, wherein:
the automated cooking apparatus is part of a cooking apparatus battery comprising one or more additional automated cooking apparatuses,
each additional automated cooking apparatus comprises an additional storage unit; an additional delivery unit; and an additional cooking unit comprising an additional food transporter,
the main controller is electronically coupled with the additional storage unit, the additional delivery unit, the additional cooking unit, and the additional food transporter of the one or more additional automated cooking apparatuses, and
the method further comprises instructing the at least one additional food transporter by the main controller to align one of the plurality of food compartments with the at least one additional delivery unit.

17. The method of claim 16, further comprising receiving by the cooked food receiver food portions from at least two of the automated cooking apparatus and the one or more additional automated cooking apparatuses.

18. A method of cooking food items by using an automated cooking apparatus comprising (1) a storage unit comprising an uncooked food container unit, an insulating enclosure, and a refrigeration unit, (2) a delivery unit, (3) a cooking unit comprising a food transporter comprising a plurality of food compartments, a cooked food receiver, and a cooking tank comprising a cooking tank opening and a plurality of heating elements, and (4) a main controller electronically coupled with the storage unit, the delivery unit, the cooking unit, and the food transporter, the method comprising:
positioning the food items in the storage unit;
instructing the food transporter by the main controller to align one of the plurality of food compartments with the delivery unit;
instructing the delivery unit by the main controller to transfer a portion of the food items from the storage unit to the one of the plurality of food compartments aligned with the delivery unit, such that the portion of food items is positioned within the one of the plurality of food compartments;
instructing the food transporter by the main controller to transport the one of the plurality of food compartments through the cooking tank opening and into the cooking tank; and
instructing the food transporter by the main controller to transport the one of the plurality of food compartments from the cooking tank to the cooked food receiver and to transfer the portion of food items from the one of the plurality of food compartments to the cooked food receiver, wherein:
the uncooked food container unit further comprises a container delivery opening aligned with the delivery unit,
the automated cooking apparatus further comprises a horizontal belt feeder comprising a flexible belt, a plurality of pulleys, a dozer container, and a dozer container track,
the flexible belt is positioned between the container delivery opening and the insulating enclosure opening and moves in translation relative to both the uncooked food container unit and the container delivery opening,
the plurality of pulleys is positioned such that the plurality of pulleys supports the flexible belt,
the dozer container track comprises a dozer track cover and a dozer track opening,
the insulating enclosure opening is aligned with the dozer track opening, the dozer container comprises a first dozer container opening and a second dozer container opening opposite the first dozer container opening and facing the dozer container track, the first dozer container opening is aligned with an end of the flexible belt while the second dozer container opening is aligned with the dozer container cover when the dozer container is in a receiving position, the second dozer container opening is aligned with the dozer track opening when the dozer container is in a delivering position, and when the main controller instructs the delivery unit to transfer a portion of the food items from the storage unit to the one of the plurality of food compartments aligned with the delivery unit, the main controller instructs the horizontal belt feeder to transfer a set portion of food items from the storage unit to the one of the plurality of food compartments.

19. A method of cooking food items by using an automated cooking apparatus comprising (1) a storage unit comprising an uncooked food container unit, an insulating enclosure, and a refrigeration unit, (2) a delivery unit, (3) a cooking unit comprising a food transporter comprising a plurality of food compartments, a cooked food receiver, and a cooking tank comprising a cooking tank opening and a plurality of heating elements, and (4) a main controller electronically coupled with the storage unit, the delivery unit, the cooking unit, and the food transporter, the method comprising:

positioning the food items in the storage unit;

instructing the food transporter by the main controller to align one of the plurality of food compartments with the delivery unit;

instructing the delivery unit by the main controller to transfer a portion of the food items from the storage unit to the one of the plurality of food compartments aligned with the delivery unit, such that the portion of food items is positioned within the one of the plurality of food compartments;

instructing the food transporter by the main controller to transport the one of the plurality of food compartments through the cooking tank opening and into the cooking tank; and instructing the food transporter by the main controller to transport the one of the plurality of food compartments from the cooking tank to the cooked food receiver and to transfer the portion of food items from the one of the plurality of food compartments to the cooked food receiver, wherein:

the storage unit further comprises a cassette comprising a plurality of cassette compartments, a cassette axis, a cassette door, a cassette shroud, and a cassette opening, the cassette opening is an opening in the cassette shroud and is aligned with the container delivery opening, the plurality of cassette compartments is radially arrayed about the cassette axis and rotationally coupled to the cassette, each one of the plurality of cassette compartments comprises a compartment opening, the compartment opening is aligned with the cassette opening when the one of the plurality of cassette compartments is aligned with the cassette opening, the compartment opening of each one of the plurality of cassette compartments is aligned with the cassette shroud when the one of the plurality of cassette compartments is not aligned with the cassette opening, the cassette door is positioned between the one of the plurality of cassette compartments and the cassette opening when the cassette door is in a closed position, the cassette door is not positioned between the one of the plurality of cassette compartments and the cassette opening when the cassette door is in an open position, when the food items are positioned in the storage unit, at least one portion of food is positioned in at least one of the plurality of cassette compartments, and when the main controller instructs the delivery unit to transfer a portion of the food items from the storage unit to the one of the plurality of food compartments, the main controller also instructs the storage unit (1) to rotate the plurality of cassette compartments such that the compartment opening of one of the plurality of cassette compartments in which the portion of the food items is positioned is aligned with the cassette opening, and (2) to open the cassette door.

20. The method of claim 19, wherein:

a first food portion type is positioned in at least one of the plurality of cassette compartments and a second food portion type is positioned in at least one other of the plurality of cassette compartments, and the first food portion type is different from the second food portion type.

* * * * *